(12) United States Patent
Buechner et al.

(10) Patent No.: US 12,377,935 B2
(45) Date of Patent: Aug. 5, 2025

(54) BICYCLE SPROCKET

(71) Applicant: SRAM DEUTSCHLAND GmbH, Schweinfurt (DE)

(72) Inventors: Sven Buechner, Frankenbrunn (DE); Alex Buettner, Mainz (DE); Sebastian Heyna, Hambach (DE); Pierre Kommer, Schweinfurt (DE); Arndt Puls, Schweinfurt (DE); Jakob Rohmer, Würzburg (DE); Andreas Vonend, Schweinfurt (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 25 days.

(21) Appl. No.: 18/502,255

(22) Filed: Nov. 6, 2023

(65) Prior Publication Data

US 2024/0067300 A1    Feb. 29, 2024

Related U.S. Application Data

(63) Continuation of application No. 17/539,118, filed on Nov. 30, 2021, now Pat. No. 11,845,514.

(30) Foreign Application Priority Data

Nov. 30, 2020   (DE) .......................... 102020131699.2
Nov. 29, 2021   (DE) .......................... 102021131186.1

(51) Int. Cl.
  *B62M 9/10*    (2006.01)
  *B62M 9/04*    (2006.01)

(52) U.S. Cl.
  CPC ............... *B62M 9/10* (2013.01); *B62M 9/04* (2013.01)

(58) Field of Classification Search
  CPC . B62M 9/10; B62M 9/00; B62M 9/04; B62M 9/06; B62M 9/105; F16H 55/30
  (Continued)

(56) References Cited

U.S. PATENT DOCUMENTS 6,340,338 B1 *   1/2002   Kamada ................. B62M 9/122
                                                    474/160
9,915,336 B1 *   3/2018   Fukunaga ............... F16H 55/30
  (Continued)

FOREIGN PATENT DOCUMENTS

DE    102016007725    2/2017
DE    102017220674    6/2018
  (Continued)

*Primary Examiner* — Henry Y Liu
*Assistant Examiner* — Raveen J Dias

(57) ABSTRACT

A bicycle sprocket for a sprocket cassette comprises a sprocket main body which extends about a virtual sprocket axis about which the sprocket is rotatable during intended operation on a bicycle. In the case of a single release tooth being formed, a release-side stabilizing tooth is arranged in the circumferential region of extent of an upshift recess formation. The release-side stabilizing tooth has an inner tooth contact surface which has a greater axial spacing to an axial reference position than an inner tooth contact surface of the reference tooth. Additionally, or alternatively, in the case of a single catch tooth being formed, a receiving-side stabilizing tooth is arranged in the circumferential region of extent of a downshift recess formation. The receiving-side stabilizing tooth has an inner tooth contact surface which has a greater axial spacing to the axial reference position than the inner tooth contact surface of the reference tooth.

21 Claims, 52 Drawing Sheets

(58) Field of Classification Search
USPC .......................................................... 474/160
See application file for complete search history.

(56) References Cited

U.S. PATENT DOCUMENTS

| | | | |
|---|---|---|---|
| 9,926,038 B2 | 3/2018 | Fukunaga | |
| 10,865,870 B2 | 12/2020 | Yamazaki | |
| 11,008,065 B2* | 5/2021 | Kamada | B62M 9/10 |
| 11,034,412 B2* | 6/2021 | Reinbold | B62M 9/105 |
| 11,845,514 B2* | 12/2023 | Buechner | B62M 9/10 |
| 2010/0081531 A1 | 4/2010 | Esquibel | |
| 2014/0013900 A1* | 1/2014 | Shiraishi | B62M 9/105 |
| | | | 74/594.2 |
| 2014/0364259 A1* | 12/2014 | Reiter | B62M 9/10 |
| | | | 474/155 |
| 2016/0059930 A1* | 3/2016 | Fukunaga | F16H 55/08 |
| | | | 474/160 |
| 2016/0101825 A1* | 4/2016 | Braedt | B62M 9/121 |
| | | | 474/160 |
| 2017/0029066 A1 | 2/2017 | Fukunaga | |
| 2017/0183060 A1 | 6/2017 | Braedt | |
| 2017/0247081 A1* | 8/2017 | Sugimoto | F16H 55/30 |
| 2017/0370462 A1* | 12/2017 | Akanishi | B62M 9/00 |
| 2018/0105229 A1* | 4/2018 | Reinbold | B62M 9/122 |
| 2018/0170479 A1 | 6/2018 | Sugimoto | |
| 2018/0194431 A1* | 7/2018 | Iwai | F16H 55/06 |
| 2018/0299004 A1* | 10/2018 | Ohno | F16H 55/30 |
| 2019/0011037 A1* | 1/2019 | Iwai | F16H 57/05 |
| 2020/0011408 A1* | 1/2020 | Yamazaki | B62M 9/10 |
| 2020/0140033 A1* | 5/2020 | Kamada | B62M 9/10 |
| 2020/0239106 A1* | 7/2020 | Fukunaga | F16H 55/30 |
| 2020/0269953 A1* | 8/2020 | Fukunaga | F16H 55/30 |
| 2021/0031877 A1* | 2/2021 | Zubieta Andueza | B62M 9/105 |
| 2021/0031878 A1* | 2/2021 | Zubieta Andueza | B62M 9/12 |
| 2021/0031879 A1* | 2/2021 | Zubieta Andueza | B62M 9/14 |
| 2022/0063760 A1* | 3/2022 | Kamada | B62M 9/12 |
| 2022/0161893 A1* | 5/2022 | Tavares Miranda | B62M 9/124 |
| 2022/0169337 A1* | 6/2022 | Buechner | B62M 9/10 |
| 2022/0379997 A1* | 12/2022 | Ohyabu | B62M 9/105 |

FOREIGN PATENT DOCUMENTS

| | | |
|---|---|---|
| DE | 102019209454 | 1/2020 |
| DE | 202020000984 | 4/2020 |
| DE | 102019218548 | 7/2020 |
| EP | 3009339 | 4/2016 |
| EP | 3202654 | 8/2017 |
| TW | 202039301 | 11/2020 |

* cited by examiner

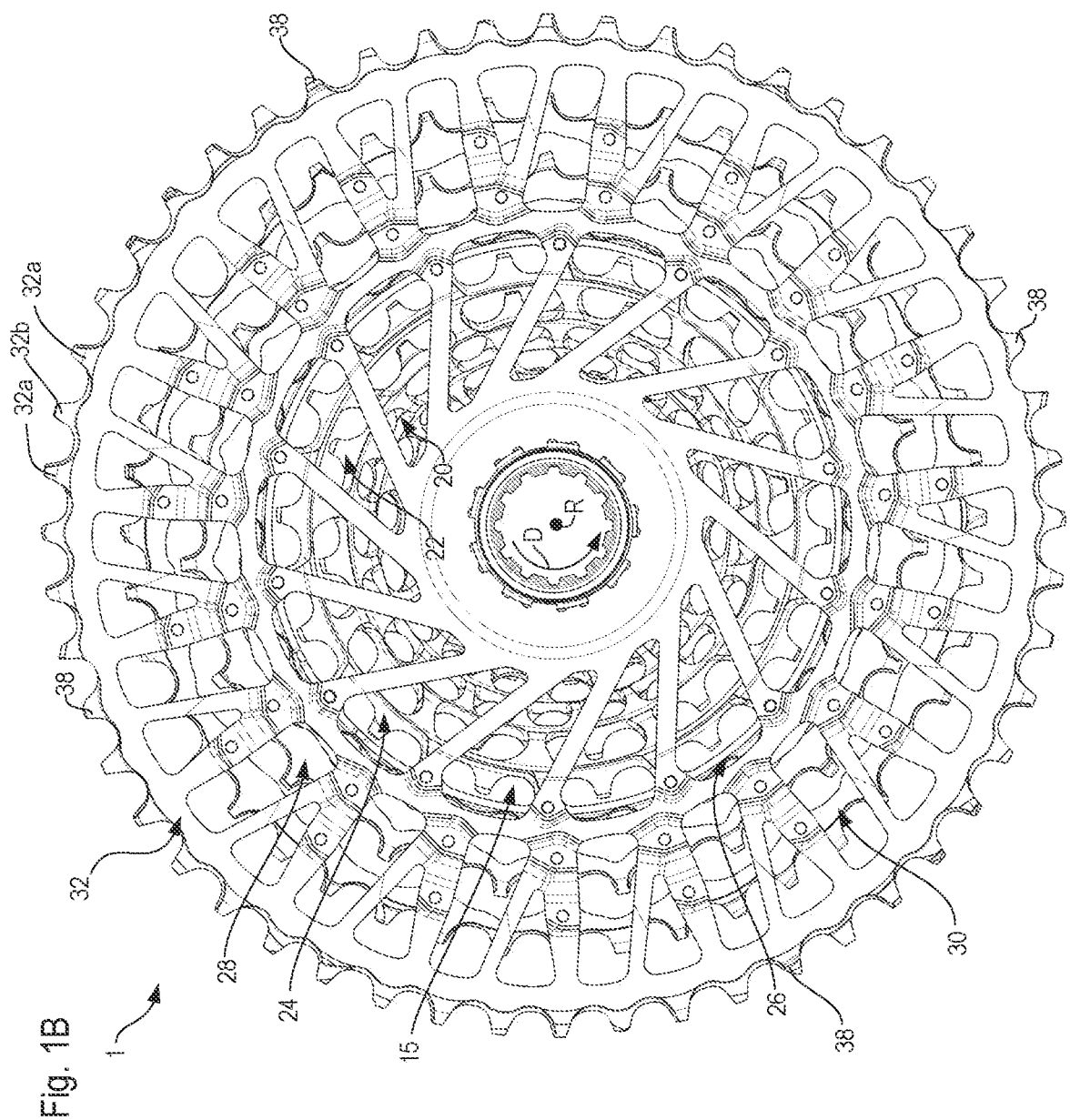
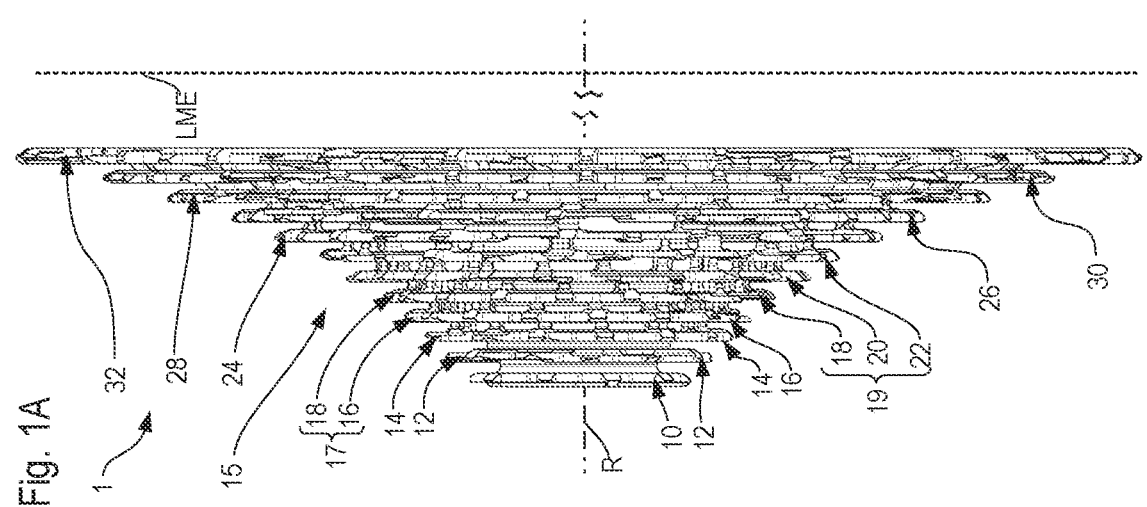

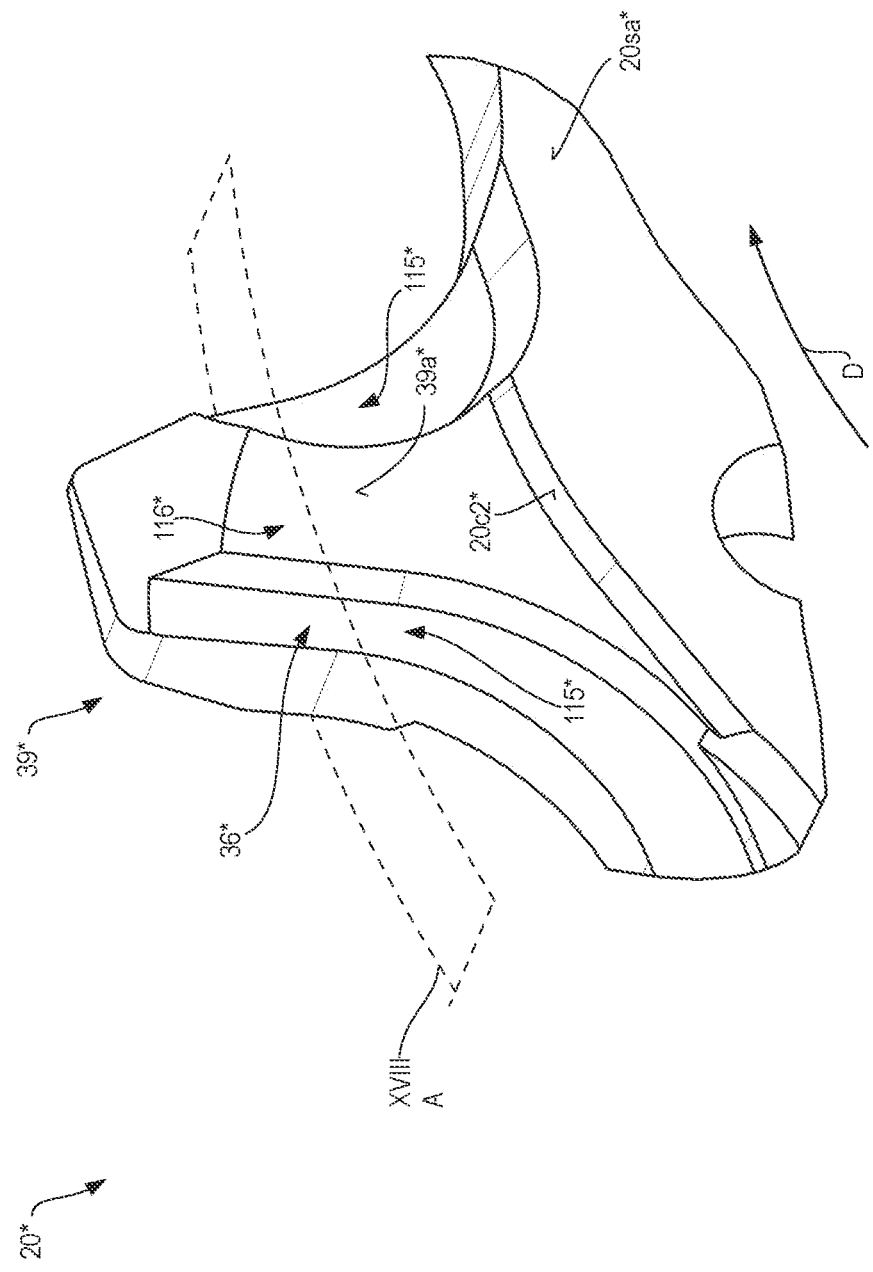

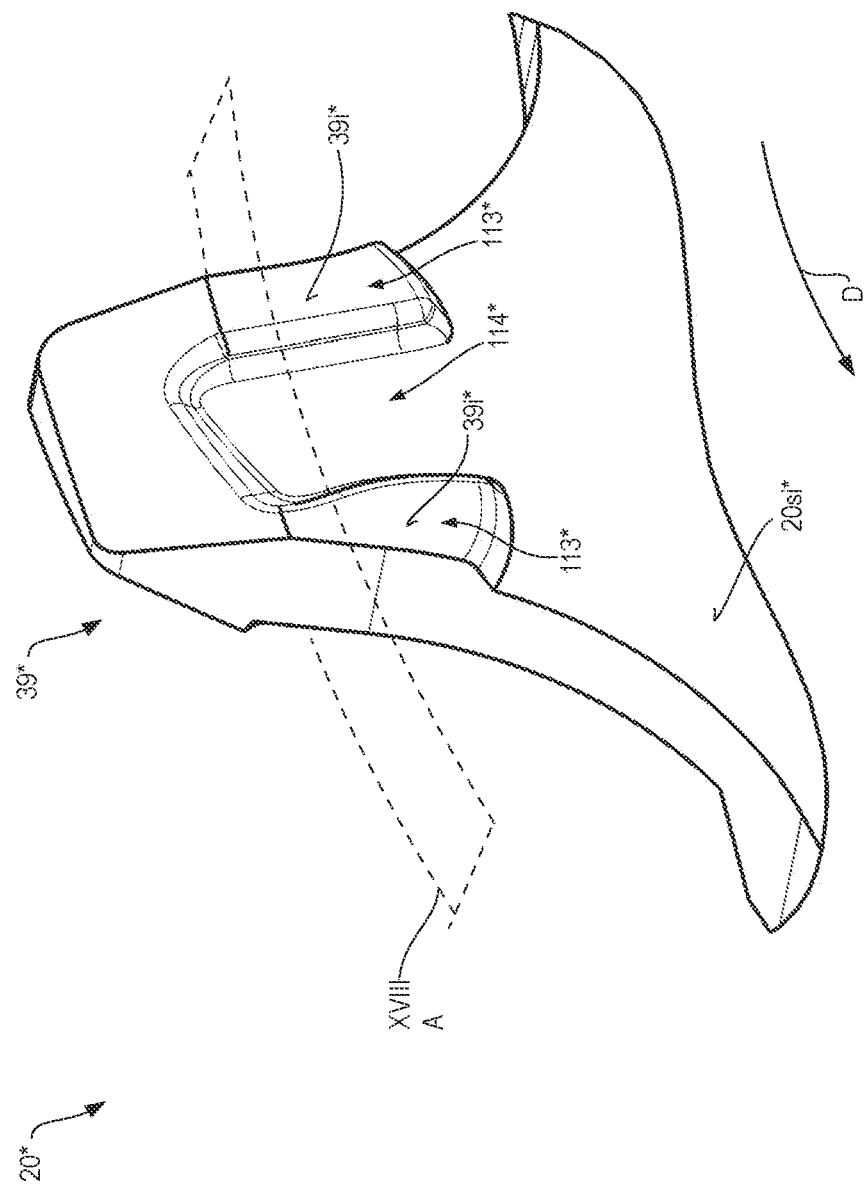

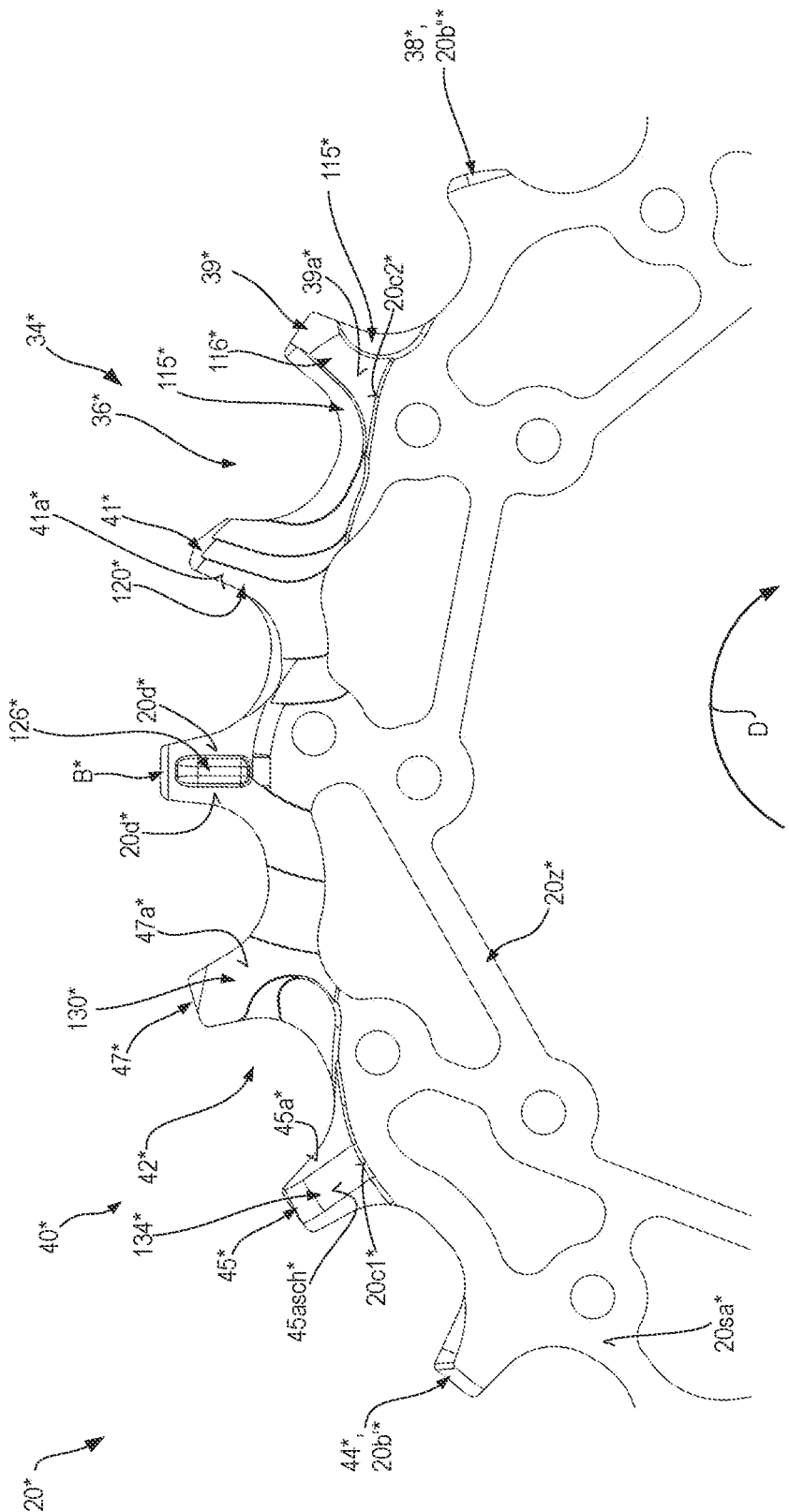

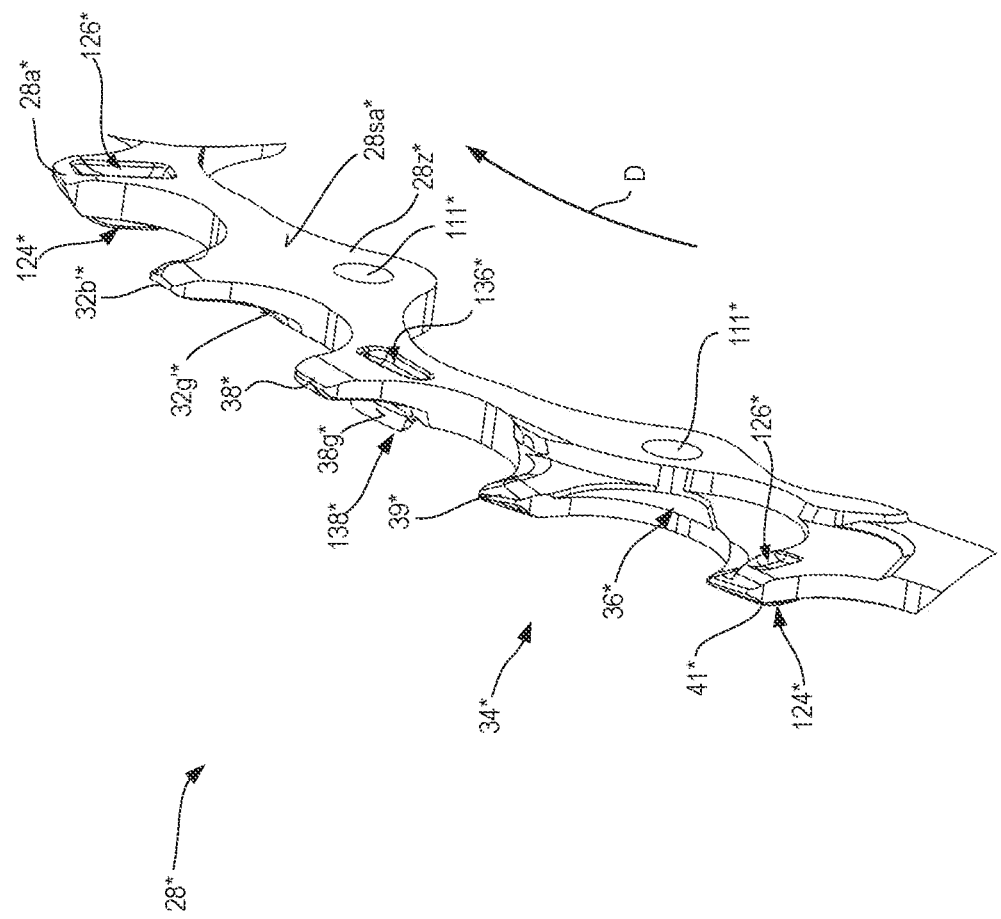

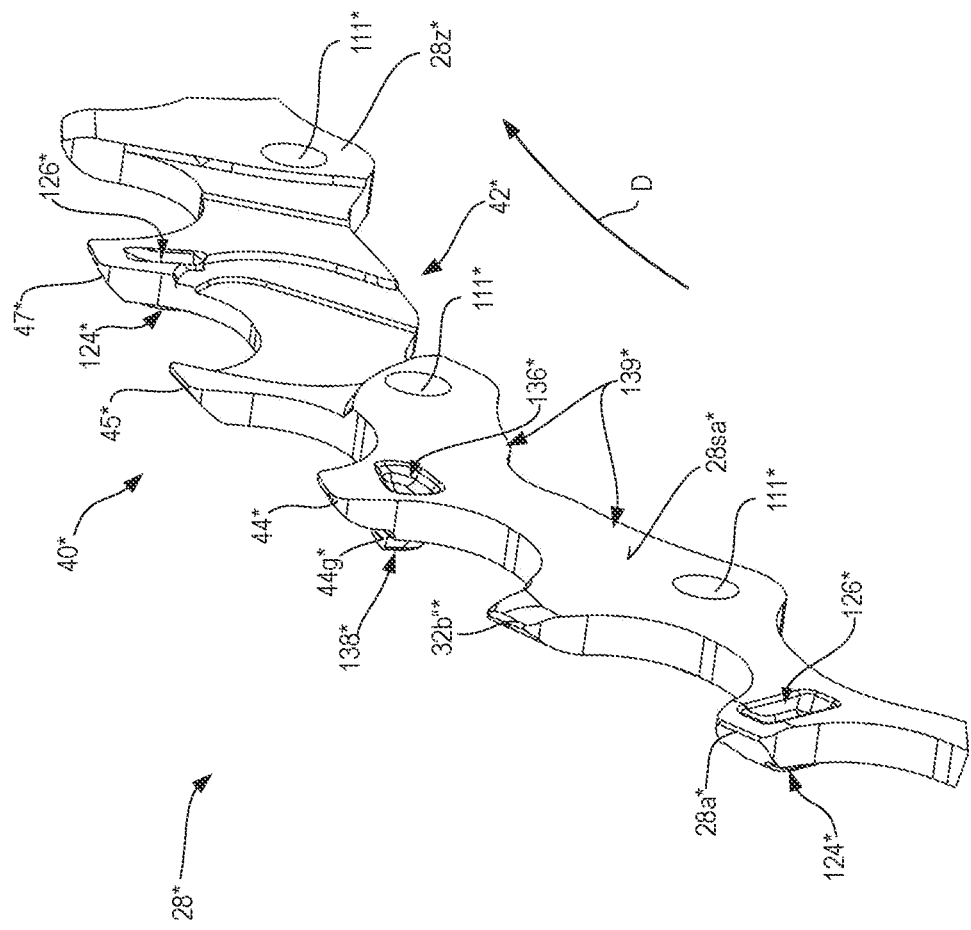

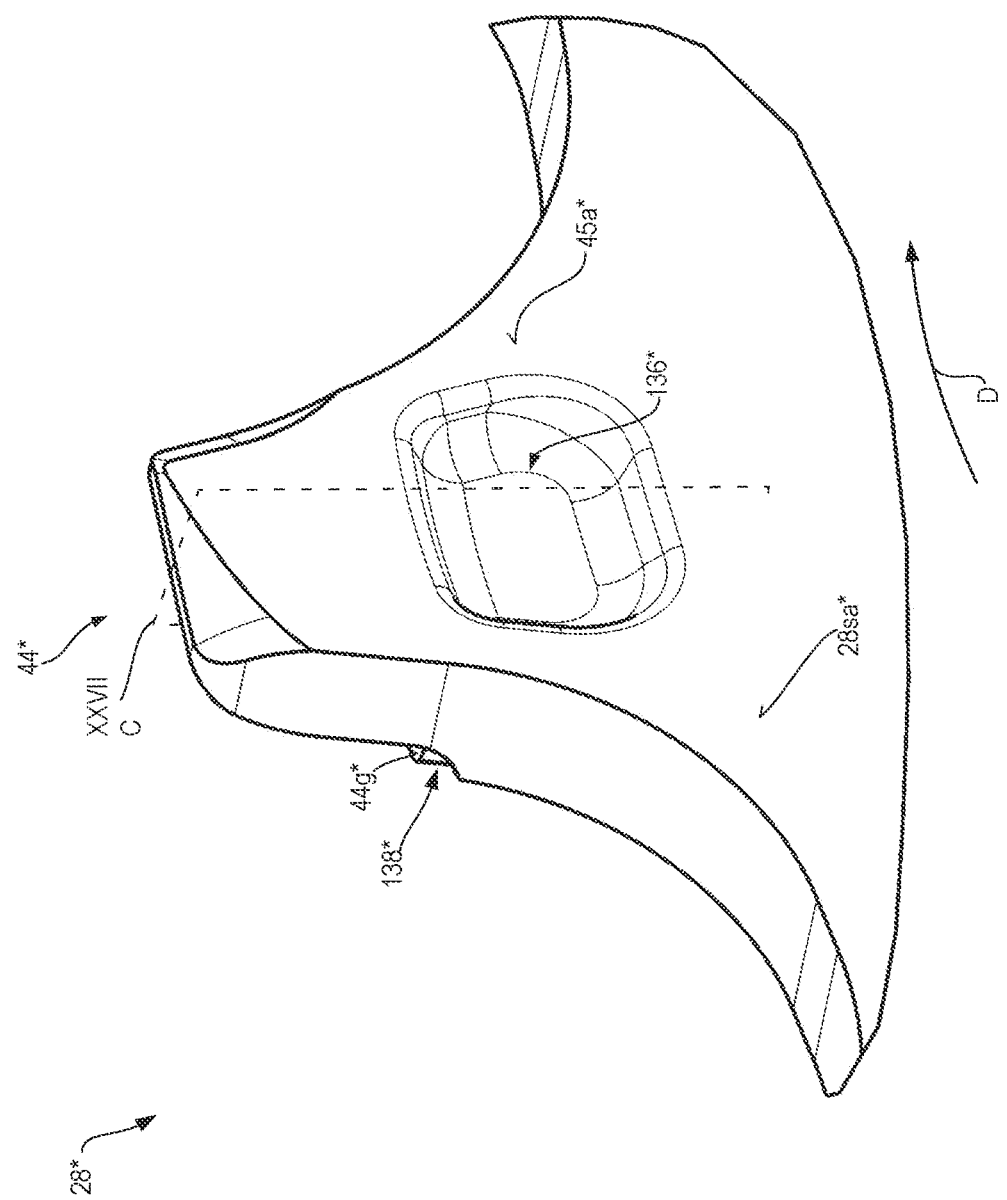

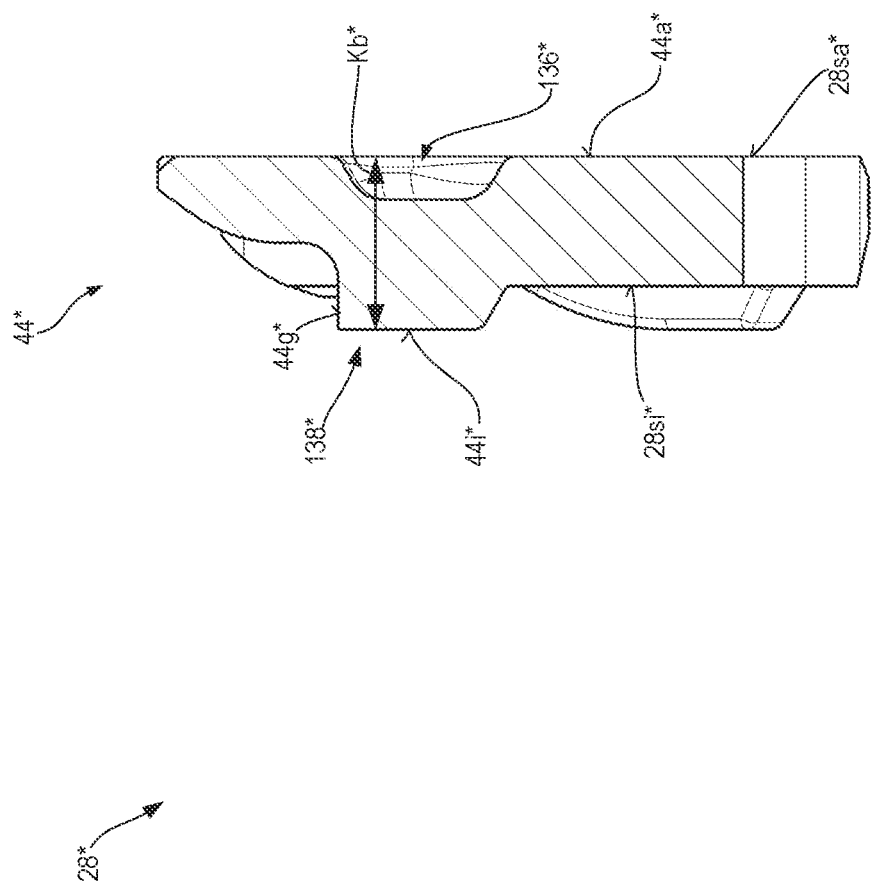

BICYCLE SPROCKET

This application is a continuation of U.S. patent application Ser. No. 17/539,118, filed Nov. 30, 2021, which claims priority to, and/or the benefit of, German patent application DE 10 2020 131 699.2 filed Nov. 30, 2020, and German patent application DE 10 2021 131 186.1, filed Nov. 29, 2021, the contents of which are incorporated herein in their entirety.

SUMMARY

A bicycle sprocket for a sprocket cassette comprising a sprocket main body extending about a virtual sprocket axis about which the sprocket is rotatable during intended operation on a bicycle. The sprocket axis defines an axial direction, radial directions orthogonal with respect thereto, and a circumferential direction encircling the axial direction. The bicycle sprocket also includes a plurality of sprocket teeth for engaging with a bicycle roller chain having inner link plate chain links and outer link plate chain links alternating along a circulating path of the bicycle roller chain. The plurality of sprocket teeth is spaced apart from one another and arranged in the circumferential direction.

The sprocket is designed to be arranged on a bicycle such that an axially outwardly facing outer side surface of the sprocket rotates clockwise as seen in an axial plan view of the outer side surface during forward travel, driven by the sprocket, of the bicycle, and such that an axially inwardly facing inner side surface, which is situated opposite the outer side surface, rotates counterclockwise as seen in an axial plan view of the inner side surface. The plurality of sprocket teeth protrudes radially outwardly from the sprocket main body. The plurality of sprocket teeth each having one axially outwardly facing outer tooth contact surface, which is designed for abutting engagement with an inner surface of a first chain link plate, and an axially inwardly facing inner tooth contact surface, which is designed for abutting engagement with an inner surface of a second chain link plate which is situated axially opposite the first chain link plate.

The sprocket has, along a section of its circumference in the region of the sprocket main body and of the sprocket teeth, an upshift region with an axial upshift recess formation in its outer side surface. The upshift region is designed and arranged to allow, on the sprocket rotating in the drive direction of rotation about the sprocket axis, a changeover of engagement of the bicycle roller chain from the sprocket to a smaller sprocket situated on the side of the outer side surface. The upshift recess formation is assigned at least one release tooth which, by way of its design, the location of its arrangement and its orientation, is designed to, in interaction with the upshift recess formation during an upshift operation, be a final tooth of the sprocket that engages between inner surfaces, which face towards one another, of a link plate pair of a chain link of the bicycle roller chain.

Additionally, or alternatively, the sprocket has, along a section of its circumference in the region of the sprocket main body and of the sprocket teeth, a downshift region with an axial downshift recess formation in its outer side surface. The downshift region is designed and arranged to allow, on the sprocket rotating in the drive direction of rotation about the sprocket axis, a changeover of engagement of the bicycle roller chain from a smaller sprocket situated on the side of the outer side surface to the sprocket. The downshift recess formation is assigned at least one catch tooth which, by way of its design, the location of its arrangement and its orientation, is designed to, in interaction with the downshift recess formation during a downshift operation, be a first tooth of the sprocket that engages between inner surfaces, which face towards one another, of a link plate pair of a chain link of the bicycle roller chain.

The sprocket has a plurality of inner link plate sprocket teeth that are each designed, owing to their axial dimensions, for engagement with an inner link plate chain link of the bicycle roller chain. The sprocket has at least one reference tooth which, among the inner link plate sprocket teeth, is the at least one sprocket tooth with the largest axial chain-guiding dimension. The reference tooth has an outer tooth contact surface, situated outside a recess formation, as an outer tooth contact reference surface. The outer tooth contact reference surface defines an axial reference position.

In the case of the at least one release tooth being formed as per a release-side stabilizing tooth is arranged in the circumferential region of extent of the upshift recess formation. The release-side stabilizing tooth has an inner tooth contact surface which has a greater axial spacing to the axial reference position than an inner tooth contact surface of the reference tooth. Additionally, or alternatively, in the case of the at least one catch tooth being formed as per a receiving-side stabilizing tooth is arranged in the circumferential region of extent of the downshift recess formation. The receiving-side stabilizing tooth has an inner tooth contact surface which has a greater axial spacing to the axial reference position than the inner tooth contact surface of the reference tooth.

In the case of the at least one release tooth being formed as per i), a release-side stabilizing tooth is arranged in the circumferential region of extent of the upshift recess formation. The axial spacing of the inner tooth contact surface of the release-side stabilizing tooth arranged in the circumferential region of the upshift recess formation to the outer tooth contact surface of the at least one release tooth is not less than the chain-guiding dimension of the reference tooth. Additionally, or alternatively, in the case of the at least one catch tooth being formed as per a receiving-side stabilizing tooth is arranged in the circumferential region of extent of the downshift recess formation. The axial spacing of the inner tooth contact surface of the receiving-side stabilizing tooth arranged in the circumferential region of the downshift recess formation to the outer tooth contact surface of the at least one catch tooth is not less than the chain-guiding dimension of the reference tooth.

BRIEF DESCRIPTION OF THE DRAWINGS

The present disclosure is explained in more detail below with reference to the accompanying drawings. In the drawings:

FIG. 1A shows the sprocket cassette from FIG. 1 in a viewing direction orthogonal to the sprocket axis;

FIG. 1B shows the sprocket cassette from FIG. 1 in an opposite viewing direction away from the longitudinal central plane;

FIG. 18B shows a perspective view of the outer side of the alternative release-side stabilizing tooth 39*, produced by non-cutting deformation, on the sprocket 20* of FIG. 18A;

FIG. 18C shows a perspective view of the inner side of the alternative stabilizing tooth 39*, produced by non-cutting deformation, on the sprocket 20* of FIGS. 18A and 18B;

FIG. 22D shows a plan view of the outer side of a circumferential segment of the sprocket 20* produced by non-cutting deformation with 21 teeth, wherein the circumferential segment has the teeth of FIGS. 18A to 22C;

FIG. 23A shows a perspective view of the outer side of an upshift region 34* of a sprocket 28* produced in an alternative manner by a non-cutting shaping process and with 38 teeth, wherein the upshift region 34* is situated in the circumferential region XXIII of FIG. 25;

FIG. 24A shows a perspective view of the outer side of a downshift region 40* of the produced sprocket 28* of FIGS. 23A and 23B, wherein the downshift region 40* is situated in the circumferential region XXIV of FIG. 25;

FIG. 27A shows a perspective view of the outer side of the further catch tooth 44* situated at the location XXVII in FIG. 25 and produced by non-cutting deformation;

FIG. 27C shows a cross section through the further catch tooth 44* of FIGS. 27A and 27B in a section plane XXVII C, which encompasses the sprocket axis R, of FIGS. 27A and 27B;

DETAILED DESCRIPTION

Figure 1:
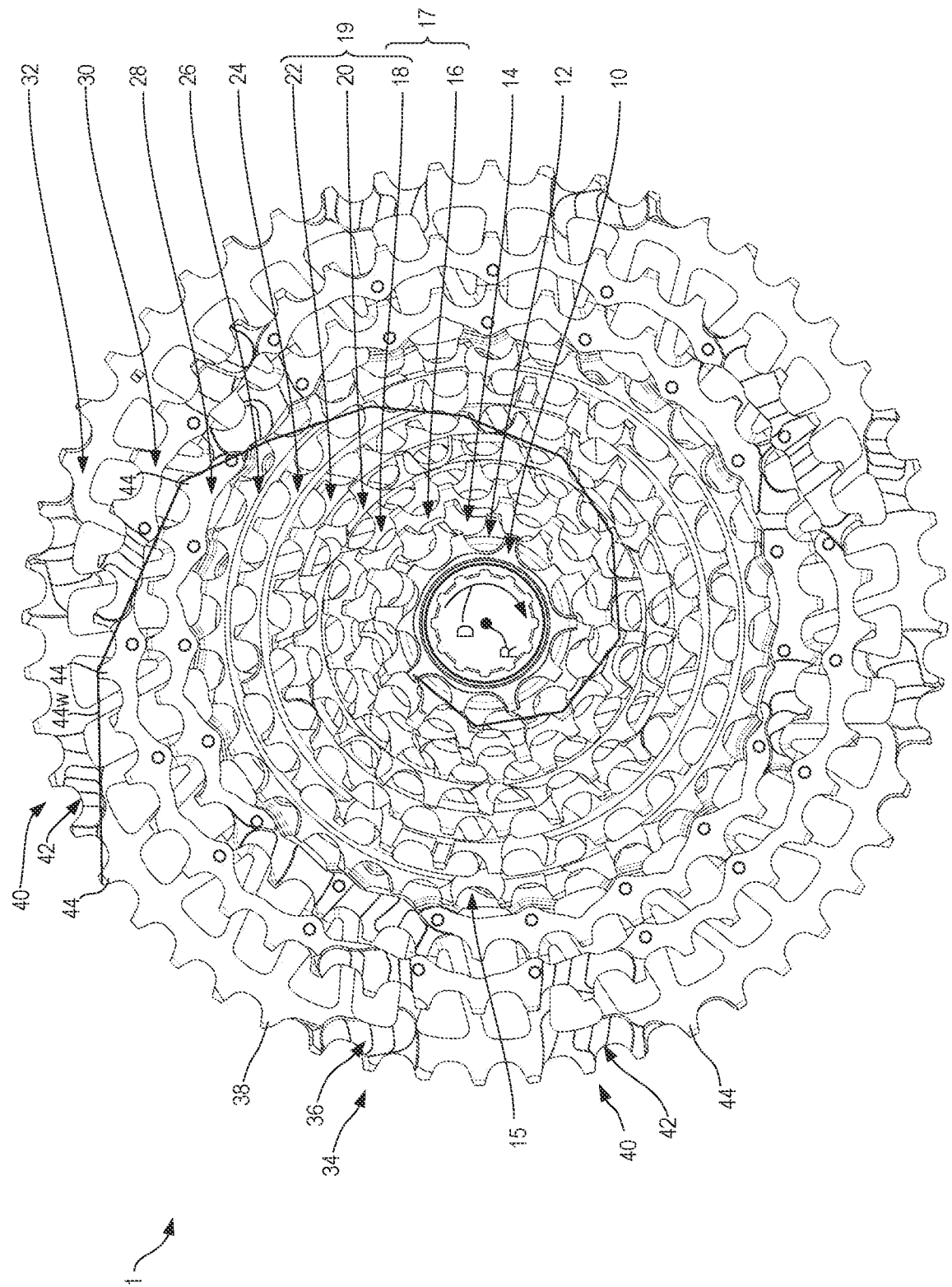
FIG. 1 shows a bicycle rear-wheel sprocket cassette according to an embodiment in a reference view along the sprocket axis, wherein sprockets of increasing size are arranged at increasing distance from the viewer.

The present disclosure relates to a bicycle sprocket for a sprocket cassette. The sprocket has a sprocket main body extending about a virtual sprocket axis about which the sprocket is rotatable during intended operation on a bicycle. Here, the sprocket axis defines an axial direction, radial directions orthogonal with respect thereto, and a circumferential direction about the sprocket axis. The sprocket further comprises a plurality of sprocket teeth, which are arranged spaced apart from one another in the circumferential direction, for engagement with a bicycle roller chain. The sprocket relates here to an engagement with a bicycle roller chain of conventional, known structure which, in a manner known per se, has inner link plate and outer link plate chain links alternately following one another along its chain circulating path. The bicycle roller chain will hereinafter also be referred to, merely for the sake of simplicity, as "bicycle chain" or "chain".

For the sake of simplicity, sprockets with odd numbers of teeth will hereinafter also be referred to as "odd-numbered sprockets", and accordingly, sprockets with even numbers of teeth will be referred to as "even-numbered sprockets".

The sprocket is designed to be arranged on a bicycle such that an axially outwardly facing outer side surface of the sprocket rotates clockwise as seen in an axial plan view of the outer side surface during a forward travel of the bicycle driven by the sprocket, and such that an axially inwardly facing inner side surface, which is situated opposite the outer side surface, rotates counterclockwise as seen in an axial plan view of the inner side surface. On a bicycle which has been assembled and is ready for operation, the outer side surface would point outwards, that is to say away from a bicycle longitudinal central plane that is orthogonal with respect to the sprocket axis, and the inner side surface would point inwards towards the bicycle longitudinal central plane. Since the manner in which a sprocket is to be arranged on the bicycle is immediately and unequivocally clear to a person skilled in the art viewing the sprocket from the structural design of the sprocket, this description of an axial orientation of the sprocket and of its constituent parts and/or sections will be used in the present application for the purposes of describing the sprocket.

The sprocket teeth project radially outwards from the sprocket main body. At least a plurality of sprocket teeth each have an axially outwardly facing outer tooth contact surface configured for abutting engagement with an inner surface of a first chain link plate, and an axially inwardly facing inner tooth contact surface configured for abutting engagement with an inner surface of a second chain link plate which is situated axially opposite the first chain link plate.

Such bicycle sprockets, or hereinafter referred to for short as "sprockets", are well known in the prior art. They are disclosed for example in US 2017/0029066 A1, DE 10 2016 007 725 A1, EP 3 202 654 A1 and DE 10 2017 220 674 A1.

Here, the shifting of the chain inwards from an axially adjacent smaller sprocket (downshifting), which in accordance with the nomenclature discussed above is adjacent to the bicycle sprocket to the outside, and the shifting of the chain outwards from the bicycle sprocket onto the adjacent smaller sprocket (upshifting), is a problem that experts are constantly addressing. The aim is to shift the chain as smoothly, jerk-free, and precisely as possible between the sprocket discussed here and the axially adjacent smaller sprocket. Here, the precision of the changeover of the chain encompasses the boundary condition that the chain should depart from the sprocket in an outward direction, and/or move on to the sprocket proceeding from the outside, only in a respectively predetermined circumferential region. This problem becomes more difficult to solve with increasing packaging density of a plurality of axially successive sprockets in a sprocket cassette.

Shifting takes place at the rear axle in a manner known per se by means of a rear gearshift mechanism, which has an axially displaceable derailleur with a chain-guiding roller and a chain-tensioning roller. The chain-guiding roller is generally placed in a coplanar arrangement with a target sprocket, onto which the bicycle roller chain is to be shifted, by actuation by the bicycle rider. The shifting of the chain from a relatively large starting sprocket to an axially adjacent smaller target sprocket during upshifting results in chain length being freed up that is no longer bound by tooth meshing engagement with the sprocket. During downshifting, it is initially the case that free chain length is bound by the engagement with the larger target sprocket. The chain-tensioning roller, which is displaceable counter to spring preload in the plane of extent of the chain-guiding roller, serves for taking up and letting out such chain length differences and thus ensures an adequate tension of the chain.

For the most precise possible upshifting of the chain from the sprocket in an outward direction onto the axially adjacent smaller sprocket, the sprocket may have, along a section of its circumference in the region of the sprocket main body and of the sprocket teeth, at least one upshift region with an axial upshift recess formation in its outer side surface, wherein the upshift region is designed and arranged to allow, on the sprocket rotating in the drive direction of rotation about the sprocket axis, a changeover of engagement of the bicycle roller chain from the sprocket to a smaller sprocket situated on the side of the outer side surface. Such upshift recess formations are also already known from the prior art cited above. The upshift recess formation makes it possible for the bicycle chain, after only a relatively short axial movement, to end the engagement of the sprocket teeth between link plates of its chain links and move or descend, adjacent to the sprocket teeth axially to the outside, in a radially inward direction to the smaller diameter sprocket. The upshift recess formation thus forms a receiving space for the descending chain, which, on the same sprocket without a corresponding upshift recess formation, would have to be deflected axially to a greater extent, by the dimension of the recess, over the same chain length segment. The upshift recess formation makes it possible to adhere to the tangential condition which is of importance for a smooth upshift and which is known to experts.

For the most precise possible upshift of the chain in an outward direction from the sprocket onto the adjacent smaller sprocket, the upshift recess formation is assigned at least one release tooth. The at least one release tooth is, by way of its design, the location of its arrangement and its orientation, designed to, in interaction with the upshift recess formation during an upshift operation, be the final tooth of the sprocket that engages between inner surfaces, which point towards one another, of a link plate pair of a chain link of the bicycle roller chain.

If more than one release tooth is assigned to an upshift region and thus to an upshift recess formation, the multiple release teeth directly follow one another in the circumferential direction. In one embodiment, an upshift region and the upshift recess formation thereof may be assigned two release teeth. Since, owing to the axial movement of the bicycle chain outwards to the next-smaller sprocket that is required during upshifting, a release tooth, as the tooth that is actually the final tooth that engages with the bicycle chain, engages into an outer link plate chain link of the bicycle chain, one of two release teeth that are directly adjacent in the circumferential direction reliably engages, during an upshift operation, with an outer link plate chain link and can thus release the chain to the outside.

Where the following description refers to the at least one release tooth, this thus refers, in the case of multiple release teeth, to that release tooth of an upshift region which is outermost counter to the drive direction of rotation.

In a further embodiment, an upshift region and the upshift recess formation thereof may be assigned exactly one release tooth. This is expedient and advantageous in particular if a bicycle chain is to be released from the sprocket, in an outward direction to the next-smaller sprocket, with a defined relative position of its chain link sequence composed of inner link plate and outer link plate chain links, which follow one another in alternating fashion, relative to the releasing sprocket. If an upshift region and its upshift recess formation is assigned only exactly one release tooth, the single release tooth is both the below-mentioned release tooth that is outermost counter to the drive direction of rotation, and the below-mentioned release tooth that is outermost in the drive direction of rotation, of the upshift region thereof.

It is alternatively or preferably additionally possible that, for the most precise possible downshifting in an inward direction onto the sprocket from a smaller-diameter sprocket that is adjacent to the outside, the sprocket may have, along a section of its circumference in the region of the sprocket main body and of the sprocket teeth, a downshift region with an axial downshift recess formation in its outer side surface, wherein the downshift region is designed and arranged to allow, on the sprocket rotating in the drive direction of rotation about the sprocket axis, a changeover of engagement of the bicycle roller chain onto the sprocket from a smaller sprocket situated on the side of the outer side surface. Such downshift recess formations are also known, from the prior art cited above, on the outer side surface of the sprocket. That which has been stated with regard to upshifting correspondingly applies mutatis mutandis: the downshift recess formation allows the bicycle chain to axially approach the sprocket from the outside, beyond an envelope of the outer side surface of the sprocket, without colliding. Therefore, during downshifting, the bicycle chain can axially enter the downshift recess formation, which makes it easier for the chain to be caught on the sprocket.

For the most precise possible gearshifts, the downshift recess formation is assigned at least one catch tooth. The at least one catch tooth is, by way of its design, the location of its arrangement and its orientation, designed to, in interaction with the downshift recess formation during a downshift operation, be the first tooth of the sprocket that engages between inner surfaces, which face towards one another, of a link plate pair of a chain link of the bicycle roller chain.

If more than one catch tooth is assigned to a downshift region and thus to a downshift recess formation, the multiple catching teeth directly follow one another in the circumferential direction. In one embodiment, a downshift region and the downshift recess formation thereof may be assigned two catching teeth. Since, owing to the axial approach of the bicycle chain inwards from the next-smaller sprocket to the receiving sprocket that is required during downshifting, a catch tooth, as the tooth that is actually the first tooth that engages with the bicycle chain, engages into an outer link plate chain link of the bicycle chain, one of two catching teeth that are directly adjacent in the circumferential direction reliably engages, during a downshift operation, with an outer link plate chain link and can thus catch the chain for engagement with the sprocket.

Where the following description refers to the at least one catch tooth, this thus refers, in the case of multiple catching teeth, to that catch tooth of a downshift region which is outermost in the drive direction of rotation.

In a further embodiment, a downshift region and the downshift recess formation thereof may be assigned exactly one catch tooth. This is expedient and advantageous in particular if a bicycle chain is to be caught by the sprocket with a defined relative position of its chain link sequence composed of inner link plate and outer link plate chain links, which follow one another in alternating fashion, relative to the sprocket. If a downshift region and its downshift recess formation is assigned only exactly one catch tooth, the single catch tooth is both the below-mentioned catch tooth that is outermost in the drive direction of rotation, and the below-mentioned catch tooth that is outermost counter to the drive direction of rotation, of the downshift region thereof.

Since the outer link plates of outer link plate chain links of a bicycle chain receive the inner link plates of inner link plate chain links between them, inner link plate chain links have a smaller clearance width available for the engagement of a sprocket tooth than outer link plate chain links. The sprocket has a plurality of inner link plate sprocket teeth that are each designed, owing to their axial dimensions, for engagement with an inner link plate chain link of the bicycle roller chain. This includes the case where each sprocket tooth of the sprocket is designed for engagement with an inner link plate chain link and is thus an inner link plate sprocket tooth.

A reference tooth, of which the sprocket preferably has at least one, can be used as a further aid for describing the present sprocket. Here, the reference tooth is that at least one inner link plate sprocket tooth which, among the inner link plate sprocket teeth, has the largest axial chain-guiding dimension. Here, the reference tooth has an outer tooth contact surface as an outer tooth contact reference surface. The outer tooth contact reference surface defines an axial reference position. The outer tooth contact reference surface is preferably situated outside a recess formation, that is, it is not recessed.

A tooth contact surface, like the tooth contact reference surface of the reference tooth, is a surface that is merely designed for abutting engagement with an inner surface of a chain link plate, which faces towards the engagement space between the chain link plates of a chain link, and which is situated axially adjacent to the tooth contact surface. This means that it is that surface section of the sprocket tooth, which is arranged radially in a region which, during intended engagement with the bicycle roller chain by projecting into the engagement space between two chain link plates, is axially adjacent to a chain link plate and which, within this radial region, projects axially furthest towards the adjacent chain link plate. Here, the outer tooth contact surface projects axially furthest outwards, and the inner tooth contact surface projects axially inwards. The chain-guiding dimension of a sprocket tooth is the axial spacing between the outer and the inner tooth contact surfaces of the sprocket tooth.

A tooth contact surface is preferably situated inwards from the respective tooth tip with a radial spacing and situated radially outwards from the root circle of the sprocket with a radial spacing. Based on the consideration that a tooth tip extends radially outwards proceeding from the root circle of the sprocket, the tooth contact surface is situated preferably in a region from 20% to 80% of the tooth height proceeding from the root circle, particularly preferably in a region from 30 to 75% of the tooth height, even more preferably in a region from 40 to 70% of the tooth height. In this way, distorting influences of ramp formations that project out axially in the region of the tooth root, and of deflecting surfaces that are formed in the region of the tooth tip, and of other facet surfaces, in the determination of the tooth contact surface and the axial position thereof along the sprocket axis can be avoided. This applies to the inner and to the outer tooth contact surfaces.

The inner and the outer tooth contact surfaces of one and the same tooth may be arranged offset with respect to one another in a radial direction and in the circumferential direction, that is to say they need not lie on a common straight axial connecting line, although this is preferred. For this reason, the tooth width, as the axial dimension of a tooth along a measurement path parallel to the sprocket axis, and the chain-guiding dimension may differ for one and the same tooth. The chain-guiding dimension, as the axial spacing between the inner and outer tooth contact surfaces, is a measure for the axial movement clearance that a chain link engaged by the sprocket tooth has at the sprocket tooth. In general, the axial movement clearance is the clearance width between the inner surfaces of the chain link plates of the chain link minus the chain-guiding dimension of the engaging tooth.

The question of whether or not a tooth contact surface actually comes into abutting contact with an inner surface of the axially adjacent chain link plate as the tooth protrudes into the engagement space between two parallel chain link plates of a chain link is dependent on numerous further factors such as the engagement situation between further sprocket teeth, which are situated adjacent to the sprocket tooth in question in the circumferential direction, and the bicycle chain.

In general, as a sprocket tooth protrudes into the engagement space, which is delimited axially between two chain link plates and in a circumferential direction between two chain rollers, of a chain link of the chain, of an inner and an outer tooth contact surfaces of the sprocket tooth, in any case only one tooth contact surface of inner and outer tooth contact surfaces is simultaneously in abutting contact with an inner surface of one of the two axially adjacent chain link plates, because the chain-guiding dimension of the sprocket tooth is conventionally smaller than the clearance width of the chain link into which the sprocket tooth is to engage.

The abovementioned gearshift function teeth, that is to say release tooth and catch tooth, are preferably arranged axially as close as possible to the axially adjacent smaller sprocket and are furthermore formed axially with a smaller chain-guiding dimension than conventional sprocket teeth in order to allow the bicycle chain to assume a position displaced axially as far as possible to the outside despite engagement of the release tooth or of the catch tooth into the engagement space of a chain link. The tooth contact surface of the at least one release tooth, in particular of that release tooth of the upshift region thereof which is outermost counter to the drive direction of rotation, and/or of the at least one catch tooth, in particular of that catch tooth of the downshift region thereof which is outermost in the drive direction of rotation, may thus be that tooth contact surface of the sprocket which is situated axially furthest to the outside. This is not intended to rule out that the tooth contact surfaces of further teeth, for example of the at least one reference tooth, are situated at the same axial position, and thus equally far to the outside, as the tooth contact surface of the at least one release tooth, in particular of that release tooth of the upshift region thereof which is outermost counter to the drive direction of rotation, and/or of the at least one catch tooth, in particular of that catch tooth of the downshift region thereof which is outermost in the drive direction of rotation.

Counter to the drive direction of rotation, at least one sprocket tooth is adjacent to the at least one release tooth, in particular to that release tooth of the upshift region thereof which is outermost counter to the drive direction of rotation, which at least one sprocket tooth is situated in the upshift recess formation and the outer tooth contact surface of which at least one sprocket tooth is, owing to the upshift recess formation, arranged offset towards the inner side surface with respect to the outer tooth contact surface of the at least one release tooth, in particular of that release tooth of the upshift region thereof which is outermost counter to the drive direction of rotation, and/or with respect to the tooth contact reference surface. Likewise, at least one sprocket tooth is adjacent, in the drive direction of rotation, to the at least one catch tooth, in particular to that catch tooth of the downshift region thereof which is outermost in the drive direction of rotation, which at least one sprocket tooth is situated in the downshift recess formation and the outer tooth contact surface of which at least one sprocket tooth is, owing to the downshift recess formation, arranged offset towards the inner side surface with respect to the outer tooth contact surface of the at least one release tooth, in particular of that release tooth of the upshift region thereof which is outermost counter to the drive direction of rotation, and/or with respect to the tooth contact reference surface.

This results in a circumferential section along the sprocket circumference in which the bicycle chain has axially significant movement clearance despite respective engagement of sprocket teeth into the engagement space of chain links of the bicycle chain. This movement clearance may under adverse operating conditions lead to an undesired descent of the chain from the sprocket towards the outside. It is the desirable intention that, during upshifts, the chain descends from the sprocket in the upshift region, in particular in the region of the upshift recess formation. Owing to the described axial movement clearance, it is possible, for example if the derailleur is moved outwards when the sprocket is in a disadvantageous rotational position with regard to upshifting, for the chain to descend outside the upshift region, because only weak axial guidance of the chain is provided owing to the movement clearance that is enlarged over a circumferential segment.

It is an object of the present disclosure to safeguard against such an undesired descent or to prevent such an undesired descent.

According to the present disclosure, to achieve this object, at least one stabilizing tooth is provided on the sprocket described above, which due to its shape, location and orientation, stabilizes the chain in engagement with the sprocket such that, irrespective of the time at which a derailleur is actuated during a rotation of the sprocket about the sprocket axis, the chain engaged by the sprocket descends from the sprocket in an outward direction only in the region of the upshift recess formation.

If both the above-stated at least one release tooth assigned to the upshift recess formation and the at least one catch tooth assigned to the downshift recess formation are implemented on the sprocket, the at least one stabilizing tooth is situated in a circumferential segment which, starting from the at least one catch tooth, in particular from that catch tooth of the downshift region thereof which is outermost in the drive direction of rotation, extends in the drive direction of rotation to the at least one release tooth.

In the case of the above-described at least one release tooth assigned to the upshift recess formation being formed, a release-side stabilizing tooth may be arranged in the circumferential extent region of the upshift recess formation for the purposes of stabilizing the chain in engagement with the sprocket. According to a first embodiment of the release-side stabilizing tooth, the release-side stabilizing tooth has an inner tooth contact surface which has a greater axial spacing to the axial reference position than an inner tooth contact surface of the reference tooth. It is preferable for only exactly one release-side stabilizing tooth to be arranged in the circumferential region of extent of the upshift recess formation.

By virtue of the fact that the inner tooth contact surface of the release-side stabilizing tooth is further away from the axial reference position than the inner tooth contact surface of the reference tooth—as a reminder, this is the tooth that has the largest chain-guiding dimension among the inner link plate sprocket teeth—and by virtue of the fact that the outer tooth contact surface of the release-side stabilizing tooth, owing to the arrangement thereof in the region of the upshift recess formation, is in any case offset inwards with respect to the outer tooth contact reference surface and/or with respect to the tooth contact surface of the at least one release tooth, in particular of that release tooth of the upshift region thereof which is outermost counter to the drive direction of rotation, the inner tooth contact surface of the release-side stabilizing tooth can, during the engagement thereof with a chain link, come into abutting contact with an inner surface of a chain link plate of the chain link, such that the release-side stabilizing tooth can force the bicycle chain inwards in a circumferential region in the vicinity of which the bicycle chain otherwise has axial movement clearance towards the outside. In this respect, when no gearshift operation is desired, the release-side stabilizing tooth can, by way of its further inwardly offset inner tooth contact surface, counteract and limit the axial movement play of the chain towards the outside.

Alternatively, or preferably in addition, in the case of the at least one catch tooth assigned to the downshift recess formation being formed, a stabilizing tooth on the receiving side may be arranged in the circumferential region of extent of the downshift recess formation. The receiving-side stabilizing tooth acts in the region of the downshift recess formation in the manner in which the release-side stabilizing tooth acts in the region of the upshift recess formation. Therefore, according to a first embodiment of the receiving-side stabilizing tooth, the receiving-side stabilizing tooth has an inner tooth contact surface which has a greater axial spacing to the axial reference position than the inner tooth contact surface of the reference tooth. It is preferable for only exactly one receiving-side stabilizing tooth to be arranged in the circumferential region of extent of the downshift recess formation.

The receiving-side stabilizing tooth, owing to its arrangement in the region of the downshift recess formation, has an outer tooth contact surface which is offset inwards with respect to the outer tooth contact reference surface and/or with respect to the tooth contact surface of the at least one catch tooth, in particular of that catch tooth of the downshift region thereof which is outermost in the drive direction of rotation, and therefore generally does not come into abutting engagement, by way of its outer tooth contact surface, with an inner surface of a chain link plate of a chain link in any case during normal engagement operation of the sprocket in the absence of a gearshift operation. By way of its inner tooth contact surface, which is situated axially further remote from the outer tooth contact reference surface than the inner tooth contact surface of the reference tooth, the receiving-side stabilizing tooth can, by contrast, come into abutting engagement with an inner surface of a chain link plate of a chain link. As already discussed above for the release-side stabilizing tooth, the receiving-side stabilizing tooth can thus force the bicycle chain inwards during engagement and thus counteract and limit an outwards axial movement play of the bicycle chain, which is present in the region of the downshift recess formation, when no gearshift operation is desired.

Therefore, the at least one stabilizing tooth forces the chain away from the recess formation, in the circumferential region of extent of which the tooth is situated, in the direction of the inner side surface of the sprocket.

Since the release-side stabilizing tooth and the receiving-side stabilizing tooth are arranged in the circumferential region of the respectively assigned recess formation of upshift and downshift recess formation, they do not disrupt an upshift operation initiated at an advantageous point in time by axial outwards movement of the derailleur, but they can delay an upshift operation initiated at a disadvantageous point in time, for example immediately after the release tooth has passed the chain-guiding roller, until a release tooth of the sprocket rotating in the drive direction of rotation approaches the chain-guiding roller again.

As a further positive technical effect of the design of the release-side and/or receiving-side stabilizing tooth in accordance with the first embodiment described above, the larger chain-guiding dimension of the respective stabilizing tooth achieved by means of the described arrangement of the respective inner tooth contact surface also makes a greater tooth width possible, in relation to a conventional arrangement of the inner tooth contact surface at the axial position of the inner tooth contact surface of the reference tooth, if the outer and the inner tooth contact surface overlap radially and in a circumferential direction at the stabilizing tooth, as is preferred. Due to the then enlarged tooth width, a stabilizing tooth according to the disclosure has increased strength and thus a reduced tendency for wear under the action of a specified load.

The above-described first embodiment of the release-side and/or receiving-side stabilizing tooth may basically be used both on an even-numbered sprocket and on an odd-numbered sprocket.

For odd-numbered sprockets, in the case of which it is intrinsic in the device that, in successive revolutions of the sprocket, each tooth successively engages in alternating fashion with different chain link types, inner link plate chain links and outer link plate chain links, of the bicycle chain, it is consequently the case that each tooth is an inner link plate sprocket tooth. On an odd-numbered sprocket, too, a sprocket tooth with the largest chain-guiding dimension can be regarded as a reference tooth for the purposes of describing the design or shape of the stabilizing tooth.

The above-stated problem, whereby an initiation of an upshift operation by a bicycle rider at the time of a rotational position of the sprocket which is disadvantageous for the initiated upshift operation can lead to an undesired descent of the chain in a sector of the sprocket that is not intended for this, arises also and specifically in the case of odd-numbered sprockets. In general, the odd-numbered sprocket has a plurality of gearshift regions which follow one another in the circumferential direction, and which are composed of in each case one downshift region and the next upshift region that follows the downshift region in the drive direction of rotation. In general, at least two gearshift regions formed on different circumferential segments are designed such that the respective release teeth in the different upshift regions engage with different chain link types during one revolution of the sprocket. A corresponding situation preferably also applies to the at least one catch tooth that is possibly provided. If an upshift operation is now initiated such that an upshift region with a release tooth that is presently in engagement with an inner link plate chain link, or is engaging therewith in the present revolution of the sprocket, as the next upshift region to pass the derailleur, then it is advantageous if the upshift operation is delayed by the at least one stabilizing tooth until an upshift region whose release tooth is in engagement with an outer link plate chain link, or is engaging therewith in the present revolution of the sprocket, passes the derailleur.

Therefore, alternatively or in addition to the first embodiment, the above object can also be achieved by means of a second embodiment of a stabilizing tooth, according to which the axial spacing of the inner tooth contact surface of the release-side stabilizing tooth arranged in the circumferential region of the upshift recess formation to the outer tooth contact surface of the at least one release tooth, in particular of that release tooth of the upshift region thereof which is outermost counter to the drive direction of rotation, is not smaller than the largest chain-guiding dimension of an inner link plate sprocket tooth. Alternatively or preferably in addition, the axial spacing of the inner tooth contact surface of the receiving-side stabilizing tooth arranged in the circumferential region of the downshift recess formation to the outer tooth contact surface of the at least one catch tooth, in particular of that catch tooth of the downshift region thereof which is outermost in the drive direction of rotation, may be configured not to be smaller than the largest chain-guiding dimension of an inner link plate sprocket tooth. The inner link plate sprocket tooth with the largest chain-guiding dimension is, as per the above definition, the abovementioned reference tooth.

By contrast to the first embodiment of a stabilizing tooth, in which the relative position of the inner tooth contact surface of the stabilizing tooth with respect to the inner tooth contact surface of the reference tooth as the inner link plate sprocket tooth with the largest chain-guiding dimension is of importance, the stabilizing tooth of the second embodiment forms, as it were, with the gearshift function tooth, that is to say release tooth or catch tooth, assigned thereto by arrangement in the same gearshift function region of upshift region and downshift region, in particular with that release tooth of the upshift region thereof which is outermost counter to the drive direction of rotation and/or with that catch tooth of the downshift region thereof which is outermost in the drive direction of rotation, a chain-guiding dimension which is common across multiple sprocket teeth and which does not fall below that of the reference tooth used here as the inner link plate sprocket tooth with the largest chain-guiding dimension, and/or which chain-guiding dimension which is common across multiple sprocket teeth preferably does not fall below the clear axial width of an inner link plate chain link of a bicycle chain that cooperates with the sprocket in a drive arrangement of a bicycle, preferably even exceeds the clear axial width for the purposes of improved stabilization of the bicycle chain on the sprocket that meshes with the bicycle chain. The second embodiment of the stabilizing tooth is advantageous in particular, but not only, if a sprocket has only inner link plate sprocket teeth, as is the case in odd-numbered sprockets. By contrast to the reference tooth mentioned above, in the case of the inner link plate sprocket tooth with the largest chain-guiding dimension, which must be taken into consideration for the configuration of the stabilizing tooth of the second embodiment, the axial position of the outer tooth contact surface thereof is not of importance. This may be arranged so as to be offset inwards with respect to the tooth contact surface of one or both of the gearshift function teeth, that is to say release tooth and catch tooth, in particular of that release tooth of the upshift region thereof which is outermost counter to the drive direction of rotation and/or of that catch tooth of the downshift region thereof which is outermost in the drive direction of rotation.

In the case of a sprocket as described above, the at least one stabilizing tooth can in particular result, in certain sections, i.e., along certain angular ranges of the sprocket, in the chain no longer fully following the known and usual straight running path on the sprocket.

Rather, the chain can be selectively deflected laterally by the at least one stabilizing tooth not only during a shifting process but also during normal running on the sprocket (i.e., without lateral deflection by a derailleur with the aim of changing the chain to another sprocket), in particular in the direction of the next larger sprocket, i.e., in an inboard direction. This can be done with the aim described above of counteracting unwanted outward movements of the chain, i.e., in an outboard direction, at undesirable rotational positions of the sprocket, for example in the regions of inboard shifting ramps, or downshift recess formations of the sprocket, instead of in the regions of outboard shifting ramps, or upshifting recess formations of the sprocket, and any shifting errors that may be associated with this.

The reverse case, in which a stabilizing tooth has an outer tooth contact surface which is further outboard than the outer tooth contact surface of a reference tooth, is also conceivable. In this reverse case, in other words, the bicycle chain is deliberately forced to the outside, i.e., in the outboard direction, during engagement with a suitably formed and arranged stabilizing tooth on the sprocket, for example in those angular regions of the sprocket in which no inward shifting, i.e. no downshifting, is desired, which is particularly the case in the region of outboard shifting ramps or upshifting recess formations of the sprocket and/or the next larger adjacent sprocket In other words, these cases mean that the chain, due to the at least one stabilizing tooth of the sprocket, to an at least slight extent is brought into a specific and regular horizontal serpentine course of motion on the sprocket, by means of which, for example, the above-described mis-shifting can be deliberately reduced.

In such cases, the sprocket toothing having the at least one stabilizing tooth has the special characteristic that the sprocket toothing, viewed spanning at least two adjacent teeth, can be wider than the chain's inner link plate clearance, i.e., wider than the chain's inner link plate spacing. In other words, in these cases, a chain guide dimension of the sprocket that spans at least two adjacent teeth is wider than the chain inner link plate spacing. In yet other words, the sprocket teeth, viewed across adjacent teeth, are wider than the chain inner link plate width.

A "sprocket toothing wider than the chain inner link plate spacing" sounds technically nonsensical at first, since with at least two adjacent teeth wider than the chain inner link plate spacing, the chain would ride up at least with one chain inner link plate on one of the two teeth and would no longer engage with the sprocket. In the cases considered here, however, the at least two adjacent teeth are not each of them individually wider than the chain inner link plate distance, but the tooth thickness is wider than the chain inner link plate distance only across adjacent teeth, i.e., overlapping at least two adjacent teeth, whereby at least one tooth of the two adjacent teeth is not wider than the chain inner link plate distance. In this way, it is possible that the chain does not ride up on a tooth that is too wide for the chain inner link plate distance, but that the chain instead follows the above-described, specific serpentine course.

It is expressly pointed out that a stabilizing tooth may be designed only in accordance with the first embodiment or only in accordance with the second embodiment or both in accordance with the first and in accordance with the second embodiment.

Preferably, the axial spacing of the inner tooth contact surface of the release-side stabilizing tooth to the outer tooth contact surface of the at least one release tooth, in particular of that release tooth of the upshift region thereof which is outermost counter to the drive direction of rotation, is greater than the largest chain-guiding dimension of an inner link plate sprocket tooth. It is likewise preferable if the axial spacing of the inner tooth contact surface of the receiving-side stabilizing tooth to the outer tooth contact surface of the at least one catch tooth, in particular of that catch tooth of the downshift region thereof which is outermost in the drive direction of rotation, is greater than the largest chain-guiding dimension of an inner link plate sprocket tooth. In this way, the chain-guiding capability formed jointly by a stabilizing tooth and the assigned gearshift function tooth is further increased.

Preferably, to achieve locally taut chain guidance in the region between a stabilizing tooth and the gearshift function tooth assigned thereto, the axial spacing of the inner tooth contact surface of the stabilizing tooth to the outer tooth contact surface of the assigned gearshift function tooth is between 0.90 times and 1.05 times the clearance width of an inner link plate chain link of the bicycle roller chain assigned to the sprocket for engagement during drive operation. For effective reduction of axial chain mobility in the outward direction if the upshift operation is initiated at the time of a rotational position that is disadvantageous for this, the axial spacing of the inner tooth contact surface of the stabilizing tooth to the outer tooth contact surface of the gearshift function tooth assigned thereto is preferably not smaller, particularly preferably is larger, than the axial clearance width of an inner link plate chain link. Particularly advantageous chain guidance effects were achieved in tests with an axial spacing of the inner tooth contact surface of the stabilizing tooth to the outer tooth contact surface of the gearshift function tooth assigned thereto of 1.004 times to 1.033 times the clearance width of an inner link plate chain link.

To avoid undesired weakening of the sprocket, the stated recess formations are designed to be as short as possible in the circumferential direction. The release-side stabilizing tooth may therefore preferably be arranged directly adjacent, counter to the drive direction of rotation, to the at least one release tooth, in particular to that release tooth of the upshift region thereof which is outermost counter to the drive direction of rotation. Accordingly, based on the same consideration, the receiving-side stabilizing tooth may be directly adjacent, in the drive direction of rotation, to the at least one catch tooth, in particular to that catch tooth of the downshift region thereof which is outermost in the drive direction of rotation. In the case of this arrangement, it is then the case that, during an upshift operation, the release-side stabilizing tooth is the first sprocket tooth which is passed by both chain link plates of one and the same chain link axially to the outside. Likewise, it is then the case that, during a downshift operation, the receiving-side stabilizing tooth is the final sprocket tooth which is passed by both chain link plates of one and the same chain link axially to the outside.

Preferably, the at least one release tooth and/or the at least one catch tooth is designed for engagement with an outer link plate chain link, because this, owing to its above-described larger clearance width, can still be held on the sprocket or can already be caught on the sprocket in the case of a chain departing axially towards the outside or arriving axially from the outside, even though the chain itself is no longer fully assuming, or has not yet fully assumed, its axial position for engagement with the sprocket.

Furthermore, for an inner link plate chain link that is directly adjacent to the outer link plate chain link along the chain circulating path, it is easier, owing to the relatively small axial dimension thereof, to pass the release-side stabilizing tooth or the receiving-side stabilizing tooth axially to the outside.

As has already been stated above, an outer tooth contact surface of the release-side stabilizing tooth is arranged so as to be offset inwards with respect to the axial reference position. It has a greater axial spacing to the axial reference position than an outer tooth contact surface of the at least one release tooth, in particular that release tooth of the upshift region thereof which is outermost counter to the drive direction of rotation, in order to allow the bicycle chain to laterally pass the stabilizing tooth axially to the outside during upshift operations. Alternatively, or in addition, an outer tooth contact surface of the receiving-side stabilizing tooth is offset inwards with respect to the axial reference position. It has a greater axial spacing to the axial reference position than an outer tooth contact surface of the at least one catch tooth, in particular of that catch tooth of the downshift region thereof which is outermost in the drive direction of rotation. In this way, the bicycle chain can pass the stabilizing tooth axially to the outside during downshift operations.

In order to firstly allow the chain the abovementioned axial movement clearance at the sprocket for a gearshift operation, and in order to secondly limit this axial movement clearance during normal rotation of the sprocket in the absence of a gearshift operation, an inner tooth contact surface of the release-side stabilizing tooth may have a greater axial spacing to the axial reference position than an inner tooth contact surface of the at least one release tooth, in particular of that release tooth of the upshift region thereof which is outermost counter to the drive direction of rotation, and/or an inner tooth contact surface of the receiving-side stabilizing tooth may have a greater axial spacing to the axial reference position than an inner tooth contact surface of the at least one catch tooth, in particular of that catch tooth of the downshift region thereof which is outermost in the drive direction of rotation.

Axial mobility of the bicycle chain, which is still or already in engagement with the sprocket, towards the outside in the region of the gearshift function teeth, that is to say release tooth and catch tooth, which are respectively crucial for a gearshift operation, is advantageous for a repeatable execution of successful gearshift operations, specifically for upshifting and for downshifting. Therefore, in the case of the above-described at least one release tooth of an upshift region being formed, a release-side mobilizing tooth may be arranged directly adjacent, in the drive direction of rotation, to the at least one release tooth, in particular to that release tooth of the upshift region thereof which is outermost in the drive direction of rotation, wherein the axial spacing of an inner tooth contact surface of the release-side mobilizing tooth to the axial reference position is less than or equal to the axial spacing of the inner tooth contact surface of the reference tooth to the axial reference position. The axial spacing of the inner tooth contact surface of the release-side mobilizing tooth to the axial reference position is preferably less than the axial spacing of the inner tooth contact surface of the reference tooth to the axial reference position. The release-side mobilizing tooth, which during upshifting processes is one of the final sprocket teeth that engages with the chain, preferably is the penultimate sprocket tooth that engages with the chain, allows the bicycle chain to perform an axially outwards movement to the axially adjacent smaller target sprocket of the upshift operation. The chain can thus move axially outwards over a longer circumferential segment in relation to a sprocket without a release-side mobilizing tooth.

The axial spacing of the inner tooth contact surface of the release-side mobilizing tooth to the axial reference position is preferably also less than the axial spacing of the inner tooth contact surface of the release-side stabilizing tooth to the axial reference position. Then, the release-side stabilizing tooth can stabilize the chain on the sprocket in an effective manner during normal engagement of the sprocket with the chain in the absence of a gearshift operation. Counter to the drive direction of rotation, the release-side stabilizing tooth then specifically follows a circumferential segment which is formed by the release-side mobilizing tooth and the at least one release tooth and which extends over at least two teeth, and which has a small chain-guiding dimension, and which thus provides weak axial guidance of the chain on the sprocket.

Alternatively or preferably in addition, in the case of the above-described at least one catch tooth of a downshift region being formed, a receiving-side mobilizing tooth may be arranged directly adjacent, counter to the drive direction of rotation, to the at least one catch tooth, in particular to that catch tooth of the downshift region thereof which is outermost counter to the drive direction of rotation, wherein the axial spacing of an inner tooth contact surface of the receiving-side mobilizing tooth to the axial reference position is less than or equal to the axial spacing of the inner tooth contact surface of the reference tooth to the axial reference position. The axial spacing of the inner tooth contact surface of the receiving-side mobilizing tooth to the axial reference position is preferably less than the axial spacing of the inner tooth contact surface of the reference tooth to the axial reference position. The receiving-side mobilizing tooth, which during downshifting processes is one of the first sprocket teeth that engages with the chain, preferably is the second sprocket tooth that engages with the chain, allows the bicycle chain an axially outwards movement clearance to the axially adjacent smaller starting sprocket of the downshift operation. The chain can thus move axially inwards from axially outside over a longer circumferential segment in relation to a sprocket without a receiving-side mobilizing tooth.

The axial spacing of the inner tooth contact surface of the receiving-side mobilizing tooth to the axial reference position is preferably also less than the axial spacing of the inner tooth contact surface of the receiving-side stabilizing tooth to the axial reference position. This makes it possible for the receiving-side stabilizing tooth to stabilize the chain on the sprocket in an effective manner during normal engagement of the sprocket with the chain in the absence of a gearshift operation. In the drive direction of rotation, the receiving-side stabilizing tooth then specifically leads a circumferential segment which is formed by the receiving-side mobilizing tooth and the at least one catch tooth and which extends over at least two sprocket teeth, and which has a small chain-guiding dimension, and which therefore provides weak axial guidance of the chain on the sprocket.

The longer the circumferential segments with small chain-guiding dimensions are, the more easily the displacement of a derailleur can cause an undesired descent of the chain at a circumferential region not intended for this, and the more advantageous is the formation of the at least one stabilizing tooth.

For the best possible stabilization of the chain on the sprocket in a gearshift region composed of a downshift region and the next upshift region that follows the downshift region in the drive direction of rotation, it is preferably also the case that the axial spacing of the inner tooth contact surface of the release-side stabilizing tooth to the axial reference position is greater than the axial spacing of the inner tooth contact surface of the receiving-side mobilizing tooth to the axial reference position, and/or the axial spacing of the inner tooth contact surface of the receiving-side stabilizing tooth to the axial reference position is greater than the axial spacing of the inner tooth contact surface of the release-side mobilizing tooth to the axial reference position.

The sprocket may have more than one upshift regions, wherein it is preferably the case that each upshift region has an upshift recess formation with at least one, preferably with exactly one, release tooth assigned to the upshift recess formation. Likewise, the sprocket may have more than one downshift region with a downshift recess formation and with at least one, preferably with exactly one, catch tooth assigned to the downshift recess formation. A downshift recess formation and a next upshift recess formation that follows this in the drive direction of rotation form a common gearshift region. The downshift recess formation and the next upshift recess formation that follows this in the drive direction of rotation are preferably situated between a catch tooth, in particular that catch tooth of the downshift region thereof which is outermost in the drive direction of rotation, and the first release tooth that follows the catch tooth in the drive direction of rotation.

The at least one release tooth, in particular that release tooth of the upshift region thereof which is outermost counter to the drive direction of rotation, preferably follows the upshift recess formation directly in the drive direction of rotation, such that the upshift recess formation at least does not extend entirely, preferably does not extend at all, into the outwardly facing tooth surface of at least one release tooth, in particular of that release tooth of the upshift region thereof which is outermost in the drive direction of rotation. At least a part of the outwardly facing tooth surface of that release tooth of the upshift region thereof which is outermost in the drive direction of rotation, preferably the entire outwardly facing tooth surface of that release tooth of the upshift region thereof which is outermost in the drive direction of rotation, is unaffected by the upshift recess formation.

Analogously to the release tooth, the at least one catch tooth, in particular that catch tooth of the downshift region thereof which is outermost in the drive direction of rotation, preferably follows the downshift recess formation directly counter to the drive direction of rotation, such that the downshift recess formation at least does not extend entirely, preferably does not extend at all, into the outwardly facing tooth surface of at least one catch tooth, in particular of that catch tooth of the downshift region thereof which is outermost counter to the drive direction of rotation. At least a part of the outwardly facing tooth surface of that catch tooth of the downshift region thereof which is outermost counter to the drive direction of rotation, preferably the entire outwardly facing tooth surface of that catch tooth of the downshift region thereof which is outermost counter to the drive direction of rotation, is unaffected by the downshift recess formation.

According to the terminology used in this application, a sprocket tooth ends radially at the inside at the root circle of the sprocket. Formations formed radially within the root circle on the sprocket main body are formations of the sprocket main body and not of the sprocket tooth formed at the same circumferential location.

In one embodiment of the sprocket, the receiving-side or the release-side mobilizing tooth, preferably the release-side mobilizing tooth, may be the reference tooth. Then, the axial spacing of the inner tooth contact surface of the mobilizing tooth in question to the axial reference position is the axial spacing of the inner tooth contact surface to the axial reference position. In other words: the chain-guiding dimension of the mobilizing tooth is then the chain-guiding dimension of the reference tooth. A mobilizing tooth may be a reference tooth of the sprocket in particular if the number of teeth of the sprocket is even and n times the number of teeth corresponds to a gearshift section from the receiving-side mobilizing tooth to the next release-side mobilizing tooth in the drive direction of rotation plus n teeth, inclusive of the mobilizing teeth, and the sprocket comprises this section n times. n is in this case an integer.

Since, for the above-stated reasons of facilitated release of the chain towards the outside and of facilitated catching of the chain arriving from the outside, both the at least one catch tooth and the at least one release tooth are designed for engagement into an outer link plate chain link, it is generally the case that an odd number of sprocket teeth is situated between the at least one catch tooth, in particular that catch tooth of the downshift region thereof which is outermost in the drive direction of rotation, and the next release tooth in the drive direction of rotation. In an attempt to keep the recess formations, which assist gearshift operations and which must have a certain minimum length in the circumferential direction in order to perform their task, as short as possible, there are in many cases three or five sprocket teeth situated between the at least one catch tooth, in particular that catch tooth of the downshift region thereof which is outermost in the drive direction of rotation, and that release tooth of the upshift region thereof which is outermost counter to the drive direction of rotation. That release tooth of the upshift region thereof which is outermost counter to the drive direction of rotation is then, in the drive direction of rotation, the fourth or the sixth tooth after the at least one catch tooth, in particular after that catch tooth of the downshift region thereof which is outermost in the drive direction of rotation. If a receiving-side and a release-side mobilizing tooth are present, then the release-side mobilizing tooth is in these cases preferably the sixth or the eighth sprocket tooth after the receiving-side mobilizing tooth in the drive direction of rotation. The abovementioned gearshift section then comprises seven or nine sprocket teeth. A sprocket with 24 teeth (24-T sprocket) may then be formed from three such gearshift sections plus three teeth, such that one mobilizing tooth, preferably the release-side mobilizing tooth, can then be a reference tooth. The formation of the 24-T sprocket from three gearshift sections is advantageous if an odd-numbered sprocket, for example a sprocket with 21 teeth (21-T sprocket) is adjacent to the 24-T sprocket to the outside. This is because, in the case of an engagement of the chain with an odd-numbered sprocket, it is the case for every sprocket tooth of the odd-numbered sprocket that, with every revolution, the type of chain link engaged changes between outer link plate chain link and inner link plate chain link. Since, during downshifting from the 21-T to the 24-T sprocket, the assignment of the sprocket teeth of the 21-T sprocket to a respective chain link type is indeterminate, it is advantageous, in order to achieve the shortest possible gearshift latency, if multiple gearshift sections are formed on the 24-T sprocket. Basically, in the present application, a sprocket with a number of z teeth is referred to as a "z-T sprocket".

To simplify the production of the sprocket, provision may be made for the outer tooth contact surfaces of a plurality of sprocket teeth situated outside a recess formation to be situated at the axial reference position, including the tooth contact surface of a release and/or catch tooth.

A plurality of, preferably all, outer tooth contact surfaces situated at the axial reference position are preferably oriented orthogonally with respect to the sprocket axis. This facilitates cutting manufacturing, which is advantageous with regard to dimensional accuracy, of the sprocket, which is of complex design.

It is preferably possible for a plurality of, particularly preferably all, inner tooth contact surfaces situated at the axial reference position to be oriented orthogonally with respect to the sprocket axis.

In order to stabilize the chain during circulation on the sprocket, it is advantageous if the chain-guiding dimension of the release-side stabilizing tooth is larger than the chain-guiding dimension of the at least one release tooth, in particular of that release tooth of the upshift region thereof which is outermost counter to the drive direction of rotation. Alternatively, or preferably in addition, the chain-guiding dimension of the receiving-side stabilizing tooth may be larger than the chain-guiding dimension of the at least one catch tooth, in particular of that catch tooth of the downshift region thereof which is outermost in the drive direction of rotation. It is preferable if the chain-guiding dimension of the release-side stabilizing tooth is 1.1 times to 1.3 times, preferably 1.12 times to 1.2 times, particularly preferably 1.13 times to 1.17 times, inclusive of the stated factor boundary values, the chain-guiding dimension of the at least one release tooth, in particular of that release tooth of the upshift region thereof which is outermost counter to the drive direction of rotation. Alternatively, or preferably in addition, the chain-guiding dimension of the receiving-side stabilizing tooth is preferably 1.2 times to 1.6 times, preferably 1.2 times to 1.5 times, particularly preferably 1.21 times to 1.45 times, inclusive of the stated factor boundary values, the chain-guiding dimension of the at least one catch tooth, in particular of that catch tooth of the downshift region thereof which is outermost in the drive direction of rotation. These values apply generally to sprockets, but preferably to sprockets with even numbers of teeth. For sprockets with odd numbers of teeth, or for sprockets with exclusively inner link plate sprocket teeth, the chain-guiding dimension of the release-side stabilizing tooth may be 1.3 times to 1.7 times, preferably 1.4 times to 1.6 times, particularly preferably 1.5 times to 1.6 times, inclusive of the stated factor boundary values, the chain-guiding dimension of the at least one release tooth, in particular of that release tooth of the upshift region thereof which is outermost counter to the drive direction of rotation. Likewise, for sprockets with odd numbers of teeth, or for sprockets with exclusively inner link plate sprocket teeth, the chain-guiding dimension of the receiving-side stabilizing tooth may be 1.2 times to 1.6 times, preferably 1.3 times to 1.5 times, particularly preferably 1.4 times to 1.5 times, inclusive of the stated factor boundary values, the chain-guiding dimension of the at least one catch tooth, in particular of that catch tooth of the downshift region thereof which is outermost in the drive direction of rotation.

To stabilize the chain during a revolution on the sprocket, it may furthermore be advantageous if the chain-guiding dimension of the release-side stabilizing tooth is larger than the chain-guiding dimension of the release-side mobilizing tooth. Alternatively, or preferably in addition, the chain-guiding dimension of the receiving-side stabilizing tooth may be larger than the chain-guiding dimension of the receiving-side mobilizing tooth. It is preferable if the chain-guiding dimension of the release-side stabilizing tooth is 0.8 times to 1.2 times, preferably 0.85 times to 1.15 times, particularly preferably 0.88 times to 1.13 times, inclusive of the stated factor boundary values, the chain-guiding dimension of the release-side mobilizing tooth. Alternatively, or preferably in addition, according to an advantageous refinement, the chain-guiding dimension of the receiving-side stabilizing tooth is 1.0 times to 1.4 times, preferably 1.0 times to 1.37 times, particularly preferably 1.0 times to 1.35 times, inclusive of the stated factor boundary values, the chain-guiding dimension of the receiving-side mobilizing tooth. These values apply generally to sprockets, but preferably to sprockets with even numbers of teeth. For sprockets with odd numbers of teeth, or for sprockets with exclusively inner link plate sprocket teeth, the chain-guiding dimension of the release-side stabilizing tooth may be 1.3 times to 1.7 times, preferably 1.4 times to 1.6 times, particularly preferably 1.5 times to 1.6 times, inclusive of the stated factor boundary values, the chain-guiding dimension of the release-side mobilizing tooth. Likewise, for sprockets with odd numbers of teeth, or for sprockets with exclusively inner link plate sprocket teeth, the chain-guiding dimension of the receiving-side stabilizing tooth may be 1.2 times to 1.6 times, preferably 1.3 times to 1.5 times, particularly preferably 1.4 times to 1.5 times, inclusive of the stated factor boundary values, the chain-guiding dimension of the receiving-side mobilizing tooth.

The above-stated 21-T sprocket as a preferred odd-numbered sprocket may have three gearshift regions each with seven sprocket teeth. Preferably, at these gearshift regions, the catch tooth and the release tooth are the respectively outermost teeth of the gearshift region in the circumferential direction. In general, the catch tooth is the outermost tooth of the gearshift region counter to the drive direction of rotation, and the release tooth is the outermost tooth of the gearshift region in the drive direction of rotation. By concatenation of the gearshift regions with one another in the circumferential direction, it is then the case that at least one catch tooth is adjacent to the at least one release tooth in the drive direction of rotation. In this case, that release tooth of a gearshift region which is outermost in the drive direction of rotation may simultaneously be the receiving-side mobilizing tooth of the gearshift region that is adjacent in the drive direction of rotation, and that catch tooth of a gearshift region which is outermost counter to the drive direction of rotation may be the release-side mobilizing tooth of that gearshift region which is adjacent counter to the drive direction of rotation.

Since the outward release of a chain that is already in engagement with the sprocket is often easier to achieve than the catching of a chain that is approaching the sprocket from the outside for future engagement, it may be provided, in order to achieve repeatable gearshift success with the least possible loss of axial chain-guiding capability, that the chain-guiding dimension of the at least one release tooth, in particular of that release tooth of the upshift region thereof which is outermost counter to the drive direction of rotation, is larger than the chain-guiding dimension of the at least one catch tooth, in particular of that catch tooth of the downshift region thereof which is outermost in the drive direction of rotation. Thus, for the catching of the chain on the at least one catch tooth, the axial movement clearance thereof at the at least one catch tooth may be larger than that at the at least one release tooth. In a specific embodiment, it has proven advantageous if the chain-guiding dimension of the at least one release tooth, in particular of that release tooth of the upshift region thereof which is outermost counter to the drive direction of rotation, is 1.02 times to 1.15 times, preferably 1.03 times to 1.12 times, particularly preferably 1.04 times to 1.11 times, inclusive of the stated boundary values, the chain-guiding dimension of the at least one catch tooth, in particular of that catch tooth of the downshift region thereof which is outermost in the drive direction of rotation.

Since, with regard to the axial spacing of the chain to the sprocket along the chain circulating path, the release situation of the chain during upshift operations and the receipt situation of the chain during downshift operations on the sprocket are often not mirror-symmetrical in relation to a plane of symmetry that encompasses the sprocket axis, the axial spacing of the outer tooth contact surface of the release-side stabilizing tooth to the axial reference position may be selected to be not less than the axial spacing of the outer tooth contact surface of the receiving-side stabilizing tooth to the axial reference position. The axial spacing of the outer tooth contact surface of the release-side stabilizing tooth to the axial reference position is preferably greater than the axial spacing of the outer tooth contact surface of the receiving-side stabilizing tooth to the axial reference position. It is thus possible in particular for the preferred larger chain-guiding dimension of the at least one release tooth, in particular of that release tooth of the upshift region thereof which is outermost counter to the drive direction of rotation, in relation to that of the at least one catch tooth, in particular of that catch tooth of the downshift region thereof which is outermost in the drive direction of rotation, to be allowed for.

It is preferable if the axial spacing of the inner tooth contact surface of the release-side stabilizing tooth to the axial reference position differs by no more than 10%, particularly preferably by no more than 5%, in each case based on the greater of the two spacings, from the axial spacing of the inner tooth contact surface of the receiving-side stabilizing tooth to the axial reference position. It is most preferable if the stated spacings do not differ from one another. It can thus be ensured that the capabilities of the two stabilizing teeth to stabilize the chain in the gearshift region in which the stabilizing teeth are arranged do not differ to too great an extent. An implementation of different axial spacings of the inner tooth contact surface of the release-side stabilizing tooth, on the one hand, and of the inner tooth contact surface of the receiving-side stabilizing tooth, on the other hand, in each case to the axial reference position serves to provide each stabilizing tooth with a maximum possible thickness and thus maximum possible wear resistance. The capability for chain stabilization is determined by the capability of a stabilizing tooth to counteract the axial movement clearance that is imparted to the bicycle chain in the region of the upshift and downshift recess formations by other sprocket teeth, for example the at least one catch tooth, the at least one release tooth or possibly one or more mobilizing teeth, during a conventional circulation of the chain without an upshift operation. The axial position of the inner tooth contact surface is a significant criterion for this.

Sprockets nowadays are generally not marketed separately from bicycle chains that interact with them. It is commonly the case that sprockets or sprocket cassettes are constructed and marketed together with a suitable bicycle chain as a system. In the case of spatially extremely compact rear-wheel sprocket cassettes with 10, 11, 12 or more sprockets, this is the only possible approach in order to ensure the smoothest possible functioning of a drive arrangement which is formed from the sprocket, or of a sprocket cassette which has the sprocket, and from a bicycle chain that interacts with the sprocket or with the sprocket cassette. Therefore, with the construction of the sprocket or with the construction of the sprocket cassette that has the sprocket, the construction of the associated bicycle chain is also defined. For a given sprocket or a given sprocket cassette that has the sprocket, any person skilled in the art can easily determine the associated bicycle chain and the dimensions thereof.

For the unique assignment of the bicycle roller chain with regard to the alternating sequence of different chain link types to the sprocket teeth of the sprocket, an even-numbered sprocket may have at least one outer link plate sprocket tooth, the chain-guiding dimension of which is larger than the clearance width of an inner link plate chain length and smaller than the clearance width of an outer link plate chain link of the bicycle roller chain assigned to the sprocket. Then, this outer link plate sprocket tooth can and will, every time it engages with the bicycle chain, engage only into the engagement space of an outer link plate chain link. If the outer link plate sprocket tooth approaches an inner link plate chain link into which the outer link plate sprocket tooth cannot engage, or cannot fully engage, owing to its chain-guiding dimension, the chain can ride over the tip of the outer link plate sprocket tooth along the chain circulating path until an outer link plate chain link with the outer link plate sprocket tooth moves into a relative position that allows an engagement. To assist this relative orientation action of the sprocket, the sprocket preferably has a plurality of outer link plate sprocket teeth, wherein an odd number of sprocket teeth is arranged between each pair of outer link plate sprocket teeth. It is thus the case that at least one inner link plate sprocket tooth is situated between two outer link plate sprocket teeth arranged in succession in the circumferential direction.

As already stated above, if the sprocket is an even-numbered sprocket, the at least one, preferably the single, catch tooth of a downshift region and/or the at least one, preferably the single, release tooth of an upshift region is preferably arranged on the sprocket such that, owing to the at least one outer link plate sprocket tooth formed on the sprocket and the thereby effected unique relative orientation of the chain with its alternating sequence of chain link types relative to the sprocket teeth, the at least one, preferably the single, catch tooth and/or the at least one, preferably the single, release tooth is arranged for engagement with outer link plate chain links. It is preferable if the release-side and/or the receiving-side stabilizing tooth is in each case an inner link plate sprocket tooth. It is likewise preferable if any release-side and/or receiving-side mobilizing tooth that may be provided is in each case an inner link plate sprocket tooth.

The sprocket is preferably a constituent part of a sprocket cassette with a plurality of coaxial sprockets each with a different number of teeth, which are arrangeable as the sprocket cassette, so as to be rotatable jointly without slip about a common virtual sprocket axis, on a bicycle, in particular on a rear-wheel hub of a bicycle. If, in the sprocket cassette, a sprocket has a further sprocket axially adjacent thereto towards the outside, the further sprocket, which axially faces the outer side surface of the former sprocket, has a smaller number of teeth than the former sprocket. Preferably, the sprocket cassette with at least one sprocket designed as described above has a total of ten, eleven, twelve, thirteen or fourteen sprockets. The sprocket cassette particularly preferably has twelve sprockets. In a particularly advantageous embodiment of a twelvefold sprocket cassette of the type, relatively small axially directly adjacent sprockets of the twelvefold sprocket cassette have a difference in numbers of teeth of two, more moderately small axially directly adjacent sprockets of the twelvefold sprocket cassette have a difference in numbers of teeth of three, relatively large axially directly adjacent sprockets of the twelvefold sprocket cassette have a difference in numbers of teeth of four, and even larger axially directly adjacent sprockets of the twelvefold sprocket cassette have a difference in numbers of teeth of six. The largest sprocket preferably has eight teeth more than its axial neighbouring sprocket. The numbers of teeth of a preferred sprocket sequence of the sprocket cassette are 10-12-14-16-18-21-24-28-32-38-44-52. Preferably, at least half of the sprockets of the sprocket cassette are designed as described above, and it is particularly preferable for at least two thirds of the sprockets to be designed as described above.

For this preferred sprocket cassette, the below-stated axial spacings of the outer tooth contact surface of a tooth, which is situated outside a recess formation formed on the outer face surface, of a relatively large sprocket to the outer tooth contact surface of a tooth, which is situated outside a recess formation formed on the outer face surface, of the axially adjacent next smaller sprocket have proven to be advantageous. Alternatively, or preferably in addition, the following axial spacings between the outer face surfaces of axially adjacent sprockets have proven to be advantageous:

Between the 52-T sprocket and the 44-T sprocket: 3.60 mm to 3.70 mm, preferably 3.65 mm. Between the 44-T sprocket and the 38-T sprocket: 3.65 mm to 3.75 mm, preferably 3.70 mm. Between the 38-T sprocket and the 32-T sprocket: 3.60 mm to 3.70 mm, preferably 3.65 mm. Between the 32-T sprocket and the 28-T sprocket: 3.70 mm to 3.80 mm, preferably 3.75 mm. Between the 28-T sprocket and the 24-T sprocket: 3.70 mm to 3.80 mm, preferably 3.75 mm. Between the 24-T sprocket and the 21-T sprocket: 3.85 mm to 3.95 mm, preferably 3.90 mm. Between the 21-T sprocket and the 18-T sprocket: 3.75 mm to 3.85 mm, preferably 3.80 mm. Between the 18-T sprocket and the 16-T sprocket: 3.65 mm to 3.75 mm, preferably 3.70 mm. Between the 16-T sprocket and the 14-T sprocket: 3.65 mm to 3.75 mm, preferably 3.70 mm. Between the 14-T sprocket and the 12-T sprocket: 3.85 mm to 3.95 mm, preferably 3.90 mm.

It is preferable if the spacing between the 24-T and the 21-T sprocket is the greatest spacing in terms of magnitude between adjacent sprockets from the 52-T sprocket to the 12-T sprocket of the cassette. The spacing between the 14-T and the 12-T sprocket may be of equal magnitude to that between the 24-T and the 21-T sprocket, but not larger.

The spacing between the 21-T sprocket and the 18-T sprocket is preferably the second greatest between adjacent sprockets from the 52-T sprocket to the 12-T sprocket of the cassette.

Preferably, at least one sprocket pairing of 44-T/38-T, 18-T/16-T and 16-T/14-T has the third greatest spacing in terms of magnitude between adjacent sprockets from the 52-T sprocket to the 12-T sprocket, wherein it is particularly preferable if the three stated sprocket pairings each have an equal spacing.

At least one sprocket pairing of 52-T/44-T and 38-T/32-T has the smallest spacing between adjacent sprockets from the 52-T sprocket to the 12-T sprocket, wherein it is particularly preferable if the two stated sprocket pairings each have an equal spacing.

Between the 12-T sprocket and the 10-T sprocket, there is preferably an axial spacing of 3.75 mm to 3.85 mm, preferably 3.80 mm between the outer tooth contact surface of a sprocket tooth, situated outside a recess formation formed on the outer face surface, of the 12-T sprocket and the outer tooth contact surface of an inner link plate sprocket tooth, situated outside a recess formation formed on the outer face surface, of the 10-T sprocket.

Between the 12-T sprocket and the 10-T sprocket, there is preferably an axial spacing of 4.55 mm to 4.65 mm, preferably 4.60 mm between the outer tooth contact surface of a sprocket tooth, situated outside a recess formation formed on the outer face surface, of the 12-T sprocket and the outer tooth contact surface of an outer link plate sprocket tooth, situated outside a recess formation formed on the outer face surface, of the 10-T sprocket.

On the multi-sprocket cassette, mutually axially adjacent sprockets are connected to one another by connecting means. The connecting means preferably comprise webs which protrude radially inwards and axially outwards proceeding from the larger of two axially adjacent sprockets. In a section plane that encompasses the sprocket axis, such webs have, broadly speaking, an L-shaped cross section. The webs are preferably formed integrally with the axially adjacent smaller sprocket, for example by cutting machining from the solid. It is however not the intention to rule out that the web runs only radially inwards and the axial spacing between the adjacent next smaller sprocket and the web is bridged by a rivet or by a similar connecting means, which simultaneously produces the mechanical connection between the two axially adjacent sprockets.

Here, provision may be made whereby, proceeding from a particular sprocket, sprockets which are axially adjacent in the axially inward direction towards larger sprockets are connected to one another by a number of webs smaller than the number of teeth of each individual one of the two interconnected adjacent sprockets. In the case of larger even-numbered sprockets, it is advantageous if a web as a connecting means is formed only at every second tooth of the smaller of the axially adjacent sprockets. Then, a physical connection of the larger sprocket to the smaller sprocket merges into the sprocket main body at a location at which, on the smaller sprocket, there is situated a tooth to which the chain engaging with the smaller sprocket transmits force.

If the smaller of two axially adjacent sprockets is an odd-numbered sprocket, then it is preferably the case that a connecting web merges into the sprocket main body of the smaller sprocket at the circumferential location of each tooth of the smaller sprocket.

Taking the example of the twelvefold sprocket cassette mentioned above as being preferred, it is preferably the case that the three largest sprockets are formed as individual sprockets and are connected to one another and/or to the largest sprocket by rivets or other connecting means. The remaining nine sprockets are preferably formed integrally as a sprocket dome. Of these, the second largest sprocket of the sprocket dome is connected integrally to the largest, and the third largest sprocket of the sprocket dome is connected integrally to the second largest, in each case by means of connecting webs, wherein, in each case, a number of webs is formed which is only half of the number of teeth of the smaller of the two sprockets that are directly connected to one another. Here, each web merges into the sprocket main body of the respectively smaller axially adjacent sprocket at a circumferential location at which the smaller sprocket has a tooth.

The integral connection of the third largest sprocket of the sprocket dome to the fourth largest, and every further connection of a sprocket to the axially adjacent next smaller sprocket, is preferably designed, at least as far as the seventh largest sprocket, such that a connecting web merges into the sprocket main body of the smaller sprocket at every circumferential location of a tooth thereof. Taking the example of the twelvefold sprocket cassette, the largest sprocket of the integral sprocket dome is the fourth largest sprocket of the sprocket cassette, and the seventh largest sprocket of the sprocket dome is the tenth largest sprocket or the third smallest sprocket of the sprocket cassette.

The two smallest sprockets of the sprocket cassette and of the sprocket dome may be connected integrally to the rest of the sprocket cassette in pot-shaped fashion without apertures or, for the purposes of reducing the cassette weight, with a plurality of apertures, for example one aperture at every second tooth. Preferably, the second smallest sprocket is connected integrally to the third smallest sprocket with an aperture at every second tooth in an otherwise solid pot-shaped construction, and it is likewise preferable if the smallest sprocket is connected integrally to the second smallest sprocket by means of a solid pot-shaped construction.

Such a sprocket dome provides sufficient mechanical strength for transmitting the forces and torques that arise during riding operation, whilst simultaneously having the lowest possible weight.

Where a connecting web leads in only at the circumferential location of every second tooth of the smaller sprocket, the mechanical strength of the sprocket pairing thus connected is lower than if a connecting web were to lead into the sprocket main body of the smaller sprocket at the circumferential location of every tooth. This can undesirably weaken the smaller sprocket in terms of its stiffness and strength in the circumferential region of the upshift and/or downshift recess formations thereof owing to the locally reduced material thickness.

In order to compensate for such weakening on a smaller sprocket, it is possible for an axial projection to be formed on the sprocket main body where a recess formation extends in the region between two connecting webs for connection to the axially adjacent next larger sprocket, which axial projection runs in the circumferential direction and preferably runs over at least three quarters, particularly preferably over the entirety, of the spacing between two connecting webs that lead into the sprocket main body that forms the smaller sprocket. Preferably, the axial projection projects axially over 80 to 120% of the chain-guiding dimension of a tooth, which is arranged in the region of a recess formation in the circumferential region between two connecting webs, from the sprocket main body in the direction of the axially adjacent next larger sprocket, to which the connecting webs integrally connect the smaller sprocket in question.

It is basically also possible for an axial projection of the type to be formed at circumferential regions without a recess formation, for the purposes of stiffening a sprocket. It is however preferable for no stiffening axial projections to be formed at circumferential regions without a recess formation, because there the sprocket main body is generally of sufficient thickness and thus of sufficiently firm and stiff form.

The present disclosure also relates to a drive arrangement comprising a bicycle sprocket as described and refined above, in particular an above-described sprocket cassette having at least one sprocket designed as described above, and a bicycle roller chain, wherein the bicycle roller chain has, in alternation along its circulating path, inner link plate chain links with a relatively small clearance width between their parallel inner link plates and outer link plate chain links with a relatively large clearance width between their parallel outer link plates.

In order to facilitate a gearshift operation, it is possible, on a sprocket which is rotatable about a sprocket axis, specifically irrespective of whether the sprocket is designed as per the above description, as is preferred, or merely has a sprocket main body with sprocket teeth projecting radially outwardly therefrom, for a tooth space between two teeth which follow one another in the circumferential direction to extend radially further inwards than the majority of the tooth spaces whose respective tooth base location situated radially closest to the sprocket axis defines the root circle of the sprocket. In this way, even with the desirably short transition distance between the sprocket releasing the chain during a gearshift operation and the sprocket receiving the chain, it is possible to adhere to a gearshift condition whereby a chain section with the length of an integer multiple of the chain pitch must run between the release tooth of the releasing sprocket and the catch tooth of the receiving sprocket.

During the conventional engagement of the sprocket with the chain in the absence of a gearshift operation, such a gearshift tooth space whose roller abutment surface that delimits the tooth space falls below the root circle of the sprocket in a radially inward direction can lead to problems such as noise generation and/or increased wear.

In order to avoid the abovementioned undesired effects during the conventional engagement of the sprocket with the chain, it is possible for an auxiliary flank formation with a concave partial roller abutment surface to be formed in the region of the load-bearing flank of the tooth which delimits the gearshift tooth space in the drive direction of rotation of the sprocket and thus in the drive direction of circulation of the chain, which auxiliary flank formation projects into the gearshift tooth space at the side, facing counter to the drive direction of rotation of the sprocket, of the tooth that delimits the gearshift tooth space in the drive direction of rotation.

The auxiliary flank formation preferably projects, forming an apex section, into the gearshift tooth space. From the tooth tip or from a region situated relatively close to the tooth tip, a radially outer drive roller abutment surface runs on the load-bearing tooth flank radially inwards in the direction of the sprocket axis, and in the circumferential direction counter to the drive direction of rotation, to the apex section. Preferably, a gearshift roller abutment surface runs from the apex section radially inwards, and likewise in the circumferential direction counter to the drive direction of rotation, to the tooth base in the region of the circumferential centre of the gearshift tooth space. In order to avoid sharp edges and steps, the gearshift roller abutment surface, at its end region situated relatively close to the circumferential centre of the gearshift tooth space, is preferably nestled into the surface of the tooth base.

During a gearshift operation, it is then possible for a roller of the bicycle chain to lie against the radially further inwardly situated gearshift roller abutment surface, such that the gearshift condition discussed above is satisfied in an effective manner. By contrast, during conventional engagement operation in the absence of a gearshift operation, the roller of the bicycle chain can lie against the radially further outwardly situated drive roller abutment surface, such that the roller axes of all rollers, arranged in tooth spaces of the sprocket, of the bicycle chain are arranged on a pitch circle path about the sprocket axis, specifically even if the separately formed gearshift tooth space actually provides radial movement space in a radially inward direction. Here, the apex section forms a type of parting lug which, owing to the chain tension in the load or tension strand of the chain, cannot be overcome, at least in the radially inward direction, by a roller that comes into contact with the load-bearing flank of the respective tooth. If the roller is in contact with the drive roller abutment surface, it remains in contact therewith.

The apex section, which is preferably a line section parallel to the sprocket axis, but which may also be formed by an in particular convex apex surface, is preferably situated closer in the radial direction to the radial coordinate of the tooth base of the gearshift tooth space than to the radial coordinate of the tooth tip of the tooth that delimits the gearshift tooth space in the drive direction of rotation. In relation to the radial spacing of the tooth tip of the tooth that delimits the gearshift tooth space in the drive direction of rotation to the tooth base of the gearshift tooth space, the apex section is preferably at a distance from the tooth base of at least 10%, particularly preferably at least 15% and even more preferably at least 19% of the spacing. At the same time, the apex section is preferably situated at a distance from the tooth base of no more than 45%, particular preferably no more than 40% and even more preferably no more than 35% of the spacing.

The auxiliary flank formation preferably does not extend over the entire axial width of the load-bearing flank of the tooth that delimits the gearshift tooth space in the drive direction of rotation of the sprocket. In this way, space can be created for receiving a chain link plate that bears the chain roller that lies against the gearshift roller abutment surface during a gearshift operation. Therefore, the auxiliary flank formation is preferably situated closer to the inner tooth contact surface of the tooth that delimits the gearshift tooth space in the drive direction of rotation of the sprocket than to the outer tooth contact surface thereof. Preferably, the auxiliary flank formation runs axially from the inner tooth contact surface in the direction of the outer tooth contact surface.

Owing to the function of the gearshift tooth space, the tooth that bears the auxiliary flank formation is a tooth that directly leads the at least one, preferably the single, catch tooth of the downshift region thereof as viewed in the drive direction of rotation, in particular a receiving-side stabilizing tooth.

Even though cutting manufacturing of a sprocket or of a sprocket arrangement, for example of a sprocket dome or of a sprocket cassette, has been mentioned above, this is not the only manufacturing method that may be used. A sprocket configured in accordance with the technical teaching described above may, as an alternative or in addition to cutting machining, be produced by non-cutting deformation, for example by punching and subsequent bending and/or stamping and/or deep drawing or by means of a combined stamping and embossing process, optionally in combination with a deep drawing process.

An advantage of production of a sprocket by non-cutting deformation, hereinafter also referred to merely for short as "deformation", and thus also of multiple or particularly preferably all sprockets of a sprocket arrangement, lies in the resulting possibility of a further weight saving. Specifically, by production of a sprocket by deformation, it is possible to use a base material blank, for example a metal plate blank or a metal plate disk, which is thinner than the maximum required or even the minimum required chain-guiding dimension. This is because it is possible, during the production of the sprocket by deformation, to displace material in the thickness direction of the metal plate blank. In this way, it is for example possible for an area region in an outer surface, facing in a thickness direction, of what will later be a sprocket tooth to be displaced away from the outer surface in the thickness direction. This gives rise to a recess in the outer surface, and to a projection in the opposite outer surface owing to the material displacement. A material thickening is thus not realized at any point of the tooth. Nevertheless, the chain-guiding dimension as defined above can be increased beyond the thickness of the raw material. This is because, on one side of the tooth, the surface region surrounding the recess produced forms the tooth contact surface, and on the opposite side of the tooth, the axial outer surface of the projection produced forms the tooth contact surface. Considering one axial projection of the deformed tooth, the two tooth contact surfaces on the different axial outer sides of the tooth preferably do not overlap, but can, proceeding from the thickness of the metal or base material blank, that is to say sprocket blank, form a tooth with a chain-guiding dimension larger than the thickness of the base material, within the scope of the expansion and yield points of the base material.

In a preferred embodiment, this chain-guiding dimension achievable by deformation, which is larger than the thickness of the base material, is advantageously implemented not only to form the above-described outer link plate sprocket teeth but also to form inner link plate sprocket teeth. This is of importance in particular for odd-numbered sprockets, which owing to the operating situation discussed above can have only inner link plate sprocket teeth. These odd-numbered sprockets can thus also be formed from a base material blank with a thickness dimension equal to or smaller than the chain-guiding dimension of at least some of the sprocket teeth thereof. Consequently, it is also possible for odd-numbered sprockets to be formed, within the root circle of the odd-numbered sprocket, with a sprocket main body which has the thickness of the base material blank at least in certain sections and which has a thickness dimension not larger, or even smaller, than the chain-guiding dimension of at least some of the sprocket teeth thereof.

The technology used by the applicant under the trade names "T-Sync™" and "X-Sync™" for synchronizing the engagement of sprocket teeth on even-numbered sprockets with consistently similar chain links, inner link plate or outer link plate chain links, can thus be used without limitation also on sprockets produced by non-cutting deformation, in particular only by non-cutting deformation. According to the stated technologies "T-Sync™" and "X-Sync™", every second tooth of an even-numbered sprocket is formed with a chain-guiding dimension that allows an engagement of the tooth into a tooth space between two outer link plates of an outer link plate chain link which is however larger than the clearance width between two inner link plates of an inner link plate chain link. In the case of the technology "T-Sync™", on the outer link plate sprocket teeth, the additional chain-guiding dimension is realized exclusively on one side, generally on the inner side facing towards the vertical longitudinal central plane of the bicycle that bears the sprockets. In the case of the technology "X-Sync™", the outer link plate sprocket teeth, with a smaller chain-guiding dimension than the inner link plate sprocket teeth, have axial projections both on the outer side and on the inner side in order to realize the larger chain-guiding dimension in relation to the inner link plate sprocket teeth.

The configuration of a sprocket, in particular of an odd-numbered sprocket, with a sprocket main body whose thickness is not larger, or is even smaller, than the chain-guiding dimension of at least some, on the odd-numbered sprocket preferably of all, sprocket teeth allow additional freedom in the axial arrangement of such a sprocket within a plurality of sprockets, such as a sprocket cassette. Through the use of axial spacer elements, in a manner dependent on the axial thickness of the spacer elements, the sprocket can be arranged within the sprocket cassette in an axial region which has a dimension in an axial direction larger than the thickness of the sprocket main body. This allows or facilitates the arrangement of sprockets with different axial spacings between outer tooth contact surfaces of sprocket teeth situated outside the recess regions or recess-free outer axial face surfaces of axially adjacent sprockets. These recess-free outer axial face surfaces of the sprockets are generally situated at least radially within the respective root circle of a sprocket. It is however not intended to rule out that a recess-free outer axial face surface of a sprocket extends as far as into a tooth, optionally even as far as the tooth tip.

Since the sprocket main body of sprockets deformed by non-cutting processes substantially has a uniform thickness that corresponds to that of the sprocket blank, it is also the case with sprockets deformed by non-cutting processes that the question of the component stiffness of the sprockets, which are commonly formed as sprocket rings without material radially at the inside, is of major importance. In addition, or in the present case preferably as an alternative, to the local stiffening explained above by means of an axial projection, a sprocket, in particular a sprocket deformed by non-cutting processes, but basically also a sprocket manufactured by cutting processes, may be locally stiffened through the formation of local radial projections or local radial thickenings on the sprocket. The advantage of local radial stiffening by means of a local radial thickening lies in the fact that, as before, the sprocket can be produced from a relatively thin sprocket blank without losses of stiffness and without the formation of axial projections. The face sides of the sprocket main bodies can thus be planar.

It is basically possible for axial material recesses or displaced material portions on the face sides of sprockets to be compensated by means of such radial thickenings. This means that, where the sprocket is of axially thinner form, and thus exhibits local losses of component stiffness, owing to the formation of face-side recesses in upshift and downshift regions, these losses of stiffness can be compensated for by means of a radial material accumulation. The radial material accumulation is preferably realized on the sprocket main body in a radially inward direction towards the sprocket axis such that the radial material accumulation does not disrupt the defined tooth geometry.

Aside from axial material recesses and displaced material portions, such as the abovementioned recesses in the gearshift regions, a local radial material accumulation or thickening, and likewise the abovementioned locally stiffening axial projection, may also be arranged or formed on circumferential segments that have no axial recess whatsoever at least radially within the root circle. Here, it is for example possible for a circumferential region in the immediate circumferential vicinity and/or in the circumferential region of extent of a gearshift function tooth, for example catch tooth, release tooth, mobilizing tooth and/or stabilizing tooth, which at least during a gearshift operation is mechanically more highly loaded than regular teeth, to be formed with a radial thickening. Here, in the event of doubt, the radial thickening of the sprocket main body, in particular radially within the root circle of a sprocket, is to be defined in relation to the radial thickness of the same sprocket main body in the circumferential region of extent, or in the immediate circumferential vicinity, of a regular tooth without a particular gearshift function.

The immediate circumferential vicinity of a tooth is to be regarded as the tooth space adjacent to a tooth to both sides in the circumferential direction.

The local radial thickening for locally stiffening a sprocket is preferably arranged so as to be spaced apart in the circumferential direction from a connecting formation such as a connecting hole which, during the intended operation of the sprocket, is extended through by a connecting pin or connecting rivet. The formation of a connecting hole or else of a connecting pin or connecting web radially within the root circle of a sprocket always requires sufficient material of the sprocket main body in order to be able to form the connecting formation. The local radial thickening discussed here is preferably situated with a circumferential spacing to a connecting formation, in particular a connecting hole, which circumferential spacing is greater than the diameter of the connecting hole itself. The local radial thickening can then technically be regarded as a singular local stiffening which is independent of the connecting formation.

On a sprocket, it is preferably the case that, on a plurality of sprocket teeth, particularly preferably on more than 70% of the sprocket teeth, even more preferably on every sprocket tooth, a tooth contact surface on at least one side, particularly preferably on both sides, is formed by non-cutting deformation, even more preferably only by non-cutting deformation, of a tooth section and thus displacement of the outer surface thereof in an axial direction. The axial displacement of the outer surface may in this case be a displacement of the outer surface as a form of protruding projection axially away from a face surface of the sprocket and from the sprocket main body that bears the face surface, or as a form of stamped recess into the sprocket main body or in the direction of the sprocket main body. This basically applies to even-numbered and odd-numbered sprockets, but particularly to odd-numbered sprockets.

Since it is generally desired to achieve the best possible chain guidance already at the earliest possible point in time of the engagement of a tooth with the bicycle chain, it is generally the case that, on at least a plurality of sprocket teeth, the recess generated by deformation on one axial side of the sprocket or of the tooth, preferably on the outer side, and the projection generated on the opposite axial side of the sprocket or of the tooth, preferably on the inner side, have a greater dimension in the radial direction than in the circumferential direction. It is thus possible, even when the sprocket tooth is protruding incompletely into the engagement space of a chain link, for the axial movement clearance of the bicycle chain to be kept small and thus for the chain to be guided axially.

For the stabilization of the bicycle chain during riding operation, it can be advantageous to form a ramp on some teeth, for example on at least one release tooth and/or on at least one catch tooth. Likewise, in order to achieve an even greater stabilizing action, it can be particularly preferable to likewise provide a ramp on a mobilizing tooth that is adjacent to a release tooth provided with a ramp and/or on a mobilizing tooth that is adjacent to a catch tooth provided with a ramp.

Such a stabilizing ramp forms a radial and axial step on the tooth surface facing away from the respective next smaller sprocket, that is to say the inner tooth surface, of the tooth that has the ramp. Such a stabilizing ramp forms a ramp surface which points radially outwards, that is to say away from the sprocket axis, and on which radially inwardly facing edge surfaces of the bicycle chain can be supported. The outer surface facing in an axial direction, that is to say axially inwards towards the next larger adjacent sprocket, of the ramp may be the tooth contact surface that is effective in the event of complete tooth meshing engagement with the chain. Then, during conventional drive operation in the absence of a gearshift operation, the tooth provided with the ramp acts in the manner of a ramp-free tooth with regard to the axial chain guidance. The ramp surface facing outwards in the radial direction can, when engagement with the bicycle chain is beginning or ending at the respective sprocket, act as a riding-up surface for the chain. More specifically, during upshifting or downshifting of the chain, the radially outwardly facing ramp surface serves as a riding-up surface for inner link plates, that is to say link plates situated closer to the vertical longitudinal central plane of the bicycle that bears the sprocket, of chain links of the bicycle chain. By means of the radially outwardly facing ramp surface, the bicycle chain can be radially positioned in the most optimum manner possible during an upshift operation in order to thus adhere as closely as possible to the tangential condition that is expedient for smooth upshifting. Depending on the structural dimensional relationships present in a specific sprocket pairing, it is possible for the upshift behaviour to be individually optimized through the formation of the radially outwardly facing ramp surface at a radial location suitable for the respective upshift region. In the same way, by means of the radially outwardly facing ramp surface, the bicycle chain can be radially positioned in the most optimum manner possible during a downshift operation in order to thus adhere as closely as possible to the tangential condition that is expedient for smooth downshifting. Depending on the structural dimensional relationships present in a specific sprocket pairing, it is possible for the downshift behaviour to be individually optimized through the formation of the radially outwardly facing ramp surface at a radial location suitable for the respective downshift region.

By means of such ramps, the chain is stabilized particularly effectively whilst in meshing engagement with the largest sprocket.

In the case of backpedaling utilizing the freewheel that is conventionally present at the rear-wheel hub, the skew of the chain can under some circumstances have a destabilizing effect on the meshing engagement of the sprocket with the bicycle chain. Here, in particular in those regions of the front-side face surface in which an upshift or downshift recess formation is arranged, the chain can jump off in an undesired manner, or the chain can run over onto the next smaller sprocket in an undesired manner.

Since it is thus the case on relatively large sprockets, for example on the larger 40% of the sprockets of a sprocket cassette, that in particular the release teeth and any mobilizing teeth adjacent thereto, owing to their design, assist a changeover of the chain to the next smaller sprocket, for which the skew acts, a ramp is preferably formed there. The problem of the skew of the chain during backpedaling relates particularly to the gearshift-relevant teeth of a downshift region. Therefore, ramps are formed preferably on the catch tooth and on the mobilizing tooth thereof in order to stabilize the chain. The described ramp has in particular a stabilizing action because it ensures that the tooth in question is formed with a smaller axial thickness not over its entire tooth height but only in the radially outermost section from the tooth tip to the radially outwardly facing ramp surface. The axially inwardly facing ramp surface, arranged radially within same, of the tooth in question can, in the manner described above, guide the chain in an axially exact manner during chain engagement in the absence of a gearshift owing to the unchanged chain-guiding dimension thereof in relation to the other teeth of the same sprocket that are designed for engaging with similar chain links.

The at least one ramp not only holds the chain itself in the event of a highly adverse action of the chain skew with respect to the front chain wheel at the sprocket but also assists the downshifting of the chain onto the larger, in particular onto the largest, sprocket or upshifting of the chain from the larger, in particular largest, sprocket onto the next smaller sprocket. The at least one ramp, preferably the plurality of ramps, specifically creates the possibility that the chain can be held in stable fashion and with physical guidance even in a position situated radially further to the outside on the sprocket in the gearshift-relevant regions, that is to say upshift region and downshift region, of a sprocket than would be the case during conventional tooth meshing engagement of a tooth without such a ramp, in the case of which the ramp-free tooth, such as catch tooth, release tooth or a mobilizing tooth respectively adjacent thereto, engages radially fully into the intermediate spaces of the chain links.

Thus, the ramps stabilize the chain against the generally inevitable chain skew with respect to the front chain wheel when the chain-guiding roller of the derailleur is oriented so as to be coplanar with the sprocket for the purposes of holding the chain on the larger sprocket, and the chain skew acts so as to oppose retention of the chain on the sprocket. Furthermore, the ramps assist a changeover of the chain when the chain-guiding roller of the derailleur is oriented so as to be coplanar with the sprocket that will guide the chain in future, whilst the chain is still in engagement with the sprocket that is presently guiding the chain.

The ramps may also be formed on sprockets smaller than the largest sprocket, as long as the chain skew at the sprocket has a component acting towards the outside. The ramps are preferably formed in each case on that side of the respective sprocket which points away from the next smaller sprocket. Since the chain skew however decreases in magnitude towards the medium-sized sprockets of a sprocket cassette, the ramps are particularly preferably formed on the two, three or four largest sprockets that are situated between the chain line and the bicycle longitudinal central plane.

An above-described ramp may advantageously also be formed by deformation. It is again possible, for this purpose, for material of a tooth region to be displaced locally with deformation action in the thickness direction of the tooth, preferably from the outer side to the inner side on which the ramp is to be formed. By means of this local material displacement, too, it is possible for a recess to be formed locally on the outer side of a tooth bearing the ramp and for a projection to be formed locally on the opposite inner side. The projection, with its axial outer surface as a tooth contact surface, provides a chain-guiding dimension and, with its radially outwardly facing surface, provides the abovementioned ramp surface.

By contrast to conventional teeth, it is the case on teeth provided with ramps that the recess on the outer side and the projection on the inner side are preferably formed with a shorter dimension in the radial direction than in the circumferential direction.

The production of sprockets by deformation, in particular with base material with a thickness equal to or smaller than the chain-guiding dimension achieved by deformation operations on the sprocket teeth, furthermore, makes it possible for outer tooth contact surfaces to be relocated outwards beyond an outer face surface of the sprocket and allows inner tooth contact surfaces to be relocated inwards beyond an inner face surface of the sprocket.

It is thus possible for the outer tooth contact surfaces of gearshift function teeth to project axially beyond the outer face surface of the sprocket, or sprocket main body, which bears them, and/or for the inner tooth contact surfaces of stabilizing teeth to project axially inwards beyond the inner face surface of the sprocket, or sprocket main body, which bears them.

It is basically also possible for tooth contact surfaces of other teeth to project beyond a face surface of the sprocket that bears them. In the case of the discussed gearshift function teeth and the stabilizing teeth, the position of the outer and of the inner tooth contact surfaces however plays the particular role described above.

Furthermore, the non-cutting deformation makes it easier to produce oblique tooth contact surfaces, which cannot be achieved, or can be achieved only with disproportionately high outlay, with cutting manufacturing processes. It is therefore preferable that a sprocket produced by non-cutting deformation has at least one tooth whose outer surface facing in an axial direction, in particular whose tooth contact surface, is inclined about a first inclination axis parallel to the radial direction, and/or about a second inclination axis orthogonal to the radial direction and to the axial direction, relative to a reference plane that is orthogonal to the sprocket axis. The second inclination axis generally runs in the direction of a tangent to a circumferential direction encircling the sprocket axis.

In FIG. 1, a preferred embodiment of a bicycle rear-wheel sprocket cassette with twelve coaxial sprockets, which are connected to one another for common rotation without slip about the sprocket axis R that is orthogonal with respect to the plane of the drawing of FIG. 1, is denoted generally by 1.

The view of the sprocket cassette 1 in FIG. 1 corresponds to the reference view of the present application, that is to say in a viewing direction along the sprocket axis R, wherein the smallest sprocket is situated closest to the viewer of FIG. 1 and the largest sprocket is situated furthest from the viewer of FIG. 1.

Figure 8:
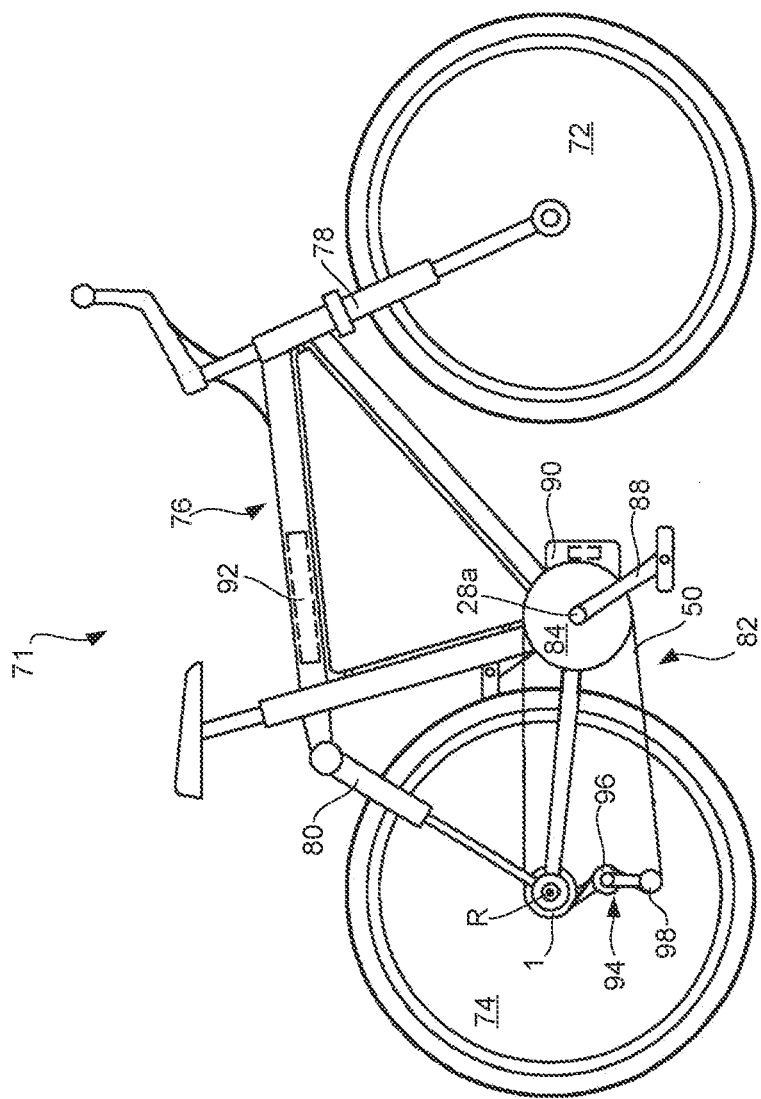
FIG. 8 shows a bicycle equipped with the sprocket cassette of FIGS. 1 to 1B.

The arrow D shows the drive direction of rotation of the sprocket 18 during drive operation on the bicycle 70 shown in FIG. 8.

The stepping of the numbers of teeth of the sprocket cassette 1 of FIG. 1 is as follows: 10- 12-14-16-18-21-24-28-32-38-44-52. The sprocket cassette 1 thus comprises a smallest sprocket 10 with ten teeth, a sprocket 12 axially adjacent thereto and with twelve teeth, a next larger sprocket 14 with fourteen teeth, an in turn next larger sprocket 16 with sixteen teeth, and a sprocket 18 axially adjacent thereto and with eighteen teeth.

The next larger sprocket 20 adjacent to the sprocket 18 is a transition sprocket with twenty-one teeth. This is followed by a sprocket 22 with twenty-four teeth, a sprocket 24 with twenty-eight teeth, a sprocket 26 with thirty-two teeth, a sprocket 28 with thirty-eight teeth, a sprocket 30 with forty-four teeth, and finally, as largest sprocket, a sprocket 32 with fifty-two teeth.

The two sprockets 18 and 22, which are axially adjacent to the single odd-numbered transition sprocket 20 in the sprocket cassette 1, form a transition sprocket assembly 19 together with the transition sprocket 20.

In order to facilitate gearshift operations between axially adjacent sprockets, the sprockets, with the exception of the smallest sprocket 10, each have at least one upshift region 34 with an upshift recess formation 36 and preferably exactly one release tooth 38 and each have at least one downshift region 40 with a downshift recess formation 42 and preferably exactly one catch tooth 44.

For the sake of better clarity, in FIG. 1, only the largest sprocket 32 with fifty-two teeth is provided with reference designations for the upshift region 34 with the upshift recess formation 36 and the release tooth 38 and for the downshift region 40 with the downshift recess formation 42 and the catch tooth 44.

The regions "upshift region 34" and "downshift region 40" always relate to that sprocket on which the regions are formed. This means that the upshift region 34 facilitates a shift of a bicycle chain from the sprocket that bears the upshift region 34 onto the axially adjacent next smaller sprocket, and the downshift region 40 facilitates a shift of the bicycle chain from the next smaller sprocket onto the sprocket that bears the downshift region 40.

The recess formations 36 and 42 allow the bicycle chain to axially approach the sprocket that bears the respective recess formations, because in particular outer link plates can protrude axially into the recess formations, which are configured as recesses on the axial side surfaces. Without recess formations being formed at the locations, the outer link plates of the bicycle chain would collide with the side surface of the sprocket, which would limit the axial approach of the bicycle chain to the side surface that has the recess formations.

The recess formations 36 and 42 may have multiple different surface facets which, relative to one another, may have a different position with respect to the sprocket axis R and/or a different inclination. It can be achieved in this way that the bicycle chain can protrude only with a predetermined relative position with respect to its outer link plates and inner link plates into the recess formations 36 or 42 and, in the case of a relative position that is offset by one chain pitch in the chain circulating direction, the bicycle chain is deflected axially by a surface facet. The surface facet may be designed such that it can penetrate into the intermediate space between two outer link plates, which follow one another in the chain circulating direction, towards an inner link plate situated between the outer link plates, but physically deflects an outer link plate situated between two inner link plates axially away from the sprocket that bears the surface facet.

Catching teeth 44 of the individual sprockets of the rear-wheel cassette 1 are, in the reference view of the rear-wheel cassette 1, situated on a spiral 44w that turns radially outwards in the counterclockwise direction.

FIG. 1A illustrates the sprocket cassette 1 in a viewing direction orthogonal to the sprocket axis R. For explanatory purposes, the abovementioned longitudinal central plane LME, which is orthogonal with respect to the sprocket axis R, of the bicycle that bears the sprocket cassette 1 is illustrated by dashed lines. The actual spacing between the longitudinal central plane LME and the sprocket cassette 1 is greater than in the truncated illustration of FIG. 1A.

The sprockets 10 to 26 are preferably formed in one piece as a so-called sprocket dome 15, for example by machining from a solid piece of material. By contrast to this, it is alternatively possible for the two smallest sprockets 10 and 12 to be formed as individual sprockets. The two smallest sprockets 10 and 12 may then be connected by means of a grooved nut to the sprocket dome 15 of the sprockets 14 to 26. The three largest sprockets 28, 30 and 32 are each formed as individual sprocket and are each connected to the largest sprocket 32 for joint rotation. The sprocket dome 15 may be connected in a manner known per se by means of pins 73 (see FIG. 14) or rivets or by cohesion to the struts of the sprocket 32 for the transmission of torque.

The axial spacing between the directly adjacent sprockets is generally less than the tooth height of a normally shaped tooth of the sprockets. The small axial spacing between the individual sprockets requires a very narrow chain and an extremely precise configuration of the toothed circumferential regions of the individual sprockets.

FIG. 1B shows the sprocket cassette 1 from the inside, that is to say as viewed along the sprocket axis R from the longitudinal central plane LME. Where the smaller sprockets are visible through the passages formed between the struts or arms of the largest sprocket 32, they are denoted by reference designations. Otherwise, for the further description of the largest sprocket, reference is made to the explanation of FIGS. 7 to 7B that follows below.

Figure 2A:
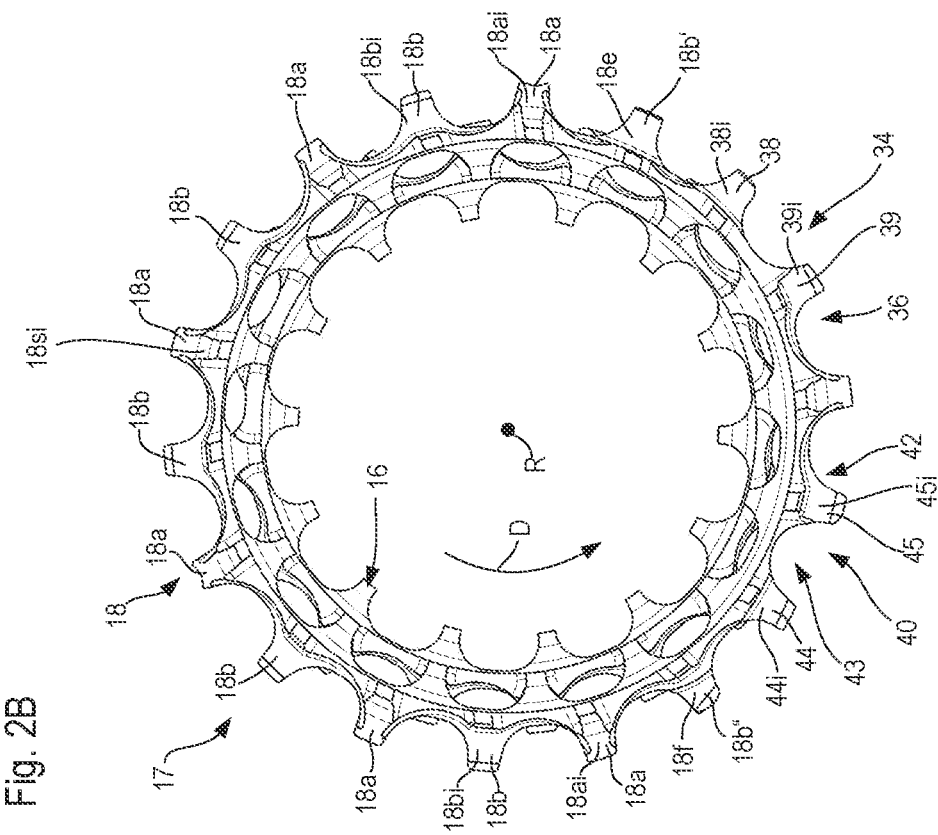
FIG. 2A shows a bicycle rear-wheel sprocket pairing of the sprocket cassette of FIGS. 1 to 1B having a smaller sprocket with 16 teeth and having a larger sprocket with 18 teeth in a reference view.
Figure 2B:
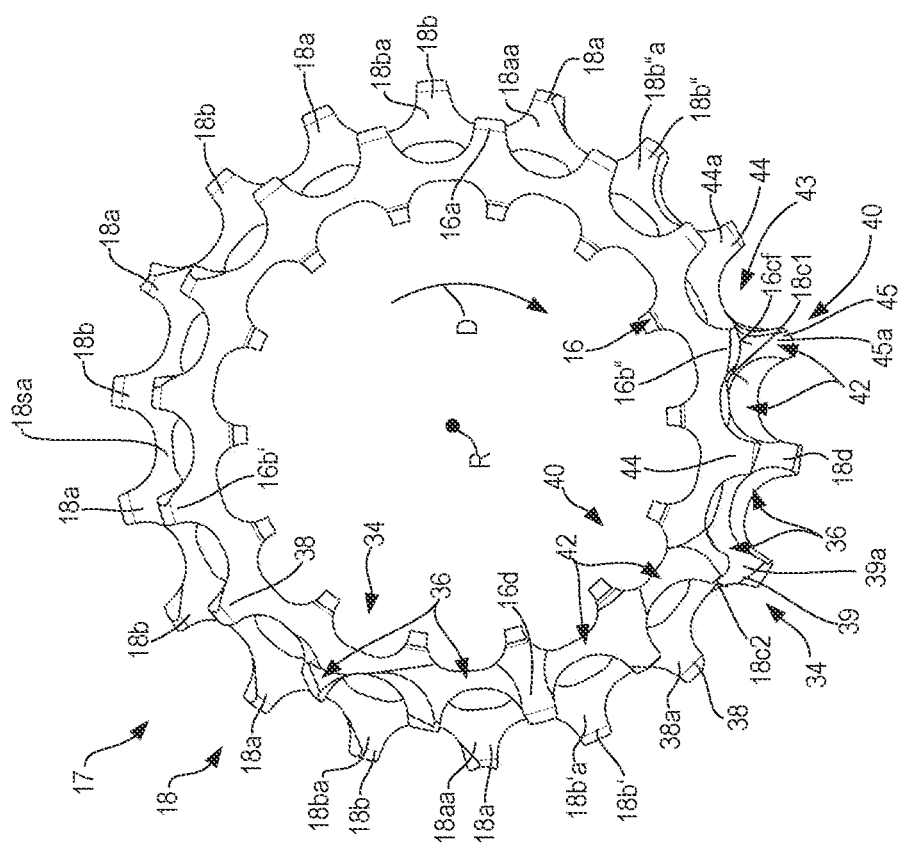
FIG. 2B shows the bicycle rear-wheel sprocket pairing from FIG. 2A viewed in an opposite direction.

FIGS. 2A and 2B illustrate a bicycle rear-wheel sprocket pairing 17, specifically, in FIG. 2A, in a reference view from the outside and, in FIG. 2B, as viewed in the opposite axial direction from the inside, that is to say such that the larger sprocket 18 is situated closer than the smaller sprocket 16 to the viewer of FIG. 2B.

The sprocket 18, like the sprockets 10, 12, 14 and 16, is, as an even-numbered sprocket, formed preferably as a synchronizing sprocket with relatively thick teeth 18a and with relatively thin teeth 18b. The axial thickness, more specifically the chain-guiding dimension, of the relatively thick outer link plate sprocket teeth 18a is selected here such that these fit only into the engagement space of an outer link plate chain link but is of greater magnitude than the spacing between two parallel inner link plates of an inner link plate chain link. A bicycle chain can therefore, with regard to its sequence of chain link types that alternate along the chain circulating path, mesh with the sprocket 18 only in exactly one relative orientation, specifically when outer link plate chain links are assigned to the outer link plate sprocket teeth 18a. Owing to the even number of chain links in one circulation of the bicycle chain and owing to the even number of teeth of the sprocket 18, an assignment of a tooth to a chain link type, once established, is maintained throughout the entire duration of engagement of the sprocket 18 with the chain, throughout all sprocket revolutions. The same preferably applies to the other even-numbered sprockets 10, 12, 14, 16, 22, 24, 26, 28, 30 and 32 of the sprocket cassette 1.

Like the sprockets 12, 14 and 16, the sprocket 18 also has only exactly one upshift region 34 with exactly one upshift recess formation 36 and with exactly one release tooth 38. The sprocket 18 furthermore has only exactly one downshift region 40 with exactly one downshift recess formation 42 and with exactly one catch tooth 44. In the reference view, the release tooth 38 is the first tooth which follows the upshift recess formation 36 in the drive direction of rotation D and which is not modified, on its tooth surface facing towards the smaller sprocket 16, by the upshift recess formation 36. The release tooth 38 is thus, in the drive direction of rotation D, the first tooth to which the upshift recess formation 36 no longer extends.

The downshift region 40 has a shorter spacing to the upshift region 34 in the drive direction of rotation D than counter to the drive direction of rotation D. The single downshift recess formation 42 extends counter to the drive direction of rotation D no longer as far as the single catch tooth 38, which is consequently the first tooth which is no longer modified in terms of its configuration by the downshift recess formation 42 and which follows the downshift recess formation 42 counter to the drive direction of rotation D.

On the sprocket 18, it is particularly advantageous for the wear resistance of the sprocket 18 that only three teeth are present between the catch tooth 44 and the release tooth 38 in the drive direction of rotation D proceeding from the catch tooth 44. Between the release tooth 38 and the catch tooth 44 in the drive direction of rotation D proceeding from the release tooth 38, there are thirteen teeth, which corresponds to the number of teeth of the sprocket 18 minus five.

On the middle tooth of the three teeth situated in the drive direction of rotation D between the catch tooth 44 and the release tooth 38, there is formed a deflecting surface 18d, which is both part of the downshift recess formation 42 and part of the upshift recess formation 36. The deflecting surface 18d, which is reset inwards relative to the outer face surface of the sprocket 18 but is elevated and projects axially in relation to the recess sections adjacent thereto in the circumferential direction, is designed to engage into the intermediate space between two outer link plates of a bicycle chain. If, for any reason, not an inner link plate but an outer link plate should be situated at the location of the deflecting surface 18d during the gearshift operation, abutment of the outer link plate against the deflecting surface 18d causes the chain to be physically prevented from axially approaching the face surface of the sprocket 18 in the manner required for a changeover of the chain, and the chain is thus deflected.

In the rear view of the sprocket 18 in FIG. 2B, it can be seen that the thin tooth 18b that is adjacent to the release tooth 38 in the drive direction of rotation D has, on its tooth surface averted from the smaller sprocket 16, a recess surface 18e, which makes this special thin tooth 18b a release-side mobilizing tooth 18b' of an upshift operation, by means of which an inner link plate chain link, engaged thereby, of a bicycle chain is provided with an axial movement clearance greater than that provided by a conventional thin tooth 18b.

It can likewise be seen in FIG. 2B that the thin tooth 18b that is adjacent to the catch tooth 44 counter to the drive direction of rotation D has, on its tooth surface averted from the smaller sprocket 16, a recess surface 18f, which makes this special thin tooth 18b a receiving-side mobilizing tooth 18b" of a downshift operation, by means of which an inner link plate chain link, engaged thereby, is provided with an axial movement clearance greater than that provided by a conventional thin tooth 18b.

The upshift mobilizing tooth 18b' thus assists an upshift operation by way of the movement clearance that it provides for the bicycle chain. The downshift mobilizing tooth 18b" assists a downshift operation.

Of the 13 teeth situated between the release tooth 38 and the catch tooth 44 in the drive direction of rotation D, those teeth which are respectively directly adjacent to the release tooth 38 and to the catch tooth 44 are thus formed as mobilizing teeth 18b' and 18b". For reliable guidance of the chain on the sprocket 18 during meshing engagement, the other teeth are designed in the manner described above as thick outer link plate sprocket teeth 18a and thin inner link plate sprocket teeth 18b.

That tooth 45 of the sprocket 18 which is situated behind the tooth 16b" of the sprocket 16 as seen in the reference view has, on its tooth surface facing towards the smaller sprocket 16, a deflecting surface 45a which is part of the downshift recess formation 42 of the downshift region 40. An inner link plate chain link can pass the deflecting surface 45a, on the outer side of the sprocket 18 facing towards the smaller sprocket 16, towards the catch tooth 44 of the sprocket 18, whereas an outer link plate chain link cannot.

The deflecting surface 45a ends radially at the inside at a ramp 18c1, which has a radially outwardly facing, preferably likewise convexly curved support surface that projects axially relative to the deflecting surface 45a. The chain skew during chain engagement with the sprockets 16 and 18 situated axially outside the chain line assists the abutment of the inner link plate against the deflecting surface 45a and against the ramp 18c1, because, on sprockets situated outside the chain line, the chain skew gives rise to an axially inwards force on the engaging sprocket.

During downshifting of the chain from the sprocket 16 onto the sprocket 18, a radially inwardly facing inner edge 54c (see FIG. 5) of an inner link plate of an inner link plate chain link 54 (see FIG. 5) can be supported physically both on the tip surface 16cf of the tooth 16b" and on the ramp 18c1 of the tooth 45 situated axially behind the tooth 16b". Between the chain roller axes 55 (see FIG. 5), the inner edge 54c is of concave shape. For the most reliable possible support over the largest possible area, the tip surface 16cf is therefore of convex shape, wherein the leading end of the tip surface 16cf in the drive direction of rotation D is situated radially further to the inside than the trailing end of the tip surface 16cf. The convex configuration of the tip surface 16cf is preferably of complementary form with respect to the concave inner edge 54c of the chain 50.

That tooth space 43 which leads the catch tooth 44 of the sprocket 18 as viewed in the drive direction of rotation D is, as a gearshift tooth space, enlarged in a radially inward direction in order, during downshifting onto the sprocket 18, to provide a movement space in a radially inward direction for the chain roller that directly leads the catch tooth 44.

The sprockets 12, 14, 16 and 18 are intended to perform upshifts in each case only in the upshift region 36 from the respectively larger sprocket to the respectively axially adjacent next smaller sprocket. This means that, at each sprocket 12, 14, 16 and 18, the chain is changed over from the larger sprocket onto the next smaller sprocket only at exactly one location, specifically such that the respective release tooth 38 is the final tooth of the larger sprocket that is still in engagement with the chain. Chain links that follow the release tooth 38 counter to the drive direction of rotation D slide laterally on the teeth that follow the release tooth 38 counter to the drive direction of rotation D, and in so doing utilize the respective upshift recess formation 36 as movement space.

It is likewise the intention that, on the sprockets 12, 14, 16 and 18, a changeover of the chain from the smaller to the larger sprocket takes place only at one location, specifically always only such that the catch tooth 44 of the larger sprocket is the first tooth of the larger sprocket that engages between two link plates, generally outer link plates, of a chain link. Those chain links which lead the catch tooth 44 in the drive direction of rotation D approach the respectively larger sprocket whilst utilizing the downshift recess formation 42, such that the outer link plate chain link assigned to the catch tooth 44 can move axially into the engagement region thereof.

If the gearshift command is issued by the bicycle rider in such a way that, on the larger sprocket rotating in the drive direction of rotation D, the respective relevant gearshift function tooth, that is to say release tooth 38 or catch tooth 44, has just passed the gearshift region on the rear wheel, the initiated gearshift operation takes place during the next sprocket revolution, when the release tooth 38 or the catch tooth 44 moves again into that angle region or gearshift region relative to the derailleur which is relevant for the execution of a gearshift operation. The gearshift latency both for downshifting and for upshifting at the sprockets 10, 12, 14, 16 and 18 is at most one sprocket revolution, which is commonly tolerated by bicycle riders. From experience, longer shift latencies are no longer tolerated, but are perceived as a malfunction.

That tooth 39 which is adjacent to the single release tooth 38 of the upshift region 34 counter to the drive direction of rotation D, and which has the outer tooth contact surface 39a belonging to the upshift recess formation 36 and thus offset inwards away from the viewer of FIG. 2A, is a release-side stabilizing tooth. That tooth 45 which is adjacent to the single catch tooth 44 of the downshift region 40 in the drive direction of rotation D, and which has, as outer tooth contact surface, the deflecting surface 45a belonging to the downshift recess formation 42 and thus offset inwards away from the viewer of FIG. 2A, is a receiving-side stabilizing tooth.

Figure 9:
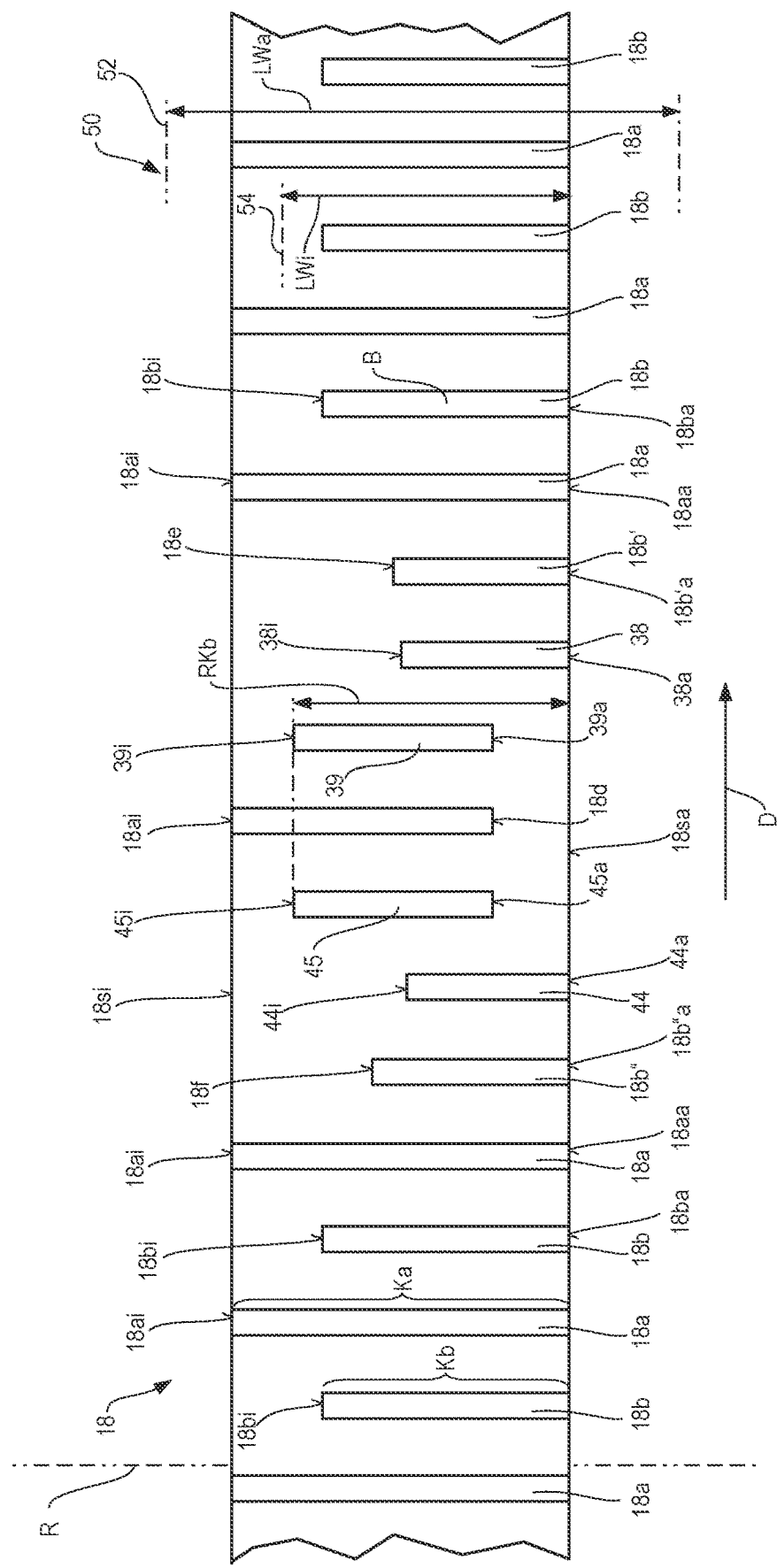
FIG. 9 is a highly schematic illustration of a developed view of the sprocket 18 from the sprocket cassette of FIGS. 1 to 1B.

FIG. 9 shows a highly schematic developed view of the sprocket 18. The face surfaces which are advantageously orthogonal with respect to the sprocket axis R, that is to say the outer face surface 18sa and the inner face surface 18si, are oriented orthogonally with respect to the plane of the drawing of FIG. 9. Sprocket teeth are merely highly schematically symbolized by rectangles in order to be able to illustrate the axial dimensions thereof relative to one another.

Conventional outer link plate sprocket teeth 18a have an outer tooth contact surface 18aa and an inner tooth contact surface 18ai. Likewise, conventional inner link plate sprocket teeth 18b have an outer tooth contact surface 18ba and an inner tooth contact surface 18bi.

The release tooth 38 has an outer tooth contact surface 38a and an inner tooth contact surface 38i. Likewise, the catch tooth 44 has an outer tooth contact surface 44a and an inner tooth contact surface 44i.

The release-side mobilizing tooth 18b' has an outer tooth contact surface 18b'a and the surface 18e as inner tooth contact surface. The receiving-side mobilizing tooth 18b" has an outer tooth contact surface 18b"a and the surface 18f as inner tooth contact surface.

The release-side stabilizing tooth 39 has the outer tooth contact surface 39a and the inner tooth contact surface 39i. The receiving-side stabilizing tooth 45 has the deflecting surface 45a as outer tooth contact surface and has an inner tooth contact surface 45i.

A chain-guiding dimension K is the axial spacing between the outer tooth contact surface and the inner tooth contact surface of a tooth. The chain-guiding dimension Ka of an outer link plate sprocket tooth 18a is therefore, as illustrated in FIG. 9, larger than the chain-guiding dimension Kb of an inner link plate sprocket tooth 18b. For the sake of better clarity, the chain-guiding dimensions have not been indicated for all teeth of the sprocket 18 in FIG. 9.

One reference tooth on the sprocket 18 has been selected for the purposes of describing the relative positions and extents in the axial direction of the sprocket teeth with respect to one another. The reference tooth is an inner link plate sprocket tooth 18b which is situated outside the gearshift section, beginning with and including the receiving-side mobilizing tooth 18b", in the drive direction of rotation D, as far as and including the release-side mobilizing tooth 18b', and which is therefore formed as a standard inner link plate sprocket tooth 18b. These are the inner link plate sprocket teeth 18b which have the largest chain-guiding dimension Kb of all inner link plate sprocket teeth of the sprocket 18. The sprocket 18 has a total of five of these inner link plate sprocket teeth 18b. Each of these can be the reference tooth B.

The outer tooth contact surface 18ba of the reference tooth B defines, as tooth contact reference surface, an axial reference position. In the example illustrated, this lies in the plane of the outer face surface 18sa of the sprocket 18. The outer tooth contact surfaces 38a and 44a of the release tooth 38 and of the catch tooth 44 respectively and the outer tooth contact surfaces 18b'a and 18b"a of the release-side mobilizing tooth 18b' and of the receiving-side mobilizing tooth 18b" respectively preferably also lie in the plane of the outer face surface 18sa of the sprocket 18 and thus at the same reference position as the reference tooth B.

The inner tooth contact surface 39i and 45i of the release-side stabilizing tooth 39 and of the receiving-side stabilizing tooth 45 respectively are situated axially further remote from the axial reference position than the inner tooth contact surface 18bi of the reference tooth B. The inner tooth contact surfaces 39i and 45i are situated at the same axial position in the example illustrated.

For comparison, the clearance width LWi of the inner link plate chain links 54 and the clearance width LWa of the outer link plate chain links 52 of the chain 50 are illustrated in FIG. 9. The axial spacing of the inner tooth contact surfaces 39i and 45i to the axial reference position is smaller than the clearance width LWi, such that the release-side stabilizing tooth 39 and the receiving-side stabilizing tooth 45 are each inner link plate sprocket teeth, in accordance with the location of their arrangement.

In the illustrated example of the sprocket 18, the axial spacing of the inner tooth contact surface 18e of the release-side mobilizing tooth 18b' to the axial reference position, that is to say in the present example the chain-guiding dimension of the release-side mobilizing tooth 18b', is greater than the axial spacing of the inner tooth contact surface 38i of the release tooth 38 to the axial reference position, and in the present example is thus greater than the chain-guiding dimension of the release tooth 38.

The axial spacing of the inner tooth contact surface 38i to the axial reference position is in turn greater than the axial spacing of the inner tooth contact surface 44i of the catch tooth 44 to the axial reference position, and in the present example is thus greater than the chain-guiding dimension of the catch tooth 44.

The axial spacing of the inner tooth contact surface 18f of the receiving-side mobilizing tooth 18b" to the axial reference position, and thus in the present example the chain-guiding dimension of the receiving-side mobilizing tooth 18b", is greater than the axial spacing of the inner tooth contact surface 18e of the release-side mobilizing tooth 18b' to the axial reference position.

Owing to the upshift recess formation 36 and owing to the downshift recess formation 42, the outer tooth contact surfaces 39a, 45a and 18d of the release-side stabilizing tooth 39, of the receiving-side stabilizing tooth 45 and of the outer link plate sprocket tooth situated between these are arranged so as to be offset inwards from the axial reference position towards the inner face surface 18si of the sprocket 18. Therefore, in the illustrated example, the chain-guiding dimension of the two stabilizing teeth 39 and 45 is shorter than the chain-guiding dimension Kb of the reference tooth B, even though the axial spacings of the inner tooth contact surfaces 39i and 45i thereof to the axial reference position are each greater than the axial spacing of the inner tooth contact surface 18bi to the axial reference position.

In the region of the release tooth 38 and of the release-side mobilizing tooth 18b', the chain 50, when in engagement with the sprocket 18, has a large axial movement clearance in order that the chain 50 can, during an upshift operation, be changed over in an axially outward direction onto the adjacent sprocket 16 by the derailleur 94 (see FIG. 8).

Likewise, the chain 50, when in engagement with the sprocket 18, is guided axially with a relatively large movement clearance in the region of the catch tooth 44 and of the receiving-side mobilizing tooth 18b" in order to facilitate catching of the chain 50 during downshifting from the sprocket 16, which is adjacent axially to the outside, onto the sprocket 18.

When no gearshift operation of the chain 50 in an outward direction away from the sprocket 18 is to take place, the stabilizing teeth 39 and 45, owing to the position of the inner tooth contact surfaces 39i and 45i thereof, stabilize the chain in engagement with the sprocket 18 by restricting the axial movement clearance provided at the teeth 18b', 38, 44 and 18b". The release tooth 38 and the catch tooth 44 in particular, as outer link plate sprocket teeth, provide a particularly large axial movement clearance.

The sprocket 18 is the smallest of three sprockets 18, 20 and 22 of a transition sprocket assembly 19, which, with the sprocket 20, has the only odd-numbered sprocket of the rear-wheel cassette 1.

Figure 3:
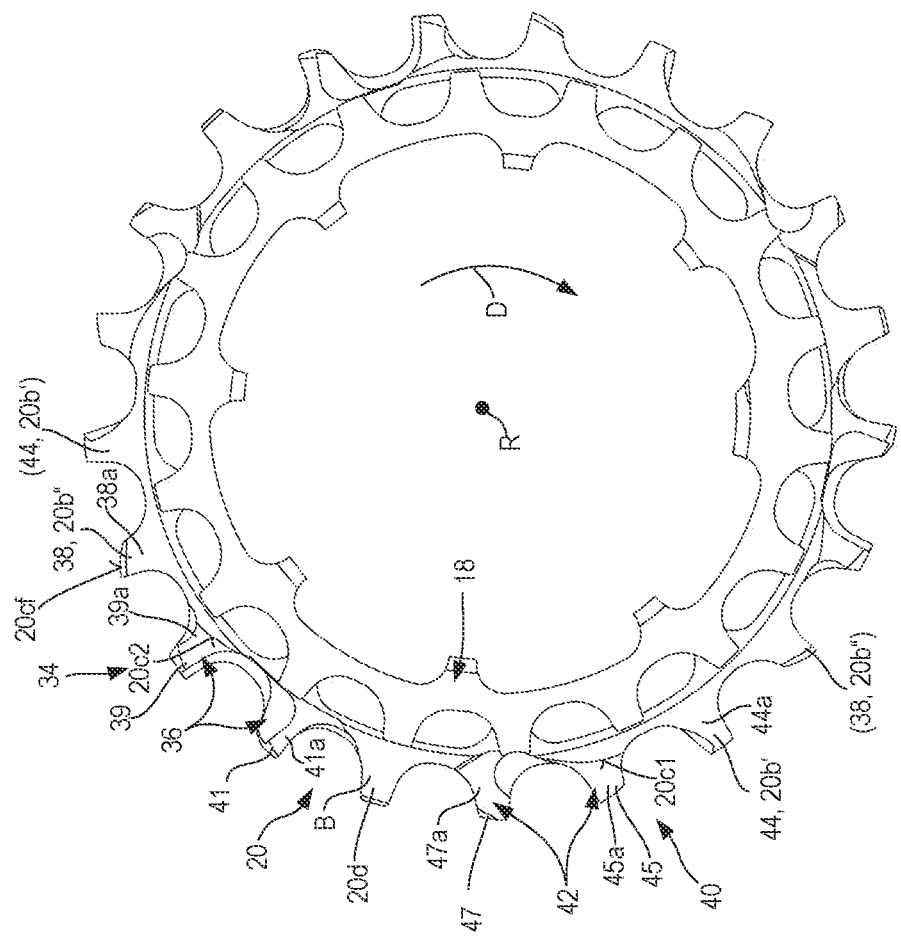
FIG. 3 shows a bicycle rear-wheel sprocket pairing of the sprocket cassette of FIGS. 1 to 1B having a smaller sprocket with 18 teeth and having a larger sprocket with 21 teeth in a reference view, wherein the rear-wheel sprocket pairing belongs to a transition sprocket assembly with a total of three sprockets.

FIG. 3 shows, in a reference view, the smaller sprocket pairing of the sprockets 20 and 18 of the transition sprocket assembly 19.

Identical reference designations and identical lowercase alphabetic characters following a reference designation at the sprocket 20 denote functionally identical components or component sections of the sprockets 16 or 18, which are denoted there by identical reference designations and/or, if appropriate, by identical lowercase alphabetic characters.

A problem here lies in the fact that each tooth of the even-numbered sprocket 18 is, for the entire duration of the meshing engagement of the sprocket 18 with the bicycle chain, assigned the same chain link type for engagement between the respective link plates of the respective chain link.

However, on the odd-numbered sprocket 20 with 21 teeth, the chain link type assigned to a tooth for form-fitting engagement changes with every revolution. It is nevertheless the intention that, proceeding from the odd-numbered sprocket 20, the chain be transferred in a defined manner to the sprocket 18 during upshifting, and transferred in a defined manner to the sprocket 22 during downshifting, with regard to the relative position of the chain link sequence. At the even-numbered sprockets 20 and 22, the question of whether a tooth engages with an outer link plate chain link, or an inner link plate chain link should not be decided by chance; rather, it is the intention that a defined changeover of the chain be ensured through corresponding design of the transition sprocket assembly 19.

For this purpose, the transition sprocket 20 has three identical circumferential segments each with seven teeth which, in succession, form the entire circumference of the transition sprocket 20. In turn, each of the three circumferential segments has only exactly one release tooth 38 and only exactly one catch tooth 44. Likewise, each of the three circumferential segments has only exactly one upshift region 34 with exactly one upshift recess formation 36 and only exactly one downshift region 40 with exactly one downshift recess formation 36. Through the concatenation of the three circumferential segments, the gearshift latency of the transition sprocket 20 is very short. Five teeth are situated on the sprocket 20 between the catch tooth 44 and the release tooth 38 in the drive direction of rotation D. Six teeth are situated between two release teeth 38, or between two catching teeth 44, in the circumferential direction of the sprocket 20. It is thus the case that, if, during a downshift operation proceeding from the sprocket 18, a catch tooth 44 of the sprocket 20 is for any reason undesirably approached by an inner link plate, and therefore no form-fitting engagement of the catch tooth 44 with the bicycle chain occurs, the next catch tooth 44 of the sprocket 20 counter to the drive direction of rotation D is approached by an outer link plate, and therefore an outer link plate chain link, utilizing the movement space provided by the downshift recess formation 42, which outer link plate chain link can be caught by the catch tooth 44.

The same applies, mutatis mutandis, for the upshift operation and the release tooth 38 of the sprocket 20. If, immediately after an initiation of the upshift operation by the bicycle rider, an inner link plate chain link is in form-fitting engagement with the release tooth 38, the bicycle chain remains on the sprocket 20 until the next release tooth 38 counter to the drive direction of rotation D is in engagement with an outer link plate chain link and the bicycle chain can then, utilizing the movement space provided by the upshift recess formation 36, be changed over onto the smaller sprocket 18.

The catch tooth 44 and the release tooth 38 are highly advantageously arranged such that, in the case of concatenation of the three identical circumferential segments, the release tooth 38 and the catch tooth 44 are directly adjacent to one another. Since the teeth 38 and 44 are in any case specially designed as release tooth and catch tooth respectively, and generally have a relatively small chain-guiding dimension and are arranged close to the adjacent smaller sprocket 18, the teeth 38 and 44 do not only act as release tooth 38 and catch tooth 44 respectively; rather, the release tooth 38 forms a receiving-side mobilizing tooth 20b" for the catch tooth 44, and the catch tooth 44 forms a release-side mobilizing tooth 20b' for the release tooth 38.

By means of this dual function of release tooth 38 and catch tooth 44 in each case also as a mobilizing tooth 20b" and 20b' respectively, despite concatenation of three circumferential segments each with at least two teeth 38 and 44 which are modified and thus weakened in terms of their strength, no additional structural tooth weakening is necessary through formation of separate mobilizing teeth, which leads overall to a stable and wear-resistant transition sprocket 20.

As in the case of the sprocket 18 discussed above, it is also the case on the sprocket 20 that a release-side stabilizing tooth 39 is adjacent to the release tooth 38 counter to the drive direction of rotation D. Likewise, a receiving-side stabilizing tooth 45 is adjacent to the catch tooth 44 in the drive direction of rotation D. A tooth 41 whose outer tooth contact surface is recessed by the upshift recess formation 36 is adjacent to the release-side stabilizing tooth 39 counter to the drive direction of rotation D.

A tooth 47 whose outer tooth contact surface is recessed by the downshift recess formation 42 is adjacent to the receiving-side stabilizing tooth 45 in the drive direction of rotation D. Situated between the teeth 41 and 47 is the reference tooth B which, in the group of seven teeth that extends from the catch tooth 44, including the latter, in the drive direction of rotation D as far as the release tooth 38, including the latter, is that tooth, in this case in particular the inner link plate sprocket tooth, which has the largest chain-guiding dimension in terms of magnitude.

Figure 10:
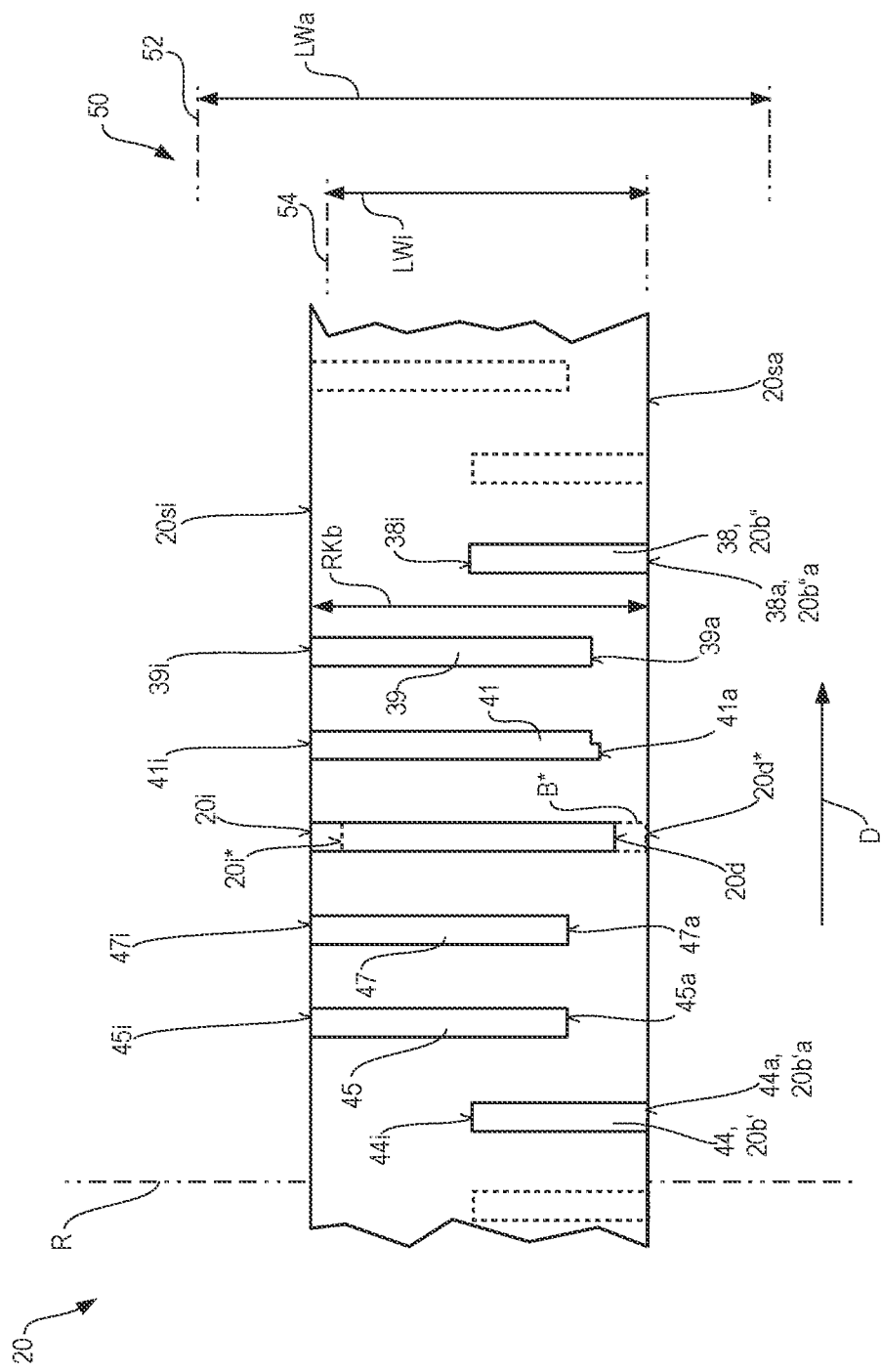
FIG. 10 is a highly schematic illustration of a developed view of the sprocket 20 from the sprocket cassette of FIGS. 1 to 1B.

FIG. 10 highly schematically illustrates a developed view, corresponding to FIG. 9, of the sprocket tooth structure of the transition sprocket 20. Since the abovementioned group of seven teeth from the catch tooth 44 in the drive direction of rotation D as far as the release tooth 38 is repeated three times over the circumference of the sprocket 20, it is sufficient to illustrate only the repeating basic pattern of seven teeth. As can be seen in FIG. 3, the release tooth 38 is followed in the drive direction of rotation D by the catch tooth 44 of the next group of seven.

Since the sprocket 20 has only inner link plate sprocket teeth, the sprocket 20 can be of axially thinner form than the sprocket 18 discussed above, which also has outer link plate sprocket teeth 18a. In the present exemplary embodiment, the axial spacing of the inner face surface 20si to the outer face surface 20sa is slightly greater than the clearance width LWi of the inner link plate chain links 54 of the bicycle roller chain 50 that interacts with the sprocket cassette 1. In the present example, the axial spacing of the face surfaces 20si and 20sa to one another is greater, by approximately 2%, than the clearance width LWi of the inner link plate chain links 54. The chain-guiding dimension of each tooth of the sprocket 20 is however smaller than the clearance width LWi.

In the region of the gearshift function teeth, that is to say catch tooth 44 and release tooth 38, which directly follow one another in the circumferential direction, the chain 50, which is merely schematically indicated in FIG. 10 and in FIG. 9, is provided with axially very weak guidance owing to the relatively small chain-guiding dimension of the teeth. In the example illustrated, the chain-guiding dimension of the catch tooth 44 and that of the release tooth 38 are equal in magnitude, the chain-guiding dimension being only insignificantly larger, for example by 1.5 to 4% in relation to the clearance width LWi, than half of the clearance width of the inner link plate chain link 54.

In order to be able to avoid an axial movement, initiated at a disadvantageous point in time, of the chain 50 towards the outside in the region of the directly successive gearshift function teeth 38 and 44, the tooth 39 is designed as a release-side stabilizing tooth. At the sprocket 20 that is formed exclusively from inner link plate sprocket teeth, the axially relatively thin form of the sprocket 20 means that there is less axial design freedom for the structural design of sprocket teeth than at the thicker sprocket 18.

In the present case, the sprocket tooth 39 together with the release tooth 38 that is adjacent thereto in the drive direction of rotation D forms a chain-guiding dimension that is common across multiple teeth, the chain-guiding dimension being formed from the axial spacing between the inner tooth contact surface 39i of the release-side stabilizing tooth 39 and the outer tooth contact surface 38a of the release tooth 38. The chain-guiding dimension that is common across multiple teeth is preferably larger in terms of magnitude than the clearance width LWi. This is technically easily possible because, owing to the conventional structure of a bicycle chain, one of the two directly successive teeth 38 and 39 engages into the engagement space of an outer link plate chain link 52 while the sprocket is in engagement with the chain. The chain-guiding dimension that is common across multiple teeth is likewise preferably smaller than the clearance width LWa of an outer link plate chain link 52.

In any case, the chain-guiding dimension, which is common across multiple teeth, of release tooth 38 and release-side stabilizing tooth 39 is larger in terms of magnitude than the largest chain-guiding dimension in terms of magnitude of an inner link plate sprocket tooth of the sprocket 20. In the exemplary embodiment illustrated, this is the sprocket tooth denoted using a solid line as reference tooth B, which is situated so as to be equally spaced apart from the release tooth 38 and from the catch tooth 44 in the circumferential direction.

That which has been stated above with regard to the release tooth 38 and with regard to the release-side stabilizing tooth 39 applies correspondingly to the catch tooth 44 and to the receiving-side stabilizing tooth 45 assigned thereto. The receiving-side stabilizing tooth 45 and the catch tooth 44 also form a chain-guiding dimension which is common across multiple teeth, the chain-guiding dimension being larger than the chain-guiding dimension of the reference tooth B and being of equal magnitude to the chain-guiding dimension, which is common across multiple teeth, of the teeth 38 and 39.

Since the catching of the chain on the catch tooth 44 during downshifting onto the sprocket 20 is more difficult to repeatably achieve than the release of the chain at the release tooth 38 during the upshifting of the chain in an outward direction from the sprocket 20, the axial spacing of the outer tooth contact surface 45a of the receiving-side stabilizing tooth 45 to the outer tooth contact surface 44a of the catch tooth 44 is of greater magnitude than the axial spacing of the outer tooth contact surface 39a of the release-side stabilizing tooth 39 to the outer tooth contact surface 38a of the release tooth 38. Thus, in the downshift region 40, a greater movement space for the axial approaching movement of the chain to the sprocket 20 is created ahead of the catch tooth 44 in the drive direction of rotation D than in the region for the release of the chain axially towards the outside, which region trails the release tooth 38.

Preferably, the outer tooth contact surfaces 38a and 44a of the release tooth 38 and the catch tooth 44 are oriented orthogonally with respect to the sprocket axis R and are preferably formed so as to be coplanar with the outer face surface 20sa, which is likewise preferably oriented orthogonally with respect to the sprocket axis R.

It is preferable if the inner tooth contact surfaces 45i, 47i, 20i, 41i and 39i of all sprocket teeth 45, 47, B, 41 and 39 situated within the circumferential extents of the downshift recess formation 42 and of the upshift recess formation 36 are oriented orthogonally with respect to the sprocket axis R, and more preferably are formed so as to be coplanar with the inner face surface 20si, which is preferably likewise oriented orthogonally with respect to the sprocket axis R.

To further facilitate the catching of a bicycle chain 50 during downshifting onto the sprocket 20 from the outside, the outer tooth contact surface 47a of the sprocket tooth 47 that is adjacent to the receiving-side stabilizing tooth 45 in the drive direction of rotation D is situated at the same axial position as the outer tooth contact surface 45a of the receiving-side stabilizing tooth 45. The outer tooth contact surface is arranged so as to be offset inwards axially from the axial position of the outer tooth surface 44a of the catch tooth 44 to an extent greater than that by which the outer tooth contact surface 41a of the sprocket tooth 41 that is adjacent to the release-side stabilizing tooth 39 counter to the drive direction of rotation D is arranged so as to be offset inwards from the outer tooth contact surface 38a of the release tooth 38. In this way, better axial chain guidance is achieved on the release side, that is to say in the circumferential region of extent of the upshift recess formation 36, than on the receipt side, that is to say in the circumferential region of extent of the downshift recess formation 42. The release side is therefore weakened in terms of its axial chain-guiding roller, as a result of reduction of chain-guiding dimensions, only to the extent that is required in order to implement an upshift operation. The outer tooth contact surface 41a is therefore offset outwards in relation to the outer tooth contact surface 39a.

The stabilizing teeth 39 and 45 in FIG. 10 constitute, with regard to the reference tooth B illustrated using a solid line, stabilizing teeth only of the second embodiment mentioned in the introductory part of the description. This is because the inner tooth contact surfaces 39i and 45i of the release-side stabilizing tooth 39 and of the receiving-side stabilizing tooth 45 respectively are axially spaced apart from the axial reference position not further than, but by the same distance as, the inner tooth contact surface 20i of the reference tooth B.

However, the stabilizing teeth 39 and 45 form, with the gearshift function tooth, that is to say release tooth 38 or catch tooth 44, assigned thereto by arrangement in the same gearshift function region of upshift region 34 and downshift region 40, an axial chain-guiding dimension RKb which is common across multiple sprocket teeth and which not only does not fall below, but rather even exceeds, that of the reference tooth B used here as the inner link plate sprocket tooth with the largest chain-guiding dimension Kb. Preferably, the chain-guiding dimension RKb which is common across multiple sprocket teeth does not fall below the clear axial width LWi of an inner link plate chain link of a bicycle chain that cooperates with the sprocket 20 in a drive arrangement of a bicycle. The chain-guiding dimension RKb which is common across multiple sprocket teeth particularly preferably even exceeds the clear axial width LWi for the purposes of improved stabilization of the bicycle chain on the sprocket 20 that meshes with the bicycle chain. The axial chain-guiding dimension, which is common across multiple sprocket teeth corresponds, as a release-side chain-guiding dimension which is common across multiple sprocket teeth, to the axial spacing of the inner tooth contact surface 39*i* of the release-side stabilizing tooth 39 to the outer tooth contact surface 38*a* of the release tooth 38. The axial chain-guiding dimension, which is common across multiple sprocket teeth corresponds, as a receiving-side chain-guiding dimension which is common across multiple sprocket teeth, to the axial spacing of the inner tooth contact surface 45*i* of the receiving-side stabilizing tooth 45 to the outer tooth contact surface 44*a* of the catch tooth 44. In the exemplary embodiment illustrated, the release-side and receiving-side chain-guiding dimensions which are common across multiple sprocket teeth are equal.

In FIG. 10, dashed lines are used to illustrate an alternative reference tooth B* which has the same chain-guiding dimension as the above-discussed reference tooth B of the sprocket 20 but, in relation thereto, is arranged so as to be offset axially towards the outer face surface 20*sa*. The axial offset of the alternative reference tooth B* relative to the reference tooth B may for example be between 0.1 and 0.3 mm, preferably 0.2 mm. The chain-guiding widths of the two reference teeth B and B* are equal in terms of magnitude in the exemplary embodiment illustrated. Accordingly, the inner tooth contact reference surface 20*i*\* of the alternative reference tooth B* is arranged with an axial spacing to the inner tooth contact surfaces 45*i*, 47*i*, 39*i* and 38*i* in the direction of the outer face surface 20*sa*. The axial spacing of each of these tooth contact surfaces to the outer tooth contact reference surface 20*d*\* of the alternative reference tooth B* is therefore greater than the axial spacing of the inner tooth contact reference surface 20*i*\* to the outer tooth contact reference surface 20*d*\*.

The stabilizing teeth 39 and 45 in FIG. 10 are therefore, with regard to the reference tooth B* illustrated using dashed lines, in each case also stabilizing teeth of the first embodiment mentioned in the introductory part of the description.

The alternative reference tooth B* may particularly advantageously be formed by non-cutting deformation processes, for example if the sprocket 20 is formed as a sprocket 20* deformed by non-cutting processes but is not restricted to this type of production. The alternative reference tooth B* may also be produced by cutting shaping processes.

Figure 11:
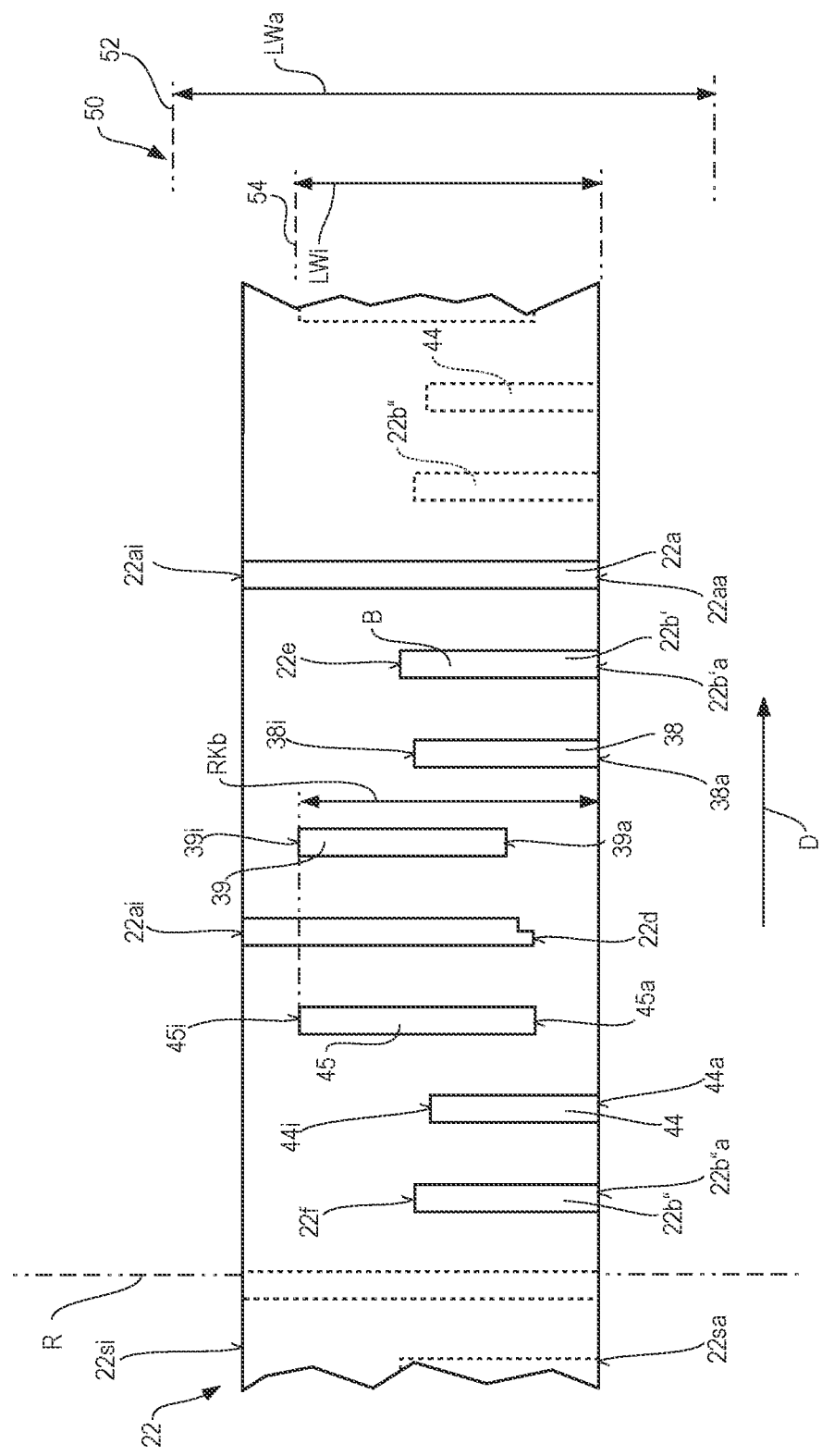
FIG. 11 is a highly schematic illustration of a developed view of the sprocket 22 from the sprocket cassette of FIGS. 1 to 1B.
Figure 12:
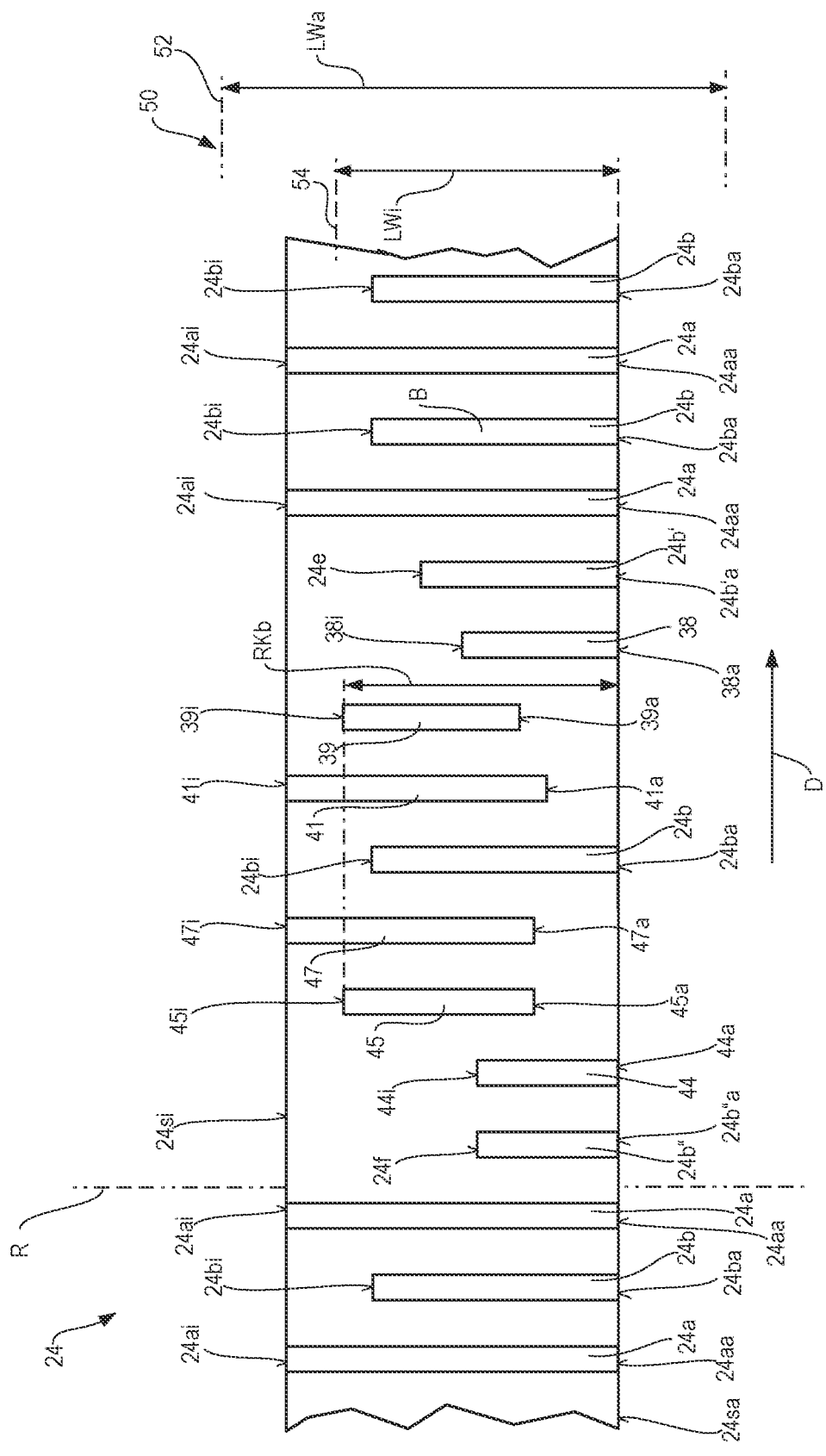
FIG. 12 is a highly schematic illustration of a developed view of the sprocket 24 from the sprocket cassette of FIGS. 1 to 1B.

Since it is the case in the exemplary embodiments of the sprockets 18, 22 and 24 illustrated in detail in FIGS. 9, 11 and 12 that the outer tooth contact surfaces 38*a* of the respective release teeth 38 and the outer tooth contact surfaces 44*a* of the respective catching teeth 44 lie in a common plane with the outer tooth contact reference surface of the respective reference tooth B, the stabilizing teeth 39 and 45 of the sprockets 18, 22 and 24 are stabilizing teeth not only of the first embodiment mentioned in the introductory part of the description but also of the second embodiment (in this regard, see the chain-guiding dimension RKb which is common across multiple sprocket teeth in FIGS. 9, 11 and 12).

Figure 4:
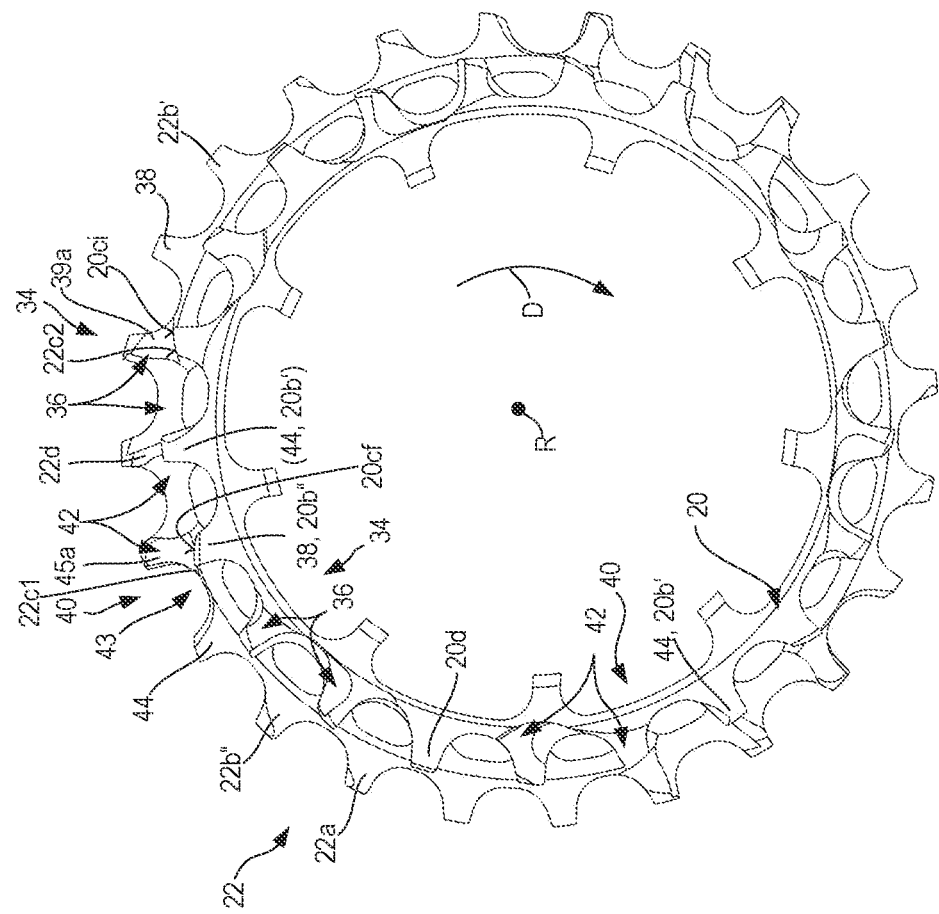
FIG. 4 shows a bicycle rear-wheel sprocket pairing of the sprocket cassette of FIGS. 1 to 1B having a smaller sprocket with 21 teeth and having a larger sprocket with 24 teeth in a reference view, wherein the rear-wheel sprocket pairing belongs to the transition sprocket assembly with a total of three sprockets.

FIG. 4 illustrates, in a reference view, the larger sprocket pairing of the transition sprocket assembly 19 with the 24-T sprocket 22 and the 21-T sprocket 20.

Here, too, it is the aim for the bicycle chain to be changed over from the odd-numbered sprocket 20 onto the larger sprocket 22 with a unique relative arrangement of the chain link sequence.

Identical reference designations and identical lowercase alphabetic characters following a reference designation at the sprocket 22 denote functionally identical components or component sections of the sprockets 16, 18 or 20, which are denoted there by identical reference designations and/or, if appropriate, by identical lowercase alphabetic characters.

The 24-T sprocket 22 likewise has three identical circumferential segments which, following one another in the circumferential direction, form the complete circumference of the sprocket 22. Each circumferential segment therefore has eight teeth. In FIG. 4, for the sake of simplicity, only exactly one circumferential segment of the sprocket 22 is provided with reference designations. The circumferential segment comprises the seven teeth of the gearshift section, which extends from the receiving-side mobilizing tooth 22*b*″, including the latter, in the drive direction of rotation D as far as and including the release-side mobilizing tooth 22*b*′, plus one conventional outer link plate sprocket tooth 22*a*.

Situated at the outermost end of the circumferential segment in the drive direction of rotation D is the release-side mobilizing tooth 22*b*′ for the release tooth 38 adjacent thereto counter to the drive direction of rotation D. Further counter to the drive direction of rotation D, the released tooth 38 is followed by three teeth on which the upshift recess formation 36 and the downshift recess formation 42 are formed, wherein a deflecting surface 22*d* is formed on the middle tooth of the three teeth.

Counter to the drive direction of rotation D, the three teeth are followed by the catch tooth 44, adjacent to which in turn counter to the drive direction of rotation D is the receiving-side mobilizing tooth 22*b*″ of the catch tooth. At the outermost end of the circumferential segment counter to the drive direction of rotation D, there is situated a normal tooth of the sprocket 22, which is for example formed as a thick outer link plate sprocket tooth 22*a* such that it can engage only with an outer link plate chain link 54.

Although mobilizing teeth 22*b*′ and 22*b*″ are formed here in addition to a release tooth 38 and a catch tooth 44, both recess formations 36 and 42 for downshifting and for upshifting are formed within a space of only three teeth, such that moderate structural weakening arises overall as a result of material removal from the sprocket 22, and the sprocket 22 has high stability and wear resistance overall. The larger a sprocket is, the lesser is the impact that the formations of recess formations and the like have in terms of structural weakening of the strength of the sprocket.

Even though it is not known, owing to the unpredictable number of revolutions of the sprocket 20, in what relative position with regard to the chain link sequence the bicycle chain will be changed over from the sprocket 20 onto the sprocket 22 during downshifting, that catch tooth 44 which is approached by an outer link plate chain link will catch the chain by engaging in form-fitting fashion with the chain link and thus ensure a downshift operation. This is, at the latest, the second catch tooth 44 which, relative to the derailleur 94 that effects the gearshift operation (see FIG. 8), moves into a rotational position that is relevant for the initiated gearshift operation.

Likewise, in each circumferential segment of the sprocket 22, the chain is changed over only by exactly one single tooth, specifically the release tooth 38 as the final engaging tooth, onto the smaller sprocket 20. Since the release tooth 38 on the sprocket 22 is always assigned an outer link plate chain link, an upshift operation from the sprocket 22 onto the sprocket 20 takes place at the next release tooth 38 that passes the gearshift region of the derailleur 94. This results in a very short gearshift latency of only one third of one revolution and, owing to the formation of only one tooth as a release tooth 38 in each circumferential segment, the least possible weakening of the sprocket 22.

FIG. 11 shows a highly schematic developed view of a gearshift section of the sprocket 22, as shown in FIG. 10 as a gearshift section of the sprocket 20.

Owing to the three gearshift sections which follow one another in the circumferential direction and which each have seven teeth, only three conventional teeth 22a remain on the sprocket 22, the outer and inner tooth contact surfaces of which conventional teeth are axially not specially arranged and designed to perform gearshift functions. These are outer link plate sprocket teeth 22a which, owing to the chain-guiding dimension thereof, can engage only into an outer link plate chain link 52 but not into an inner link plate chain link 54. Therefore, on the sprocket 22, a reference tooth as the inner link plate sprocket tooth with the largest chain-guiding dimension is the release-side mobilizing tooth 22b'. The axial reference position is therefore defined by the axial position of the outer tooth contact surface 22b'a of the release-side mobilizing tooth 22b'.

In the exemplary embodiment illustrated, the outer tooth contact surfaces 22b'a, 22b"a, 38a, 44a and 22aa of the two mobilizing teeth 22b' and 22b", of the release tooth 38, of the catch tooth 44 and of the conventional outer link plate sprocket tooth 22a are situated at one and the same axial position, which is preferably also the axial position of the outer face surface 22sa of the sprocket 22. It is in turn preferably the case that the outer tooth contact surfaces 22b'a, 22b"a, 38a, 44a and 22aa and the outer face surface 22sa of the sprocket main body of the sprocket 22 are oriented orthogonally with respect to the sprocket axis R. The same applies to the inner tooth contact surfaces 22ai, which are preferably situated at the same axial position, of the conventional outer link plate sprocket teeth 22a and the inner face surface 22si of the sprocket 22, which are likewise preferably oriented orthogonally with respect to the sprocket axis R.

In the exemplary embodiment illustrated, the release tooth 38 and the receiving-side mobilizing tooth 22b" have the second largest chain-guiding dimension of the gearshift section, wherein it is to be noted here that, owing to the formation of the outer link plate sprocket teeth 22a on the sprocket 22, the release tooth 38 is provided for engagement only with an outer link plate chain link 52, whereas the receiving-side mobilizing tooth 22b" is provided for engagement only with an inner link plate chain link 54.

The catch tooth 44 has the smallest chain-guiding dimension in the gearshift section in order to be able to engage in as unhindered a manner as possible into an outer link plate chain link 52 of the chain 50 during a downshift operation.

Consequently, the inner tooth contact surface 44i is situated closer to the axial reference position than the inner tooth contact surface 22f of the receiving-side mobilizing tooth 22b" and then the inner tooth contact surface 38i of the release tooth 38. The latter inner tooth contact surfaces 22f and 38i are in turn situated closer to the axial reference position than the inner tooth contact surface 22e of the release-side mobilizing tooth 22b', which serves as reference tooth B.

The inner tooth contact surfaces 39i and 45i of the release-side stabilizing tooth 39 and of the receiving-side stabilizing tooth 45 are situated axially further remote from the axial reference position than the outer tooth contact surface 22e of the reference tooth B.

In the exemplary embodiment illustrated, the inner tooth contact surfaces 39i and 45i, which are preferably oriented orthogonally with respect to the sprocket axis R, lie so as to be coplanar at a common axial position along the sprocket axis R, wherein the axial spacing thereof to the axial reference position is less than the clearance width LWi of the bicycle chain 50 that interacts with the sprocket 22. By contrast to the situation at the preceding sprockets 18 and 20, the outer tooth contact surface 39a of the release-side stabilizing tooth 39 is axially remote from the axial reference position and from the outer tooth contact surface 38a, which is likewise situated at the axial reference position, of the release tooth 38 to a greater extent than the corresponding outer tooth contact surface 45a of the receiving-side stabilizing tooth 45 is axially remote from the outer tooth contact surface 44a of the catch tooth 44. Therefore, on the sprocket 22, the chain-guiding dimension of the release-side stabilizing tooth 39 is shorter than the chain-guiding dimension of the receiving-side stabilizing tooth 45.

The chain-guiding dimension common across multiple teeth, which is formed by a stabilizing tooth 39 or 45 with its gearshift function tooth 38 or 44 respectively assigned thereto as neighbouring tooth, that is to say the axial spacing of an outer tooth contact surface of a gearshift function tooth to the inner tooth contact surface of the stabilizing tooth assigned to the gearshift function tooth, is larger than the chain-guiding dimension of the reference tooth in the form of the inner link plate sprocket tooth of the sprocket 22 with the largest chain-guiding dimension.

The condition that a chain-guiding dimension common across multiple teeth, which is formed by a stabilizing tooth with its gearshift function tooth, that is to say release tooth or catch tooth, spatially assigned thereto by proximity, is larger than the chain-guiding dimension of the inner link plate sprocket tooth of the respective sprocket with the largest chain-guiding dimension is generally easy to satisfy in particular whenever the outer tooth contact surface of the associated gearshift function tooth is situated at the same axial position as, or even axially further to the outside in relation to, the outer tooth contact reference surface.

In the exemplary embodiment discussed here, the tooth pairs composed of release-side stabilizing tooth 39 and release tooth 38 and of receiving-side stabilizing tooth 45 and catch tooth 44 on the sprocket 18 also have a larger chain-guiding dimension common across multiple teeth than the reference tooth B of the sprocket 18.

The radially inner tooth base of the gearshift tooth space 43, which is directly adjacent to the catch tooth 44 in the drive direction of rotation D and to the receiving-side stabilizing tooth 45 counter to the drive direction of rotation, is situated radially closer to the sprocket axis R than the tooth bases of the other tooth spaces. By means of the movement travel thus provided for a chain roller in a radially inward direction, the changeover travel that the bicycle chain covers during the changeover from the smaller sprocket 20 onto the larger sprocket 22 can be adapted such that its length is an integer multiple of the chain pitch. This is a boundary condition for a gearshift operation between two sprockets.

Figure 13:
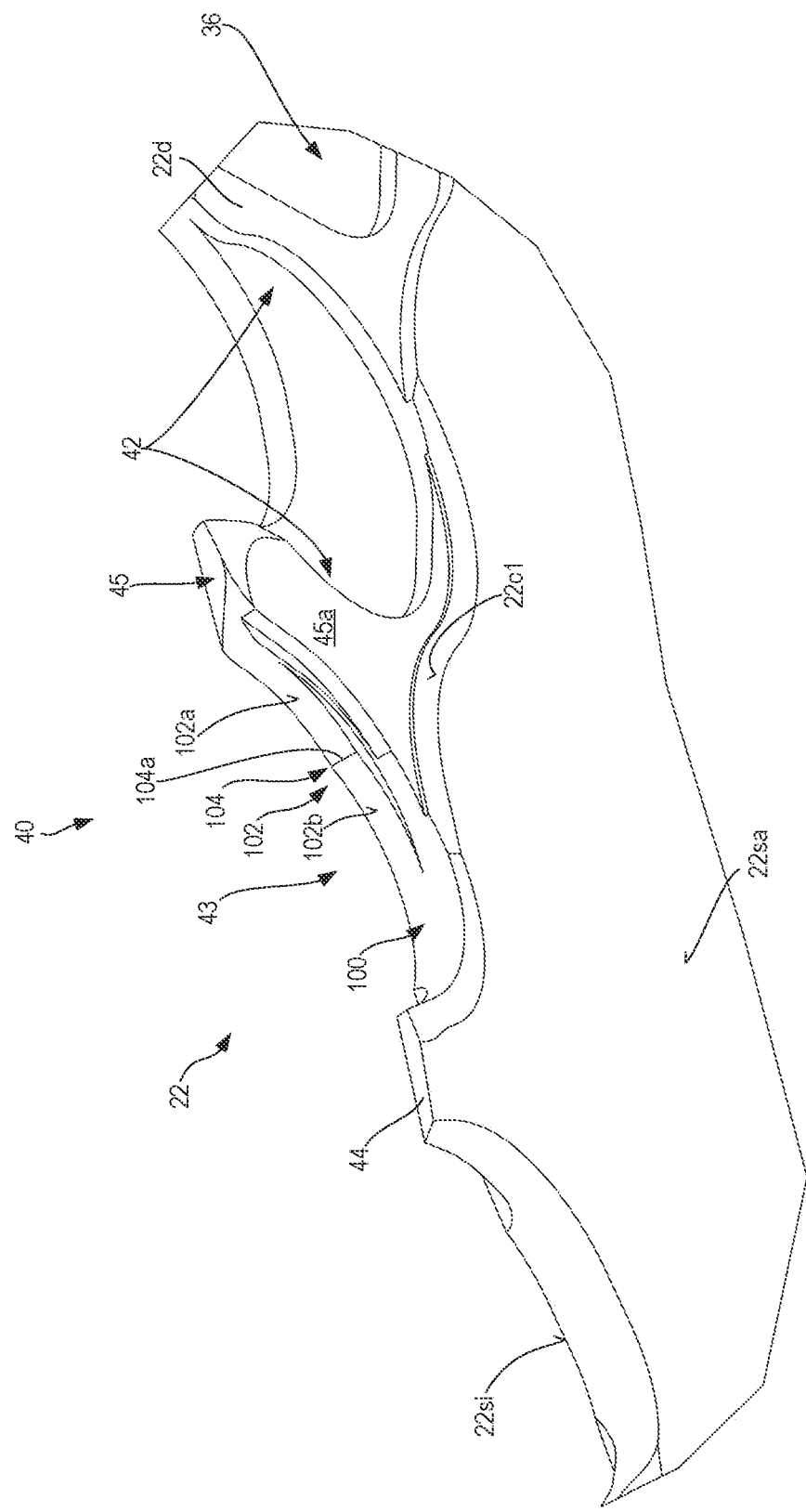
FIG. 13 shows a schematic perspective detail view of a gearshift tooth space on the sprocket 22 with a tooth base relocated radially closer to the sprocket axis.

FIG. 13 illustrates the region of the gearshift tooth space 43 at the tooth 22 in an enlarged perspective view. The gearshift tooth space 43 is delimited by its roller abutment surface 100. The roller abutment surface 100 is designed for the abutment of a roller of the bicycle chain 50 during downshifting from the next smaller sprocket 20 onto the sprocket 22 and during the conventional engagement of the bicycle roller chain 50 with the sprocket 22 in the absence of a gearshift operation.

Proceeding from the inner face surface 22si of the sprocket 22, an auxiliary flank formation 102 extends in that circumferential half of the gearshift tooth space 43 which is situated closer to the receiving-side stabilizing tooth 45, in the example illustrated over approximately half of the axial dimension of the roller abutment surface 100. The auxiliary flank formation 102 does not extend axially as far as the outer face surface 22sa of the sprocket 22. Situated axially adjacent to the auxiliary flank formation 102 is, for example, a part of the roller abutment surface 100 that remains unmodified by the auxiliary flank formation 102, and a section of the ramp 22c1.

The auxiliary flank formation 102 comprises a drive roller abutment surface 102a, which is situated radially further to the outside, and a gearshift roller abutment surface 102b, which is situated radially further to the inside. The drive roller abutment surface 102a serves as an abutment surface for a chain roller of the bicycle chain 50 during conventional engagement operation in the absence of a gearshift operation. The gearshift roller abutment surface 102b serves as an abutment surface for the same chain roller of the bicycle chain 50 during downshifting from the axially adjacent smaller sprocket 20 onto the sprocket 22.

Since each of the two concave partial roller abutment surfaces 102a and 102b of the auxiliary flank formation 102 has a smaller radius of curvature than that roller abutment surface 100 of the gearshift tooth space 43 which has no auxiliary flank formation 102, the drive roller abutment surface 102a, over the course thereof radially away from the tooth tip of the receiving-side stabilizing tooth 45, projects into the gearshift tooth space 43. Likewise, the gearshift roller abutment surface 102b, over the course thereof towards the receiving-side stabilizing tooth 45 proceeding from a tooth base which is situated in a circumferential central region of the gearshift tooth space 43 between the catch tooth 44 and the receiving-side stabilizing tooth 45, projects into the gearshift tooth space 43. The two partial roller abutment surfaces 102a and 102b meet at an apex section 104, which in the example illustrated is an apex line 104a that runs parallel to the sprocket axis R.

The apex section 104 forms a type of parting lug which projects in the manner of a detent lug into the gearshift tooth space 43 and which, in a manner dependent on the present operation, that is to say downshifting or conventional engagement operation, forces the chain roller that is engaging into the gearshift tooth space 43 into abutment either against the drive roller abutment surface 102a or against the gearshift roller abutment surface 102b, and prevents a changeover of the abutting engagement of the chain roller, at least from the drive roller abutment surface 102a to the gearshift roller abutment surface 102b, even in the presence of an assisting influence of the chain tension in the tension strand of the bicycle chain 50 to which the chain roller that is engaging into the gearshift tooth space 43 belongs.

Thus, the roller of the bicycle chain that is engaging with the sprocket 22 in a conventional manner can, despite the radially deeper form of the gearshift tooth space 43 in relation to the other tooth spaces of the sprocket 22, lie against the load flank of the receiving-side stabilizing tooth 45 in a defined position, such that no disturbing noises and no increased wear arise at this point of abutting engagement.

By virtue of the auxiliary flank formation 102 being formed axially such that it does not extend as far as the outer face surface 22sa and also does not extend as far as the outer tooth contact surface 45a of the receiving-side stabilizing tooth 45, the apex region 104 does not cause any disruptions during downshifting operations. The axially outer section, which forms the outer tooth contact surface 45a, of the receiving-side stabilizing tooth 45 can engage axially between two outer link plates of the bicycle chain 50 and abut with the tooth contact surface 45a against the outer surface of an inner link plate of the bicycle chain 50. A section of an outer link plate of the outer link plate chain link can then be received in the axial region between the outer tooth contact surface 45a and the auxiliary flank formation, the outer link plate chain link being caught by the catch tooth 44, and into the engagement space of which outer link plate chain link the catch tooth 44 engages as the first tooth of the sprocket 22 during the downshifting operation.

At the larger sprocket pairing of the transition sprocket assembly 19, it is also possible for both inner link plates of an inner link plate chain link to be supported during upshifting from the sprocket 22 onto the sprocket 20, specifically on the tip surface 20ci for the inner link plate situated axially further to the outside and on the ramp 22c2, which delimits the deflecting surface 39a radially towards the inside, for the inner link plate situated axially further to the inside. The tip surface 20ci is of convex form in order to support a concave inner edge 54c of an inner link plate over the largest possible area, wherein, however, the leading end of the tip surface 20ci in the drive direction of rotation is arranged radially further to the outside than the trailing end of the tip surface 20ci.

Figure 5:
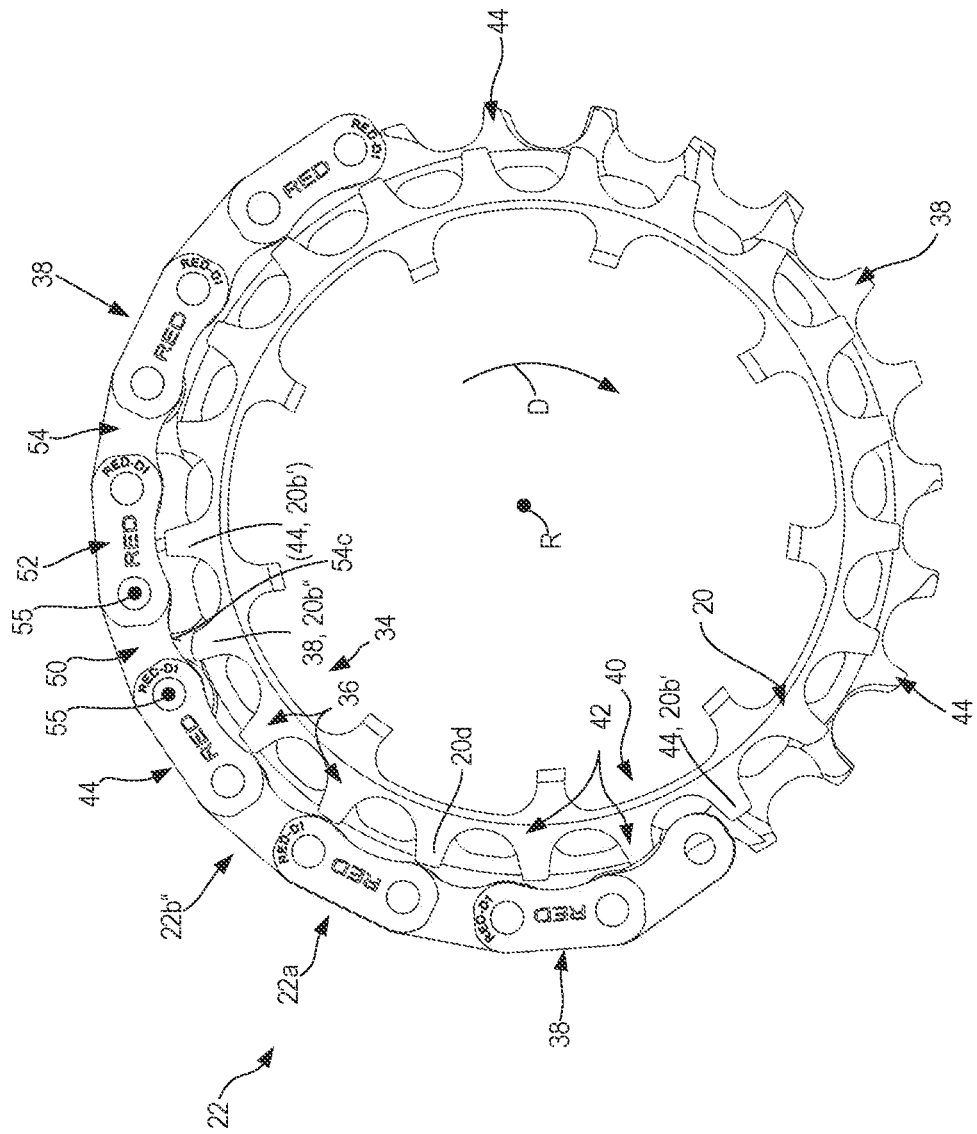
FIG. 5 shows the bicycle rear-wheel sprocket pairing of FIG. 4 with a bicycle chain that is in engagement with the larger sprocket and is being downshifted onto the smaller sprocket.

FIG. 5 illustrates, by way of example, how an upshift of a bicycle chain 50 composed of a sequence of outer link plate chain links 52 and inner link plate chain links 54 from the meshing engagement with the sprocket 22 onto the smaller sprocket 20 is performed. It can be seen that the release tooth 38 is the final tooth of the sprocket 22 that engages with the bicycle chain 50.

Figure 6:
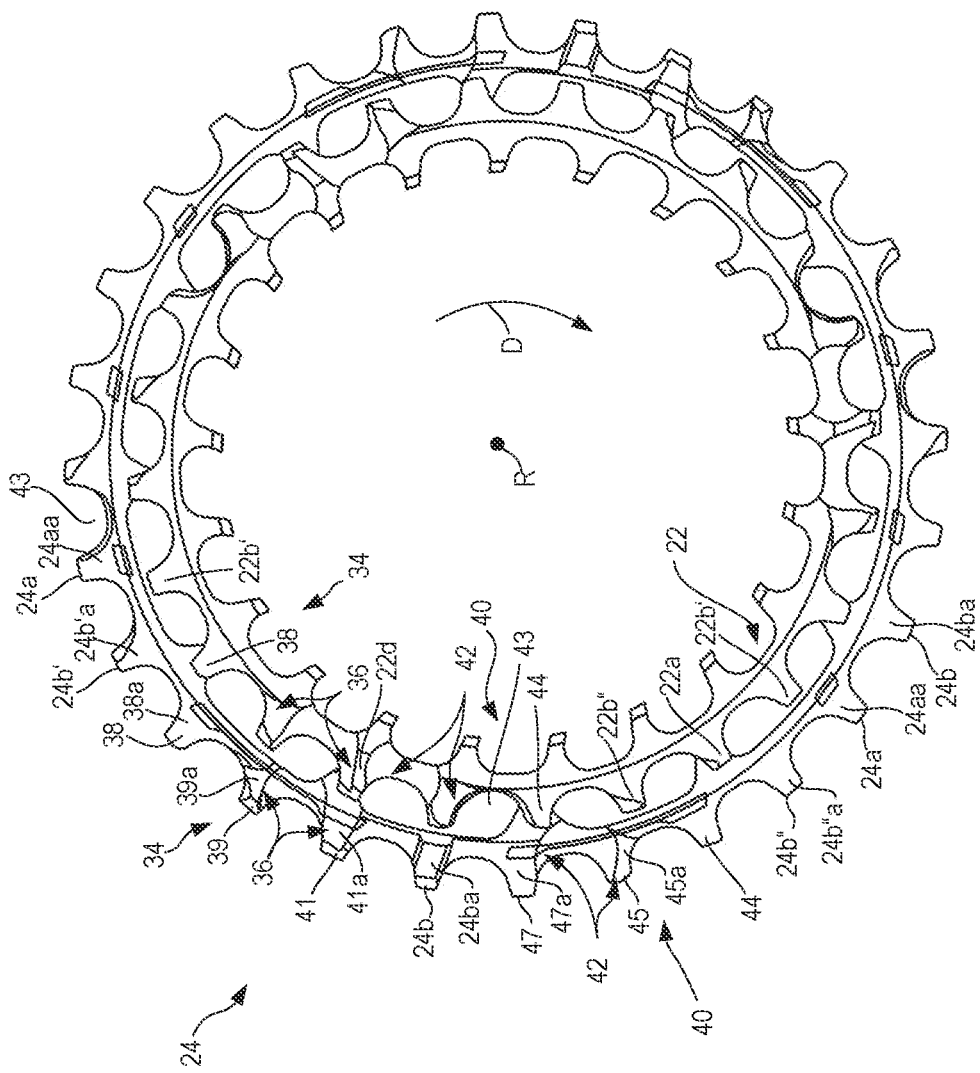
FIG. 6 shows a bicycle rear-wheel sprocket pairing of the sprocket cassette of FIGS. 1 to 1B having a smaller sprocket with 24 teeth and having a larger sprocket with 28 teeth.

Merely by way of example, FIG. 6 illustrates a sprocket pairing composed of the 28-T sprocket 24 and the 24-T sprocket 22 discussed above. The sprocket 22 has already been discussed above. Along its circumference, the sprocket 24 has two upshift regions 34 and two downshift regions 40, wherein regions which perform gearshifts in the same direction, namely 34 and 40 respectively, are situated diametrically opposite one another on the sprocket 24.

Identical reference designations and identical lowercase alphabetic characters following a reference designation at the sprocket 24 denote functionally identical components or component sections of the sprockets 16, 18, 20 or 22, which are denoted there by identical reference designations and/or, if appropriate, by identical lowercase alphabetic characters.

The sprocket 24 also has gearshift tooth spaces 43 with a tooth base offset radially inward toward the sprocket axis R. These gearshift tooth spaces 43 however play a role not for a changeover of the chain between the adjacent sprockets 24 and 22 but for a changeover of the bicycle chain between the sprocket 24 and the next larger sprocket 26.

FIG. 12 is a highly schematic developed view of the gearshift section, comprising nine teeth, proceeding from and including the receiving-side mobilizing tooth 24b'" in the drive direction of rotation D as far as and including the release-side mobilizing tooth 24b', and with conventional, identical inner link plate sprocket teeth 24b and outer link plate sprocket teeth 24a that border the gearshift section at both ends. The reference tooth B is in principle any conventional inner link plate sprocket tooth 24b, because such a tooth has the largest chain-guiding dimension among the inner link plate sprocket teeth 24b of the sprocket 24.

It is in turn preferably the case that the outer face surface 24sa and the inner face surface 24si of the sprocket 24 are parallel to one another and orthogonal to the sprocket axis R. The tooth contact surfaces shown in FIG. 12 are also preferably oriented orthogonally with respect to the sprocket axis R.

All outer tooth contact surfaces 24aa, 24ba, 24b'a, 24b"a, 44a and 38a of the conventional outer link plate sprocket teeth 24a, of the conventional inner link plate sprocket teeth 24b, of the mobilizing teeth 24b' and 24b", of the catch tooth 44 and of the release tooth 38 respectively are situated in one and the same axial position, which, owing to the commonality with the axial position of the outer tooth contact reference surface 24ba, is also the axial reference position.

The inner tooth contact surfaces 39i and 45i of the release-side stabilizing tooth 39 and of the receiving-side stabilizing tooth 45 respectively are situated axially further remote from the axial reference position than the inner tooth contact surface 24bi of the reference tooth B in the form of a conventional inner link plate sprocket tooth 24b. The axial spacing of the inner tooth contact surfaces 39i and 45i to the axial reference position is however in each case slightly smaller, for example by between 5% and 6% in relation to the clearance width LWi, than the clearance width LWi of an inner link plate chain link 54.

The chain-guiding dimension common across multiple teeth, which is formed jointly by a stabilizing tooth and the associated gearshift function tooth, selected from release tooth and catch tooth, adjacent to the stabilizing tooth, is in turn larger than the chain-guiding dimension of the reference tooth B.

In the exemplary embodiment illustrated, the chain-guiding dimensions of the catch tooth 44 and of the receiving-side mobilizing tooth 24b" adjacent thereto are identical.

The outer tooth contact surfaces 45a and 47a of the receiving-side stabilizing tooth 45 and of the tooth 47 adjacent thereto in the drive direction of rotation D, respectively, lie at a common axial position and are thus axially spaced apart to an equal extent from the axial reference position.

On the release side, the chain-guiding dimension of the release-side mobilizing tooth 24b' is larger than that of the release tooth 38, which is in turn larger than the chain-guiding dimension of the catch tooth 44 and of the receiving-side mobilizing tooth 24b". The abovementioned identical axial position of the outer tooth contact surfaces of the teeth, and the chain-guiding dimensions, qualitatively define the relative position of the inner tooth contact surfaces of the teeth with respect to one another.

The outer tooth contact surface 39a of the release-side stabilizing tooth 39 is situated further remote from the axial reference position than the outer tooth contact surface 45a of the receiving-side stabilizing tooth 45.

The outer tooth contact surface 41a of that outer link plate sprocket tooth 41 which is adjacent to the release-side stabilizing tooth 39 counter to the drive direction of rotation D is situated closer to the axial reference position than the outer tooth contact surfaces 45a and 47a.

The sprockets 18, 20, 22 and 24 have been selected merely by way of example for descriptive purposes. The features described on the sprockets 18, 20, 22 and 24 may also be formed on any further sprockets of the sprocket cassette 1.

Figure 7:
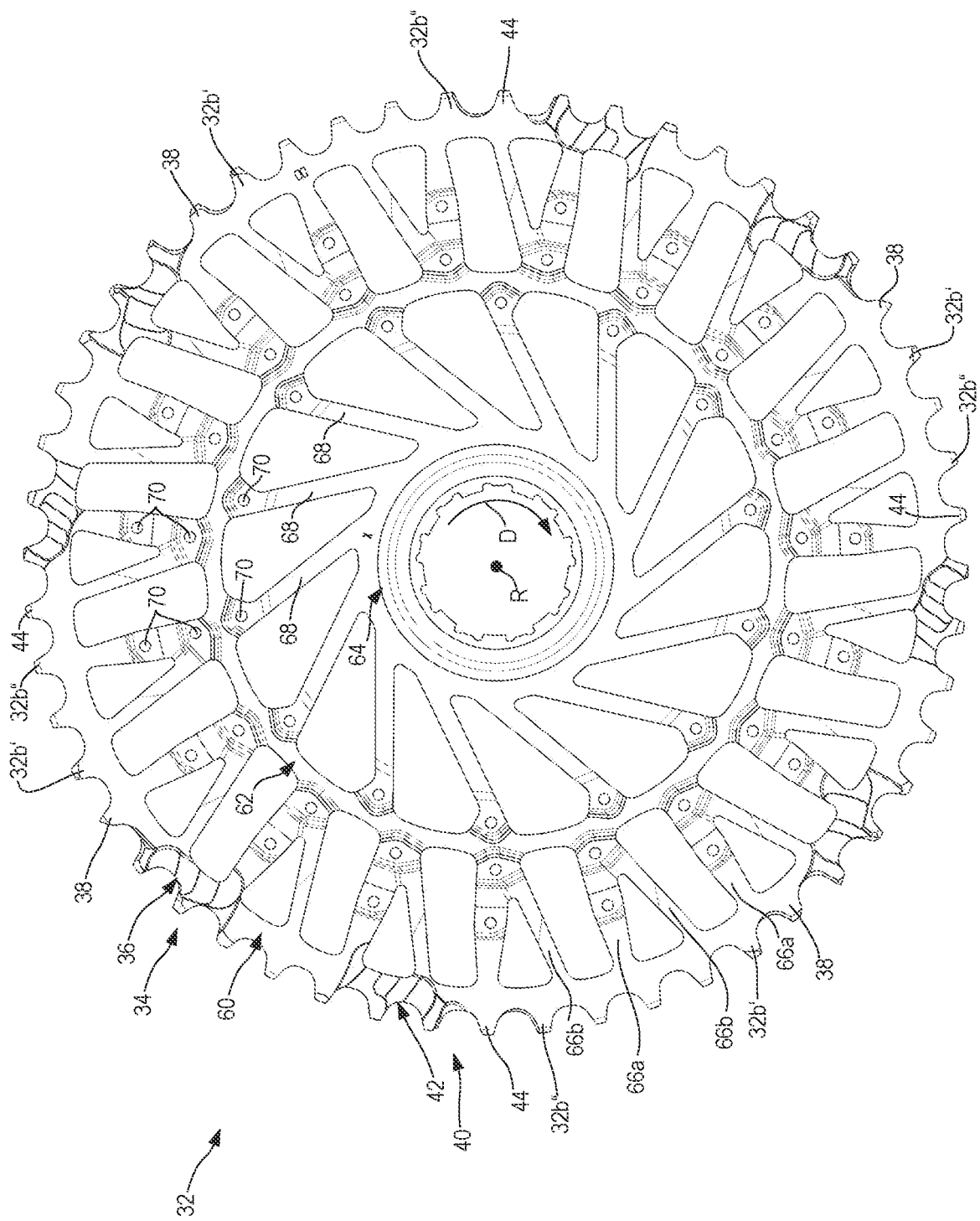
FIG. 7 shows the largest sprocket of the sprocket cassette of FIGS. 1 to 1B in a reference view.

FIG. 7 illustrates the largest sprocket 32 detached from the other sprockets 10 to 30, in a reference view. The sprocket 32 comprises a toothed ring 60, an intermediate ring 62 and a radially inner spline ring 64 for the transmission of torque to a driver (not illustrated, but well known to experts) or to an adapter arranged between the spline ring 64 and the driver. The spline profile of the adapter or driver that interacts with the radially inner profile of the spline ring 64 is of complementary design with respect to the radially inner spline profile of the spline ring 64. Radially outer struts 66a and 66b connect the toothed ring 60 in torque-transmitting fashion to the intermediate ring 62. Radially inner struts 68 connect the intermediate ring to the spline ring 64.

In order to avoid undesired bending deformation of the struts 66b and 68, these are arranged such that their radially inner strut ends lead the radially outer strut ends as viewed in the drive direction of rotation D. The struts 66a are wider in the circumferential direction than the struts 66b.

Fastening openings 70 indicate where the sprocket dome 15 composed of the integrally interconnected sprockets 10 to 26, and the sprockets 28 and 30 formed as individual sprockets, are connected in torque-transmitting fashion to the largest sprocket 32 by connecting means such as pins, rivets, screws and the like.

The fastening holes 70 are firstly arranged radially as far as possible to the outside, but without disrupting the engagement of sprocket teeth with the bicycle chain and are secondly formed in the most stable possible regions of the sprocket 32. The fastening holes 70 are therefore formed predominantly in the relatively wide radially outer struts 66a and close to the connecting points of the intermediate ring 62 to the radially inner struts 68.

Figure 7B:
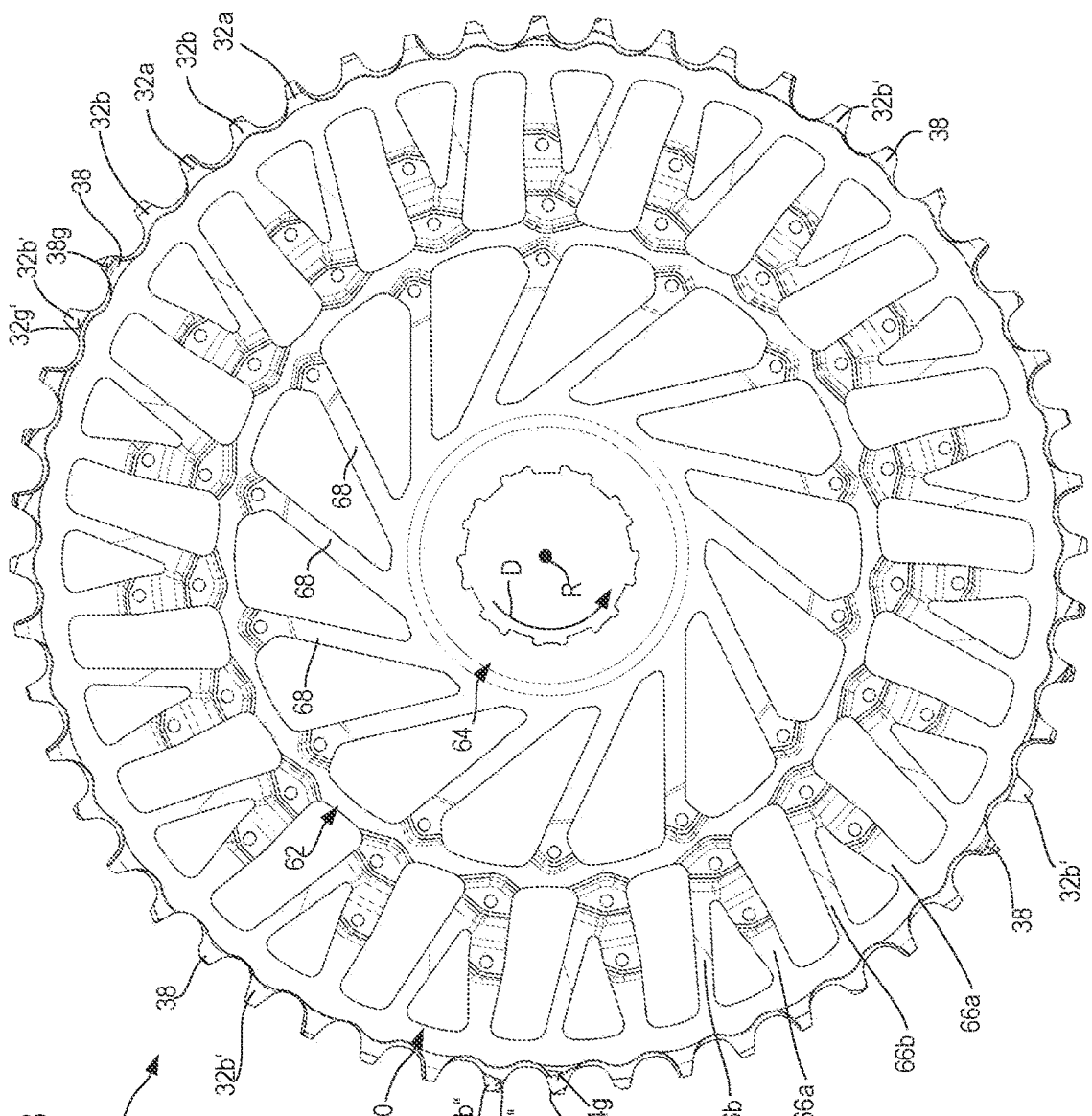
FIG. 7B shows the sprocket of FIG. 7 viewed along the sprocket axis in a viewing direction away from the bicycle longitudinal central plane.
Figure 7A:
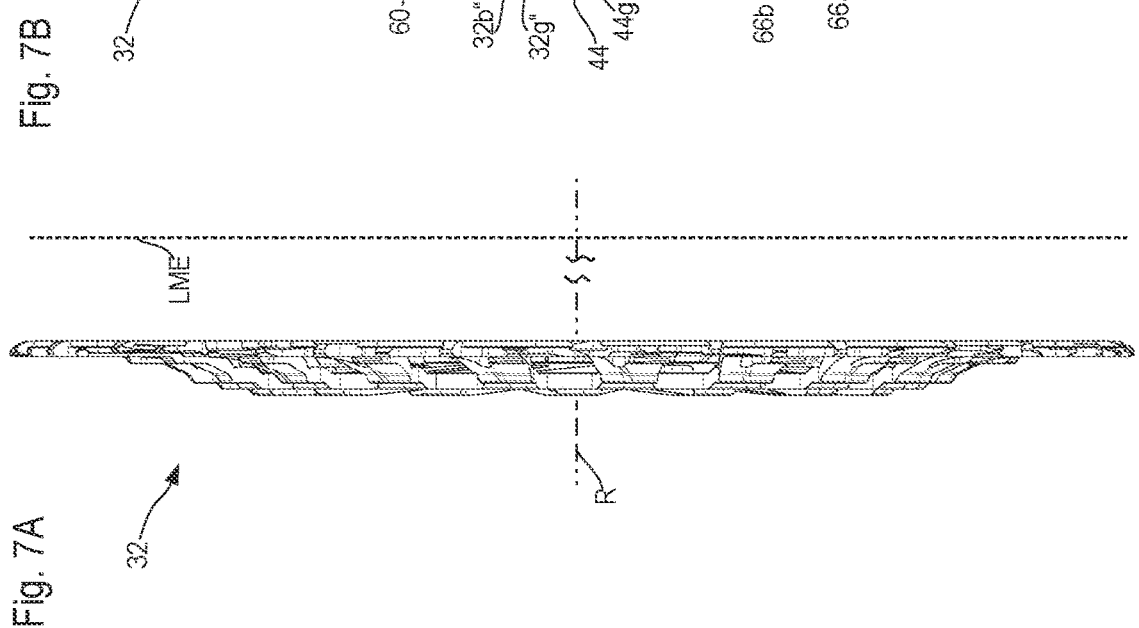
FIG. 7A shows the sprocket of FIG. 7 in a viewing direction orthogonal to the sprocket axis.

FIG. 7A illustrates a view of the largest sprocket 32 in a viewing direction orthogonal to the sprocket axis R. It can be seen in the Fig. that the sprocket 32 is, in regions situated radially relatively close to the sprocket axis R, formed so as to be cranked in an outward direction, that is to say away from the longitudinal central plane LME. In this way, at the driver situated radially within the spline ring 64, the least possible axial structural space is required for accommodating the twelvefold sprocket cassette 1. Furthermore, the sprocket 32 is thus stiffened with respect to bending moments that act on the largest sprocket 32 owing to the chain skew. The sprocket 32 and the sprocket dome 15 connected thereto stiffen one another.

The sprocket cassette 1 is designed such that all smaller sprockets 10 to 26, 28 and 30 transmit their torque directly to the sprocket 32, by means of which the torque transmitted by the rider or by the electric motor to the sprocket cassette 1 via the bicycle chain 50 is transmitted via the abovementioned driver to the rear-wheel hub.

As can be seen on that side of the sprocket 32 which points toward the longitudinal central plane LME, and which is that seen by the viewer of FIG. 7B, it is also the case on the largest sprocket 32 that relatively thick outer link plate sprocket teeth 32a and relatively thin inner link plate sprocket teeth 32b are formed so as to follow one another in alternating fashion in the circumferential direction. The recesses on the tooth surfaces facing in the axial direction, which recesses serve for forming thin teeth 32b, are formed exclusively on that side of the larger sprocket 32 which points away from the next smaller sprocket 30.

Identical reference designations and identical lowercase alphabetic characters following a reference designation at the sprocket 32 denote functionally identical components or component sections of the sprockets 16, 18, 20, 22 or 24, which are denoted there by identical reference designations and/or, if appropriate, by identical lowercase alphabetic characters.

FIG. 7B furthermore shows a formation of ramps on some release teeth 38, on some catching teeth 44 and on the mobilizing teeth 32b' and 32b" that are adjacent to the release teeth 38 and catching teeth 44 that form ramps. The ramps are denoted by the reference designation of the respective tooth and the lowercase alphabetic character g. On the mobilizing teeth, the ramps are denoted by the same apostrophe suffixes as the associated mobilizing teeth.

The ramps 38g, 32g', 44g and 32g" form a radial and axial step of that tooth surface of the associated teeth 38, 32b', 44 and 32b" which points away from the next smaller sprocket 30. The ramps 38g, 32g', 44g and 32g" form a ramp surface which points radially outwards, that is to say away from the sprocket axis R, and on which radially inwardly facing edge surfaces of the bicycle chain 50 can be supported.

By means of these ramps 38g, 32g', 44g and 32g", the chain 50 is stabilized particularly effectively whilst in meshing engagement with the largest sprocket 32.

In the case of backpedaling utilizing the freewheel that is conventionally present at the rear-wheel hub, the skew of the chain can under some circumstances have a destabilizing effect on the meshing engagement of the sprocket 32 with the bicycle chain 50. Since in particular the release teeth 38 and the mobilizing teeth 32b' adjacent thereto, owing to their design, assist a changeover of the chain to the next smaller sprocket 30, for which the skew acts, a ramp is formed there in particular. Ramps are also formed on the gearshift-relevant teeth of a downshift region, that is to say on the catch tooth 44 and on the mobilizing tooth 32b" thereof, in order to stabilize the chain 50.

The ramps not only hold the chain itself in the event of a highly adverse action of the chain skew with respect to the front chain wheel at the sprocket 32 but also assist the downshifting of the chain 50 onto the larger sprocket 32 or upshifting of the chain 50 from the larger sprocket 32 onto the next smaller sprocket 30. The ramps specifically create the possibility that the chain can be held in stable fashion and with physical guidance even in a position situated radially further to the outside on the sprocket 32 in the gearshift-relevant regions, that is to say upshift region 34 and downshift region 40, than would be the case during conventional tooth meshing engagement, in the case of which the catch tooth 44, the release tooth 38 or the mobilizing teeth 32b" and 32b' respectively adjacent thereto, engage radially fully into the intermediate spaces of the chain links.

Thus, the ramps stabilize the chain 50 against the chain skew with respect to the front chain wheel when the chain-guiding roller of the derailleur is oriented so as to be coplanar with the larger sprocket 32 for the purposes of holding the chain on the sprocket 32, and the chain skew acts so as to oppose retention of the chain 50 on the sprocket 32. Furthermore, the ramps assist a changeover of the chain 50 when the chain-guiding roller of the derailleur is oriented so as to be coplanar with the sprocket that will guide the chain in future, whilst the chain 50 is still in engagement with the sprocket that is presently guiding the chain.

The ramps shown may also be formed on the sprockets 30, 28, 26 etc., specifically preferably in each case on that side of the respective sprocket which points away from the next smaller sprocket. Since the chain skew however decreases in magnitude towards the medium-sized sprockets of the sprocket cassette 1, the ramps are of importance in particular on the larger sprockets 32, 30 and also 28 that are situated between the chain line and the bicycle longitudinal central plane LME.

Figure 14:
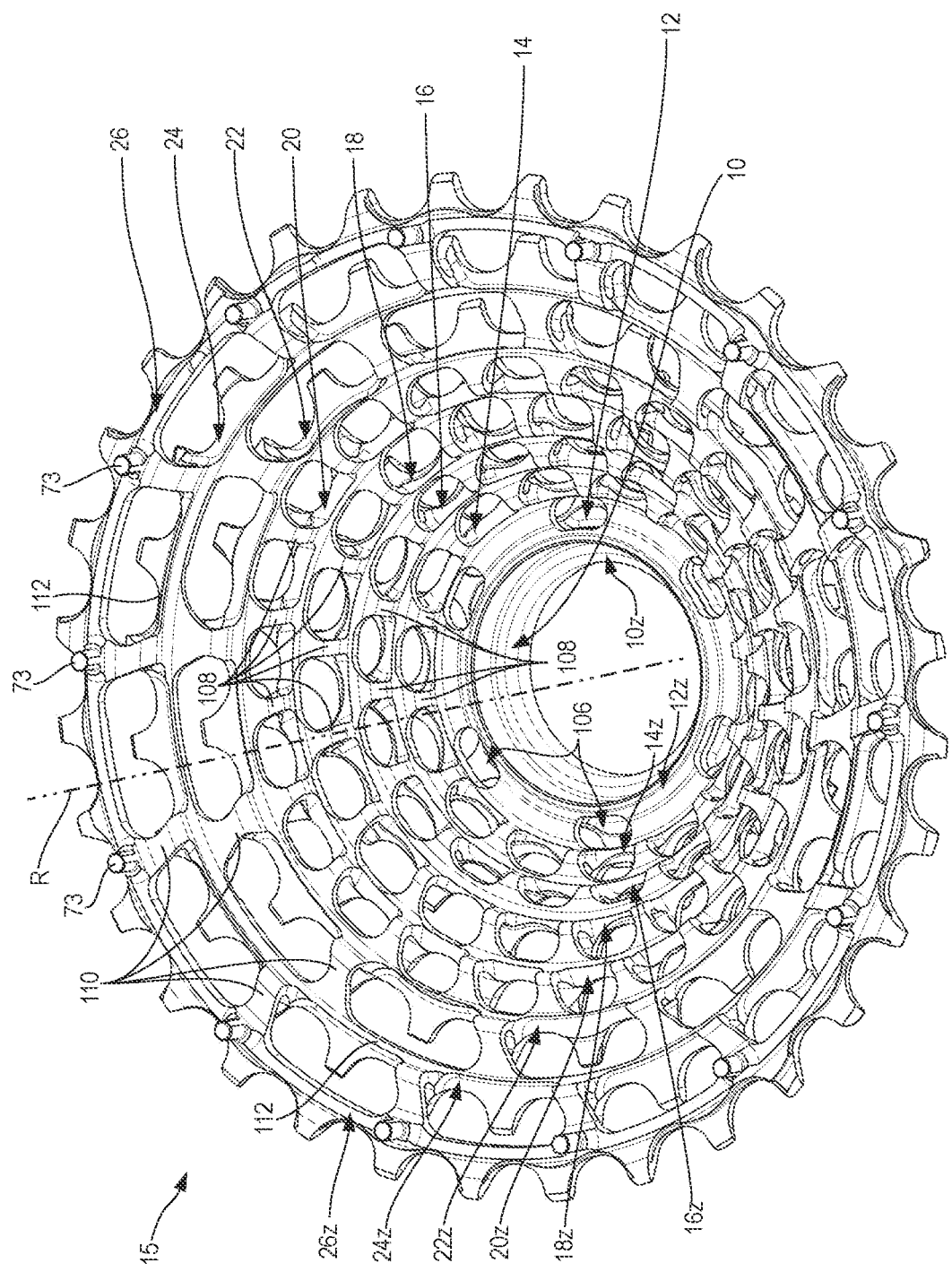
FIG. 14 shows a schematic rear view of the sprocket dome with the integrally connected sprockets 10 to 26 of the sprocket cassette of FIGS. 1 to 1B.

FIG. 14 shows the integrally manufactured sprocket dome 15 in a schematic perspective view from the inside. It can be seen that the smallest sprocket 10 is formed on a solid ring-shaped or pot-shaped section, situated at an axial end side, of the sprocket dome 15. The next larger sprocket 12 is likewise formed on a predominantly ring-shaped or pot-shaped section of the sprocket dome 15, but openings 106 which form apertures in the ring-shaped or pot-shaped local structure of the sprocket dome 15 are formed in the region of every second tooth of the sprocket 12.

The sprockets 14 to 22 are connected to one another via connecting webs, or merely "webs" for short, 108, specifically such that, on the in each case smaller of two axially adjacent sprockets that are directly connected to one another, each web 108 merges into the sprocket main body 14z, 16z, 18z, 20z and 22z of the smaller sprocket at the circumferential position of a tooth of the sprocket. Here, a connecting web 108 is situated axially opposite each tooth of a smaller sprocket at the circumferential position of the respective tooth, which connecting web connects the smaller sprocket to the axially adjacent next larger sprocket. The connecting webs 108 have, broadly speaking, an L-shaped cross section in a section plane orthogonal to the sprocket axis R (see the webs 110 in FIGS. 16 and 17).

The three largest sprockets 22, 24 and 26 of the sprocket dome are likewise connected to one another by means of webs 110. In each sprocket pairing 26-24 and 24-22, the numbers of webs 110, which are designed to be wider in the circumferential direction than the webs 108 of the above-mentioned sprockets 14 to 22, are smaller than the number of teeth of each sprocket that are connected to one another by the webs 110.

More specifically, it is preferably the case that a sprocket pairing 26-24 and 24-22 has a number of webs 110 that is exactly half of the number of teeth on the smaller of the sprockets that are connected to one another by the connecting webs 110. Like the webs 108 described above, for the purposes of greater stability of the sprocket dome 15, the connecting webs 110 are arranged in each case at the circumferential location of a sprocket tooth of the smaller of the sprockets that are connected to one another, and the connecting webs project there axially away from the sprocket main body of the smaller sprocket. However, in each case one web 110 is arranged only at every second tooth of the smaller of the sprockets 22, 24 and 26 that are connected to one another.

At those circumferential regions, in particular of the sprockets 22 and 24, which are situated between two webs 110 and at which an upshift recess formation 36 or a downshift recess formation 42 is formed, it is possible, for the purposes of locally stiffening the circumferential region that is weakened by the recess formation, for an axial projection 112 to be formed on the sprocket main body 22z and 24z respectively, which axial projection extends over a circumferential region and protrudes axially from the sprocket main body 22z and 24z. It is preferable if the axial projection 112 extends in the circumferential direction from one web 110 to the web 110 that is adjacent in the circumferential direction.

The axial projection 112 may also be formed only on the sprocket 24.

Figure 15:
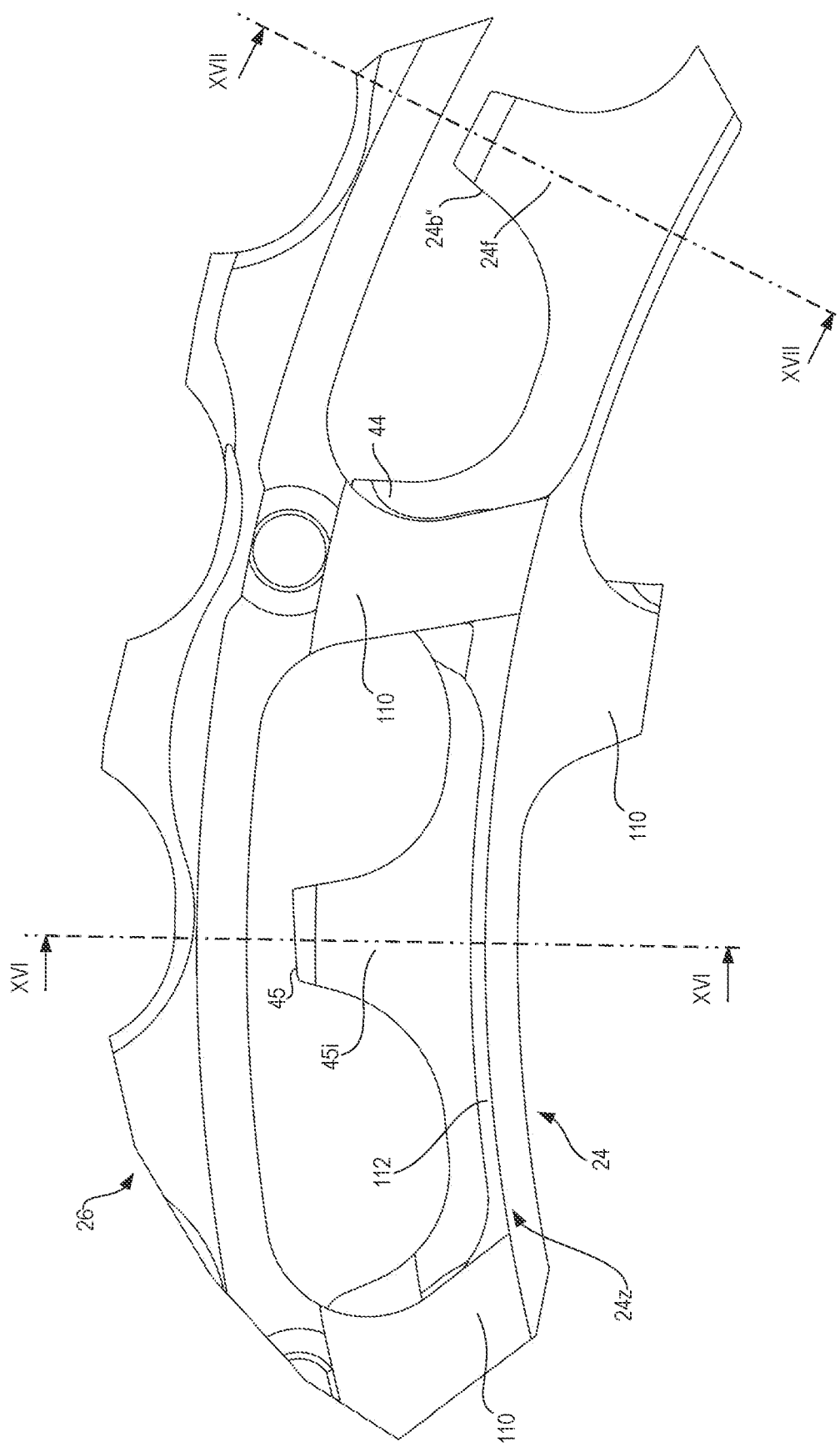
FIG. 15 shows a schematic detail rear view of the sprocket 24 of the sprocket cassette of FIGS. 1 to 1B, with the connection thereof to the next larger sprocket 26.
Figure 17:
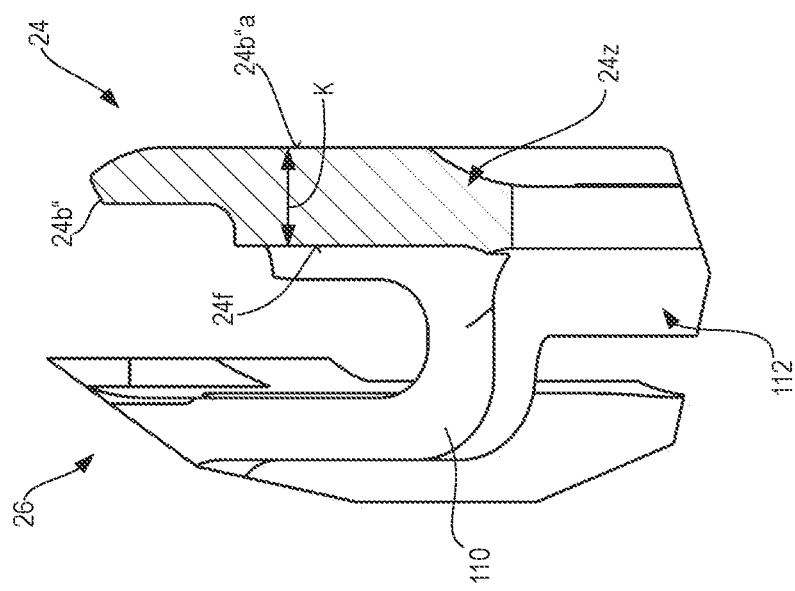
FIG. 17 shows a schematic detail sectional view along the section plane XVII-XVII orthogonal to the drawing plane of FIG. 15.
Figure 16:
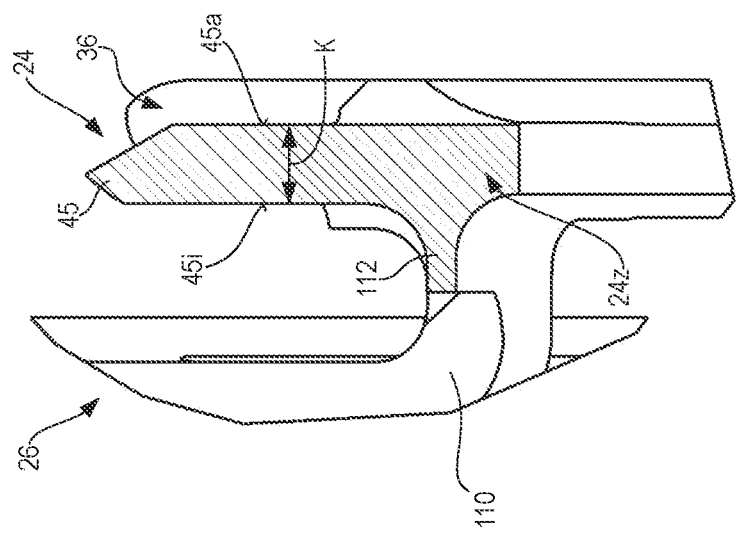
FIG. 16 shows a schematic detail sectional view along the section plane XVI-XVI orthogonal to the drawing plane of FIG. 15.

The above-described local stiffening is illustrated in FIGS. 15 to 17 on the basis of the example of the sprocket 24.

In the region of the receiving-side stabilizing tooth 45, which is weakened on its outer side by the downshift recess formation 36, an axial projection 112 is formed on the sprocket main body 24z as shown in FIGS. 15 and 16, which axial projection preferably runs over the full distance between the connecting webs 110 and by means of which axial projection those connecting webs which are closest to the receiving-side stabilizing tooth 45 to both sides of the latter in the circumferential direction are connected to one another in the circumferential direction.

The receiving-side mobilizing tooth 24b″ does not have such a thickness reduction and thus weakening on its outer side (see FIG. 17), for which reason no axial projection 112 is formed in the circumferential region of the receiving-side mobilizing tooth 24b″.

The axial projection 112 extends in the axial direction over approximately 80% to 120% of the chain-guiding dimension K of the receiving-side stabilizing tooth 45.

A bicycle equipped with a sprocket cassette 1 according to the disclosure is illustrated highly schematically, and denoted generally by 71, in FIG. 8. A front wheel 72 and a rear wheel 74 are fastened to a bicycle frame 76 so as to be rotatable about respective wheel axes that are orthogonal to the plane of the drawing of FIG. 8. The front wheel 72 may be connected to the bicycle frame 76 by means of a sprung fork 78. The rear wheel 74 may also be connected to the bicycle frame 76 by means of a sprung suspension 80.

The rear wheel 74 can be driven by means of a drive assembly 82, comprising a single front chain wheel 24 and the bicycle rear-wheel sprocket cassette 1, which is illustrated only highly schematically in FIG. 8. The drive torque can be transmitted via pedal cranks 88, and a pedal-crank shaft 88a connected thereto, to the front chain wheel 84, and from this by means of the bicycle chain 50 to the rear wheel 74 via the sprocket cassette 1. In order to assist a bicycle rider who is driving the pedal cranks 88 by muscle power, an assisting electric motor 90 may be arranged on the bicycle frame 76 such that this, too, transmits its assisting drive torque via the pedal-crank shaft 88a to the front chain wheel 84. A transmission, in particular planetary transmission, may be provided between the pedal-crank shaft 88a and the chain wheel 84. The transmission ratio of the transmission must be taken into consideration in calculating the effective number of teeth of the chain wheel 84. The actual number of teeth of the chain wheel 84 must in this case be multiplied by the factor with which the transmission transmits a torque, which is introduced into it, to its output side. An increase in the torque by the transmission thus leads to an increased effective number of teeth of the chain wheel 84 relative to the actual number of teeth, and vice versa.

A battery 92 as an energy store for the assisting electric motor 90 may be provided in or on the frame 76.

In a manner known per se, the bicycle chain 50 can, by means of a gearshift mechanism with a derailleur 94, be placed in meshing engagement with one sprocket, which is to be selected by the rider, of the plurality of sprockets 10 to 32 of the sprocket cassette 1 for the purposes of transmitting torque to the rear wheel 74. The derailleur 94 has a chain-guiding roller 96, which is situated closest to the sprocket cassette 1, and a tensioning roller 98.

In the example bicycle 71, both the muscle-imparted torque of the bicycle rider and the assisting torque of the electric motor 90 are transmitted via the rear-wheel sprocket cassette 1 to the rear wheel 74. The electric motor 90 therefore has the effect of enabling the bicycle rider to access a level of pedal power that is increased by the assistance power of the electric motor 90.

Since the bicycle 71 shown by way of example has exactly one front chain wheel 84, the entire gear ratio range of the bicycle 71 is realized by means of the sprocket cassette 1.

Below, an alternative sprocket 20* will be described that is produced by non-cutting deformation. The embodiments described for teeth of the sprocket 20* produced by non-cutting processes also apply to teeth of other sprockets of the rear-wheel sprocket cassette discussed above, which may likewise be produced in non-cutting fashion by deformation.

Identical and functionally identical sprockets and sprocket sections, such as sprocket teeth and/or face-side recesses, on the rear-wheel sprocket cassette 1 described above will be denoted below, with regard to sprockets and sprocket sections produced by non-cutting processes, by identical reference designations but with a suffix "*". The sprockets and sprocket sections produced by non-cutting processes will be discussed below only to the extent that their configuration arises in a special manner in its entirety, or only in certain sections, from the non-cutting shaping process. Otherwise, for the description of the sprockets and sprocket sections produced by non-cutting processes, even where these deviate slightly in terms of their configuration, but not with any change in function, from the functionally identical sections of the sprockets illustrated in FIGS. 1 to 17, reference is made to the above description, which also applies to the sprockets and sprocket sections produced by non-cutting processes.

Figure 18A:
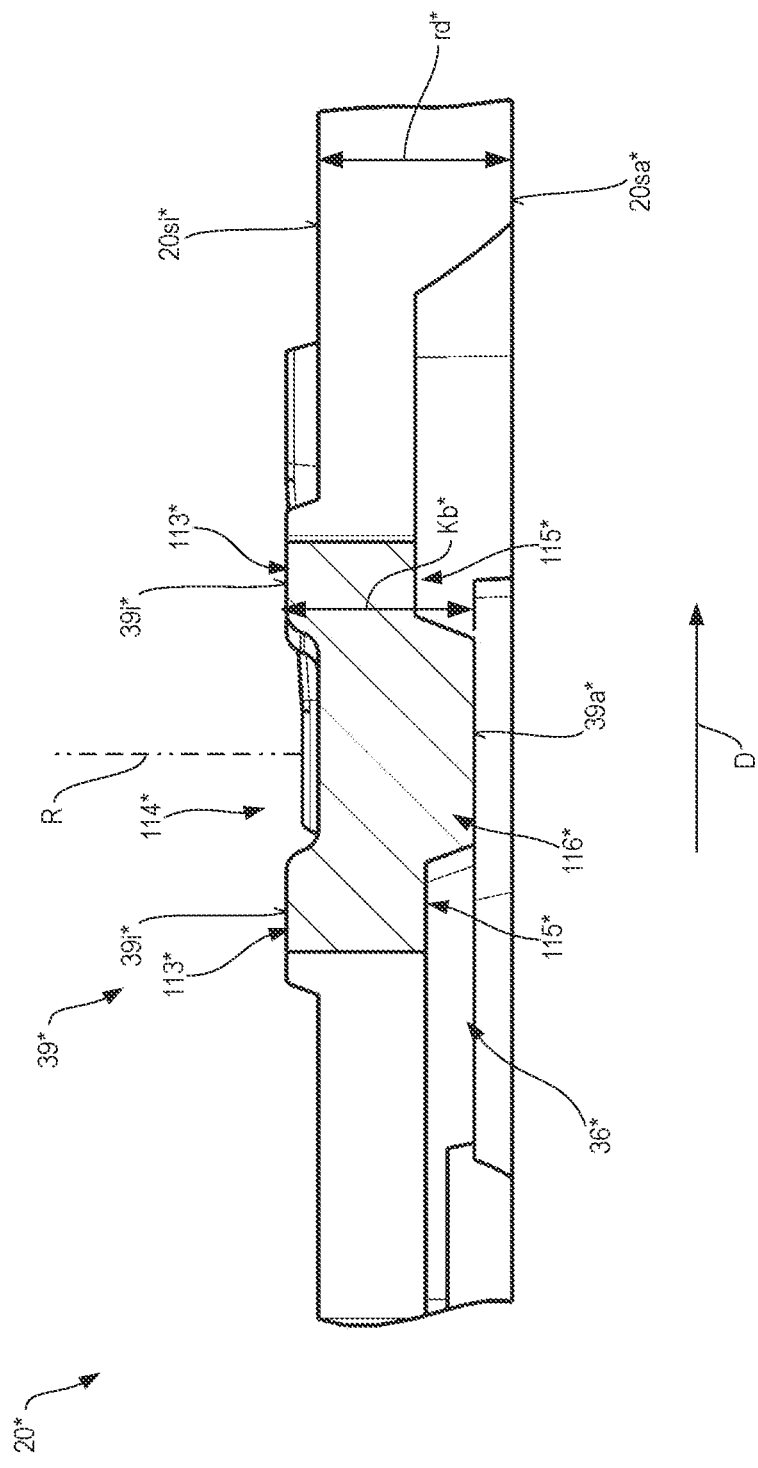
FIG. 18A shows a circumferential section through the tooth tip of an alternative embodiment, produced by non-cutting deformation, of the release-side stabilizing tooth 39* of FIGS. 18B and 18C of an alternative embodiment, produced by non-cutting deformation of a sprocket blank composed of sheet metal, of the odd-numbered sprocket 20* with 21 teeth in a cylindrical section area XVIII A of FIGS. 18B and 18C with the sprocket axis as cylinder axis.

FIGS. 18A to 18C illustrates a release-side stabilizing tooth 39* which is generated in non-cutting fashion by punching and deformation and which is formed on an odd-numbered sprocket 20*, with 21 teeth, produced by non-cutting shaping processes. All of the teeth of the sprocket 20* are produced by non-cutting shaping processes. It is fundamentally not intended to rule out that sprockets produced by non-cutting shaping processes are subjected to cutting finishing processes. For efficient production, in particular mass production, it is however preferred for a sprocket to be produced either in non-cutting fashion or by cutting from the sprocket blank in order to realize the finished sprocket.

FIG. 18A shows a sectional view through the tooth 39* in the section area XVIII, which extends cylindrically about the sprocket axis R as the cylinder axis, of FIGS. 18B and 18C in a viewing direction radially inwards towards the sprocket axis R.

The inner side surface 20si* of the sprocket 20* indicates a first non-deformed planar outer surface of the original sprocket blank composed of sheet metal, in particular of sheet steel. Likewise, the outer side surface 20sa* indicates a non-deformed planar second outer surface of the original sprocket blank. The two non-deformed outer surfaces of the original sprocket blank now form the face sides 20si* and 20sa* of the sprocket 20* formed by non-cutting processes. The original thickness dimension of the blank is denoted by the double arrow rd*.

The inner tooth contact surface 39i is, in the section plane XVIII, divided into two sections which, in the circumferential direction, are separate from one another and arranged with a spacing to one another. Since it is generally the case in the actual non-cutting production process that, in a deep-drawing process, material is forced and displaced in the thickness direction of the sprocket blank from what will later be the outer side to what will later be the inner side of the sprocket, every part of the inner tooth contact surface 39i* is formed as an axial face surface, facing in an axial direction, of a projection 113*. The two projections 113* are formed in each case at a leading edge in the drive direction of rotation D, and at a trailing edge in the drive direction of rotation D, of the release-side stabilizing tooth 39*. Accordingly, a recess 114* is inevitably formed between the two projections 113* in the drive direction of rotation D. The actual deformation work during the production process is however performed primarily in the region of the projections 113*.

In each case one recess 115* is situated on the outer side of the sprocket 20* or of the release-side stabilizing tooth 39* opposite the projections 113* on the inner side of the sprocket 20* or of the release-side stabilizing tooth 39*, which recesses are complementary with respect to the projections 113*. Between the recesses 115* along the drive axis of rotation D, on the outer side of the release-side stabilizing tooth 39*, there is formed a projection 116* which is complementary with respect to the recess 114* on the inner side.

The recess 114* on the inner side of the sprocket 20* or of the release-side stabilizing tooth 39* is formed by deformation of the original raw material in the thickness direction beyond the outer surface, which forms the inner side surface 20si*, of the sprocket blank.

As is also the case in the exemplary embodiment discussed above, the spacing from the outer tooth contact surface 39a* to the inner tooth contact surface 39i* forms the chain-guiding dimension, which is a chain-guiding dimension Kb* because the release-side stabilizing tooth 39* of the odd-numbered sprocket 20* is, like every other tooth of the odd-numbered sprocket 20*, an inner link plate sprocket tooth that is designed for engagement into the engagement space of an inner link plate chain link of the bicycle chain.

As can be seen in FIG. 18A, the release-side stabilizing tooth 39* may, both in the regions in which the inner tooth contact surface 39i* is formed and in the regions in which the outer tooth contact surface 39a* is formed and which are substantially complementary to the aforementioned regions, have in each case a thickness smaller than the original raw material thickness. This can lead to advantageous strain hardening of the release-side stabilizing tooth 39* and thus to reduced susceptibility to wear. Nevertheless, the chain-guiding dimension Kb* may, in terms of magnitude, be equal to or even greater than the thickness of the release-side stabilizing tooth 39* in the section area in question. In the exemplary embodiment illustrated, the chain-guiding dimension Kb* approximately corresponds to the thickness dimension of the original raw material. The chain-guiding dimension Kb* may, through corresponding deformation, even be greater than the original raw material thickness, however.

The outer tooth contact surface 39a* that is already situated in the upshift recess formation 36* assists the changeover of the bicycle chain onto the axially adjacent next smaller sprocket during upshifting, because the outer tooth contact surface 39a*, as face surface of the projection 116*, axially outwardly displaces the bicycle chain that passes the release-side stabilizing tooth 39* on the outside during upshifting.

Through the formation of the recess or recess 114*, material of the sprocket 20* can be displaced by plastic flow within the die used for the production of the sprocket, which keeps the deformation forces required for the deformation of the blank to form the sprocket 20* relatively low overall, at any rate lower than if a compaction of the raw material were to be achieved by means of the deformation.

The recess 115*, in the sum of its two sections, on the outer side of the sprocket 20*, and the complementary projection 113*, likewise in the sum of its two sections, on the inner side of the sprocket 20*, have a larger dimension, preferably a dimension which is at least twice as large, in the radial direction than in the circumferential direction. It can hereby be ensured that a chain link of the bicycle chain engaged by the release-side stabilizing tooth 39* is guided axially with the smallest possible gap dimension relative to the release-side stabilizing tooth 39* over the longest possible radial travel of the chain link.

In the same way as above in FIGS. 18A to 18C, FIGS. 19A to 19C illustrate the tooth 41*, as a tooth deformed by non-cutting processes, which follows the release-side stabilizing tooth 39* counter to the drive direction of rotation D. It is in turn the case that the inner tooth contact surface 41i*, as the inner side surface of a projection 117* on the inner side of the sprocket 20*, has been displaced beyond the inner side surface 20i* of the sprocket 20*. Here, a groove-like recess 118* has been formed on the inner side of the tooth 41*, which recess, as can be seen from FIG. 19C, has a rectilinear radial profile with, along its radial profile, a substantially constant width in the circumferential direction and a step-free recess base. By means of this configuration, material is forced from the recess 118* to the outer side of the sprocket in order to enable the upshift recess formation 36*, which is importance for the chain guidance, to be formed on the outer side in the most effective possible manner and with optimum contour definition. This recess assists a displacement of material of the sprocket blank in the region of the outer tooth contact surface 41a* toward the formation 120*. The formation 120*, despite forming the outer tooth contact surface 41a* as the outer side surface thereof, is from a manufacturing aspect a recess in relation to the sprocket blank, because the formation 120* has been displaced into the material of the sprocket blank, that is to say recessed, in relation to the original outer side of the sprocket blank, which on the finished sprocket 20* forms the outer side surface 20sa* of the sprocket 20*.

It is also the case on the tooth 41* that the chain-guiding dimension Kb* is approximately equal to the raw material thickness rd*. By plastic flow during the deformation process, it would be possible for the chain-guiding dimension Kb* to be configured to be smaller than, equal to or even larger than the raw material thickness, as is the case for every other tooth of the sprocket 20* deformed by non-cutting processes.

On the outer side of the tooth 41*, it is possible to see the stepped recesses of the upshift recess formation 36*, which extends counter to the drive direction of rotation D from the above-described release-side stabilizing tooth 39* as far as the tooth 41* and even beyond the tooth 41*, because the outer tooth contact surface 41a* is also part of the upshift recess formation 36*.

The recess 120* on the outer side of the sprocket 20*, and the projection 117* on the inner side of the sprocket 20*, have a larger dimension, preferably a dimension which is at least twice as large, in the radial direction than in the circumferential direction. It can hereby be ensured that a chain link of the bicycle chain engaged by the tooth 41* is guided axially with the smallest possible gap dimension relative to the tooth 41* over the longest possible radial travel of the chain link.

Figure 19A:
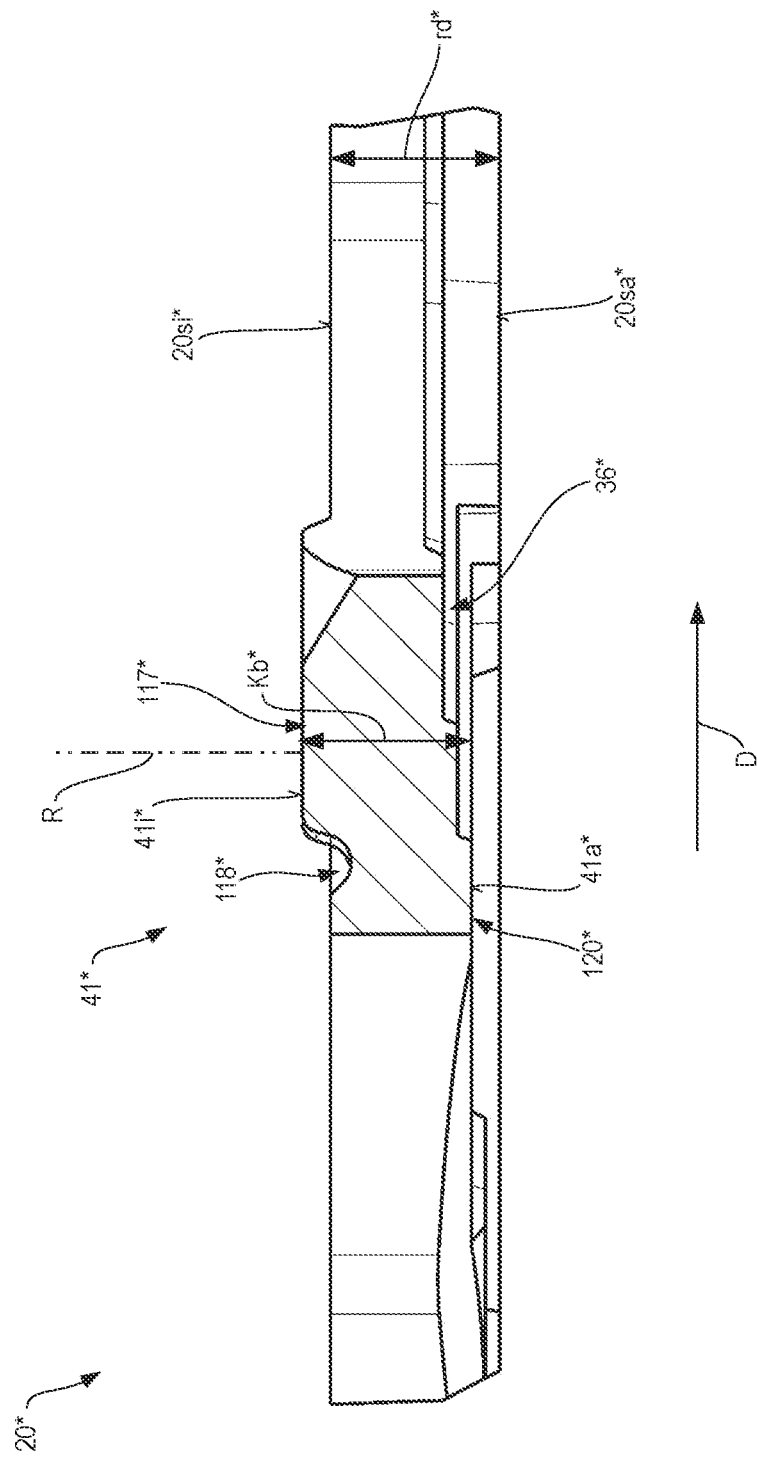
FIG. 19A shows a circumferential section through the tooth tip of an alternative embodiment, produced by non-cutting deformation, of the tooth 41*, which is adjacent to the release-side stabilizing tooth 39* counter to the drive direction of rotation D, of FIGS. 19B and 19C of the alternative embodiment, produced by non-cutting deformation of a sprocket blank composed of sheet metal, of the odd-numbered sprocket 20* with 21 teeth in a cylindrical section area XIX A of FIGS. 19B and 19C with the sprocket axis as cylinder axis.
Figure 19B:
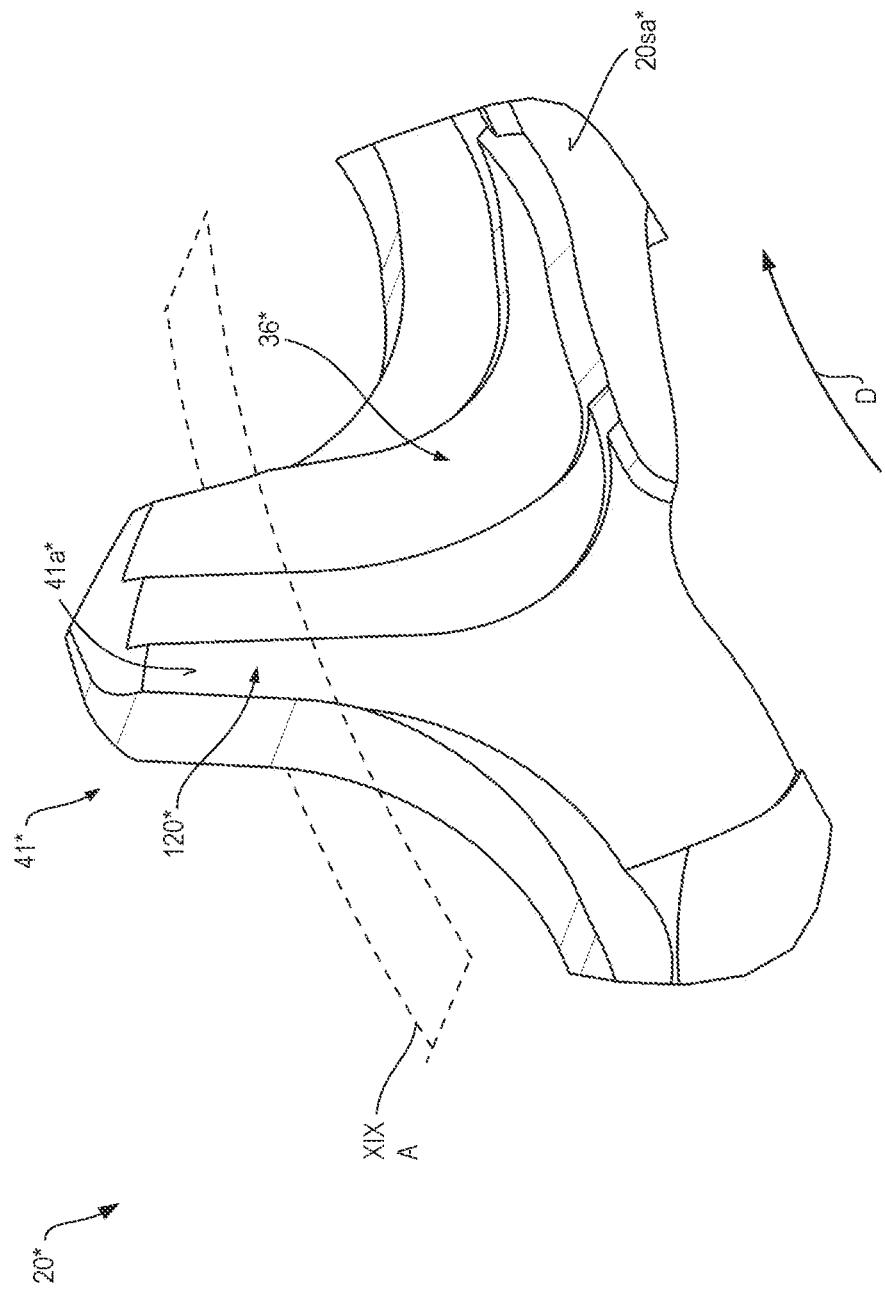
FIG. 19B shows a perspective view of the outer side of the alternative tooth 41*, produced by non-cutting deformation, on the sprocket 20* of FIG. 19A.
Figure 19C:
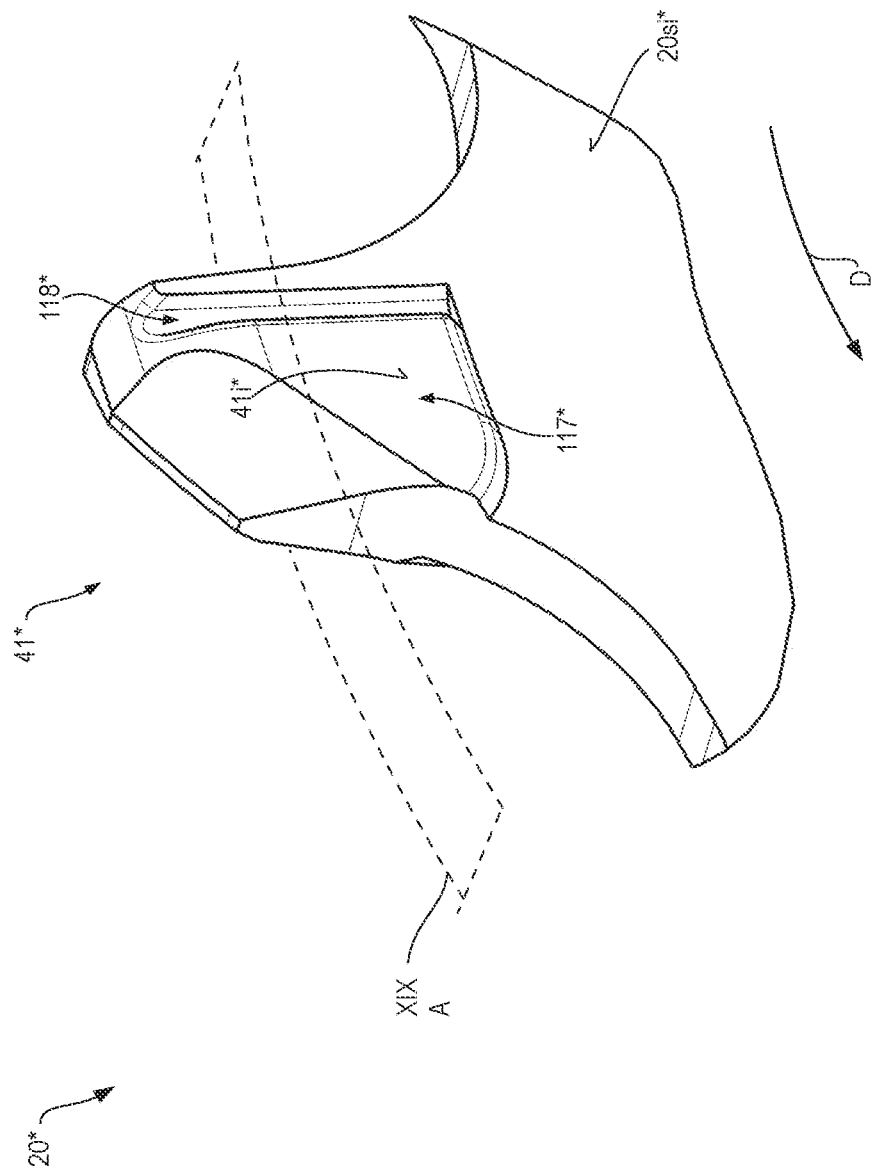
FIG. 19C shows a perspective view of the inner side of the alternative tooth 41*, produced by non-cutting deformation, on the sprocket 20* of FIGS. 19A and 19B.

The cylindrical section area in which the tooth 41* sectioned in the circumferential direction is considered in FIG. 19A in a view directed toward the sprocket axis R is denoted by XIX in FIGS. 19B and 19C.

In the same way as above in FIGS. 18A to 18C and 19A to 19C, FIGS. 20A to 20C illustrate the reference tooth B*, as a tooth deformed by non-cutting processes, which follows the tooth 41* counter to the drive direction of rotation D. The section area in which the tooth B* sectioned in the circumferential direction is considered in FIG. 20A in a view directed toward the sprocket axis R is denoted by XX in FIGS. 20B and 20C.

The reference tooth B* is, by definition, that inner link plate sprocket tooth which has the largest chain-guiding dimension Kb* in terms of magnitude. The inner tooth contact surface 20i* is formed by the face surface of a projection 122*. As also in the case of the teeth 39* and 41* discussed above, the inner tooth contact surface 20i* has been displaced axially beyond the inner face surface 20si*.

The projection 122* is, in the circumferential direction, that is to say along the drive direction of rotation D, bordered on both sides by a recess or recess 124*, which allows material from the region of the recesses 124* to be displaced by plastic flow in order to form the projection 122* with particularly good dimensional accuracy and contour definition.

A recess 126* on the outer side of the sprocket 20* is situated axially opposite the projection 122* on the inner side of the sprocket 20*, which recess assists the formation of the projection 122*. Material of the reference tooth B* displaced as a result of the formation of the recess 126* has been displaced by plastic flow into the projection 122*.

The outer tooth contact surface 20d* is formed to both sides of the recess 126* at least along the drive direction of rotation D. The outer tooth contact surface may also completely surround the recess 126*.

The recess 126* on the outer side of the sprocket 20*, and the complementary projection 122* on the inner side of the sprocket 20*, have a larger dimension, preferably a dimension which is at least twice as large, in the radial direction than in the circumferential direction. It can hereby be ensured that a chain link of the bicycle chain engaged by the reference tooth B* is guided axially with the smallest possible gap dimension relative to the reference tooth B* over the longest possible radial travel of the chain link.

In the same way as above in FIGS. 18A to 18C and 19A to 19C and 20A to 20C, FIGS. 21A to 21C illustrate the tooth 47*, as a tooth deformed by non-cutting processes, which follows the reference tooth B* counter to the drive direction of rotation D. The section area in which the tooth 47* sectioned in the circumferential direction is considered in FIG. 21A in a view directed toward the sprocket axis R is denoted by XXI in FIGS. 21B and 21C.

On the tooth 47*, too, the inner tooth contact surface 47i* is formed as the face surface of an axial projection 128* that protrudes over the former outer surface of the deformed sprocket blank.

A recess 130* on the outer side of the sprocket 20* is situated opposite the projection 128* on the inner side of the sprocket 20*. The outer tooth contact surface 47a* formed by the axial face side of the recess 130* is already part of a downshift recess formation 42*, which extends as an axial recess in the outer side surface 20si* counter to the drive direction of rotation D.

By contrast to the situation with the above-described teeth of the sprocket 20* produced by non-cutting deformation, the inner tooth contact surface 47i* of the tooth 47* extends substantially over the entire circumferential extent thereof.

The inner tooth contact surface 47i* is shortened in the radial direction by the formation of an inner oblique surface 47v* on the tooth tip. The outer tooth contact surface 47a* formed on the outer side surface 20sa* of the sprocket 20* is, like the above-discussed outer tooth contact surfaces of the teeth 39*, 41* and B*, formed with a dimension which is larger, preferably twice as large, in the radial direction than in the circumferential direction.

Figure 22A:
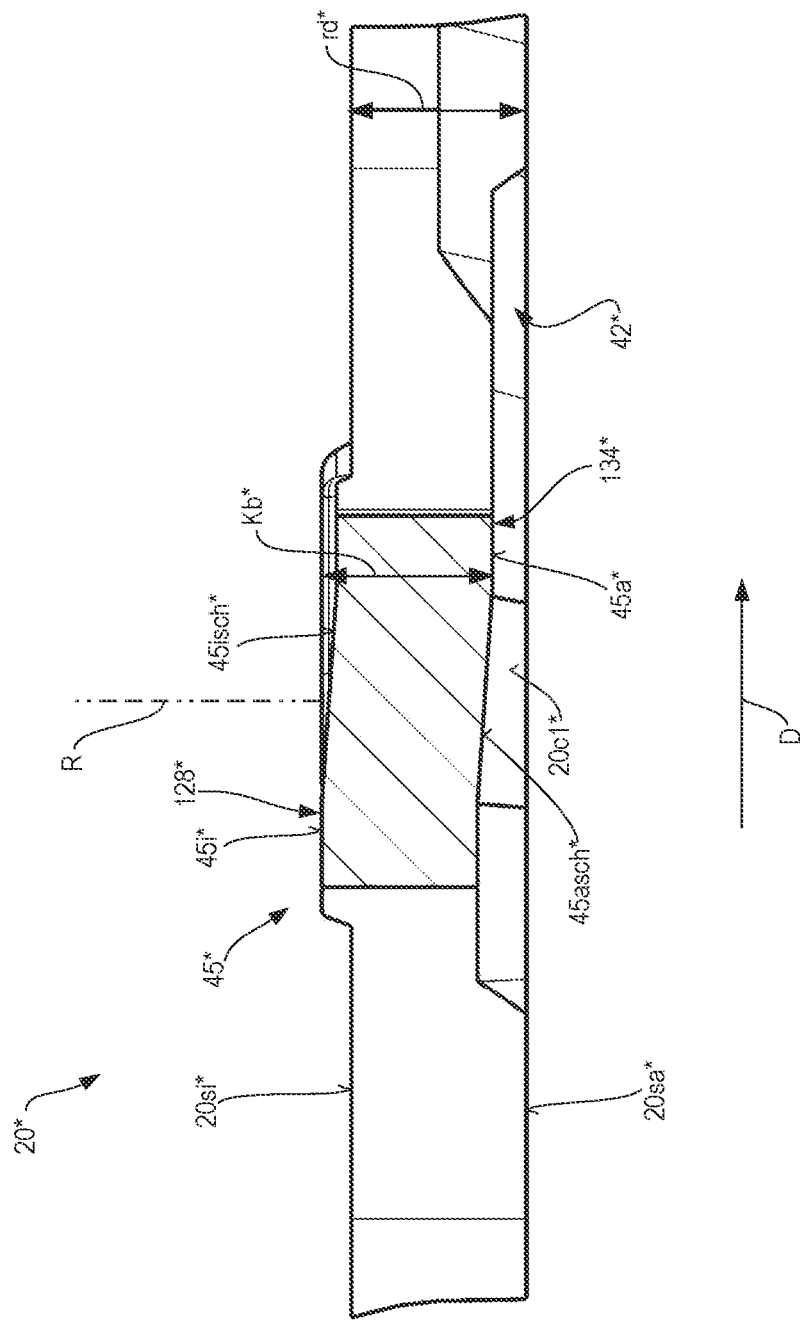
FIG. 22A shows a circumferential section through the tooth tip of an alternative embodiment, produced by non-cutting deformation, of the receiving-side stabilizing tooth 45* of FIGS. 20B and 20C of the alternative embodiment, produced by non-cutting deformation of a sprocket blank composed of sheet metal, of the odd-numbered sprocket 20* with 21 teeth in a cylindrical section area XXII A of FIGS. 22B and 22C with the sprocket axis as cylinder axis.
Figure 22B:
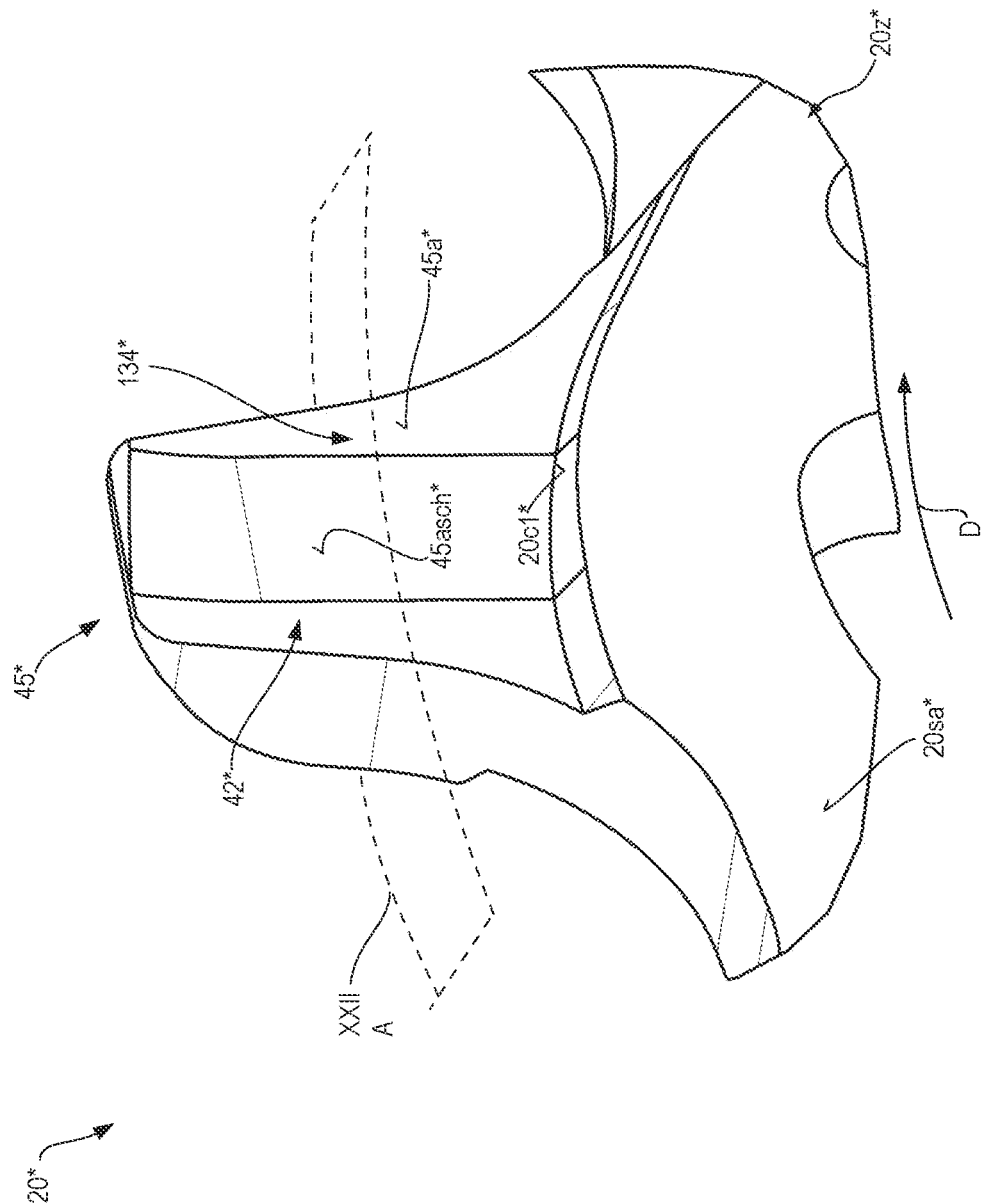
FIG. 22B shows a perspective view of the outer side of the alternative receiving-side stabilizing tooth 45*, produced by non-cutting deformation, on the sprocket 20* of FIG. 22A.
Figure 22C:
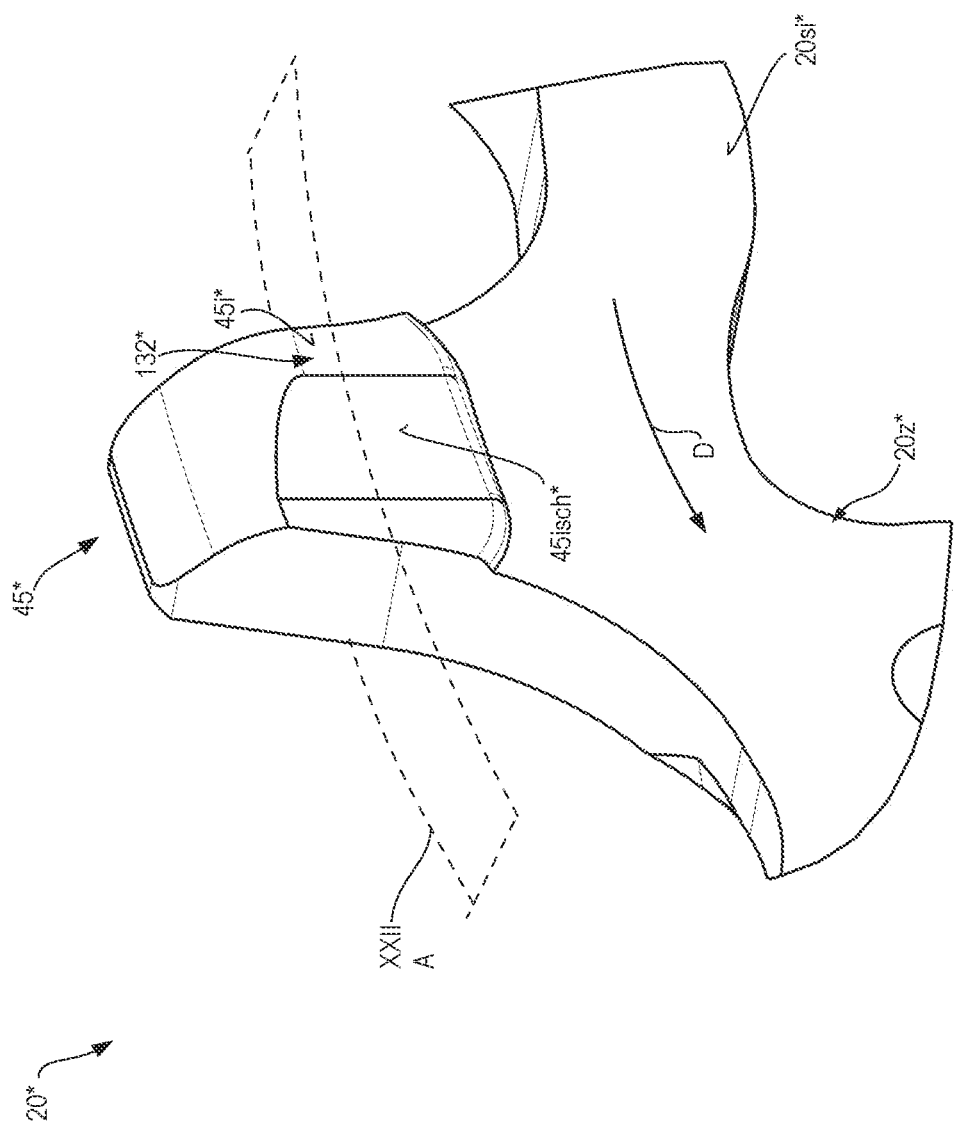
FIG. 22C shows a perspective view of the inner side of the alternative receiving-side stabilizing tooth 45*, produced by non-cutting deformation, on the sprocket 20* of FIGS. 22A and 22B.

In the same way as above in FIGS. 18A to 18C and 19A to 19C and 20A to 20C and 21A to 21C, FIGS. 22A to 22C illustrate the receiving-side stabilizing tooth 45*, as a tooth deformed by non-cutting processes, which follows the tooth 47* counter to the drive direction of rotation D. The section area in which the receiving-side stabilizing tooth 45* sectioned in the circumferential direction is considered in FIG. 22A in a view directed toward the sprocket axis R is denoted by XXII in FIGS. 22B and 22C.

The inner tooth contact surface 45i* is formed as the face surface of a projection 132. The outer tooth contact surface 45a* situated on the opposite side is formed as the face surface of a recess 134. The recess 134 is part of the downshift recess formation 42*, which extends in the circumferential direction over the width of the receiving-side stabilizing tooth 45*.

In each case one oblique surface 45isch*, on the inner side of the receiving-side stabilizing tooth 45*, and one oblique surface 45asch*, on the outer side of the receiving-side stabilizing tooth 45*, is situated adjacent to the tooth contact surfaces, that is to say inner tooth contact surface 45i* and outer tooth contact surface 45a*, in the circumferential direction. The two oblique surfaces 45isch* and 45asch* are inclined about an inclination axis that is parallel to the radial direction. These oblique surfaces 45isch* and 45asch* may particularly advantageously be produced by non-cutting shaping processes. The production thereof by a cutting process would be disproportionately more complex.

In the exemplary embodiment illustrated, the oblique surfaces 45isch* and 45asch* are parallel to one another, though they may also be oriented relative to one another in a manner that deviates from this.

Whereas the inner tooth contact surface 45i* is radially shortened by an oblique surface at the tooth tip, as already discussed previously with regard to the tooth 47*, the outer tooth contact surface 45a* has a radial dimension considerably longer than a dimension in the circumferential direction. The radially shortened inner tooth contact surface 45i* also still has a dimension in the radial direction which is of greater magnitude than that in the circumferential direction.

FIG. 22D shows a plan view of the outer side of that circumferential section of the sprocket 20* produced by non-cutting deformation which has an upshift region 34* and a downshift region 40* with the teeth 38*, 39*, 41*, B*, 47*, 45* and 44*, of which the teeth 39*, 41*, B*, 47* and 45* are shown in FIGS. 18A to 22C.

Figure 22E:
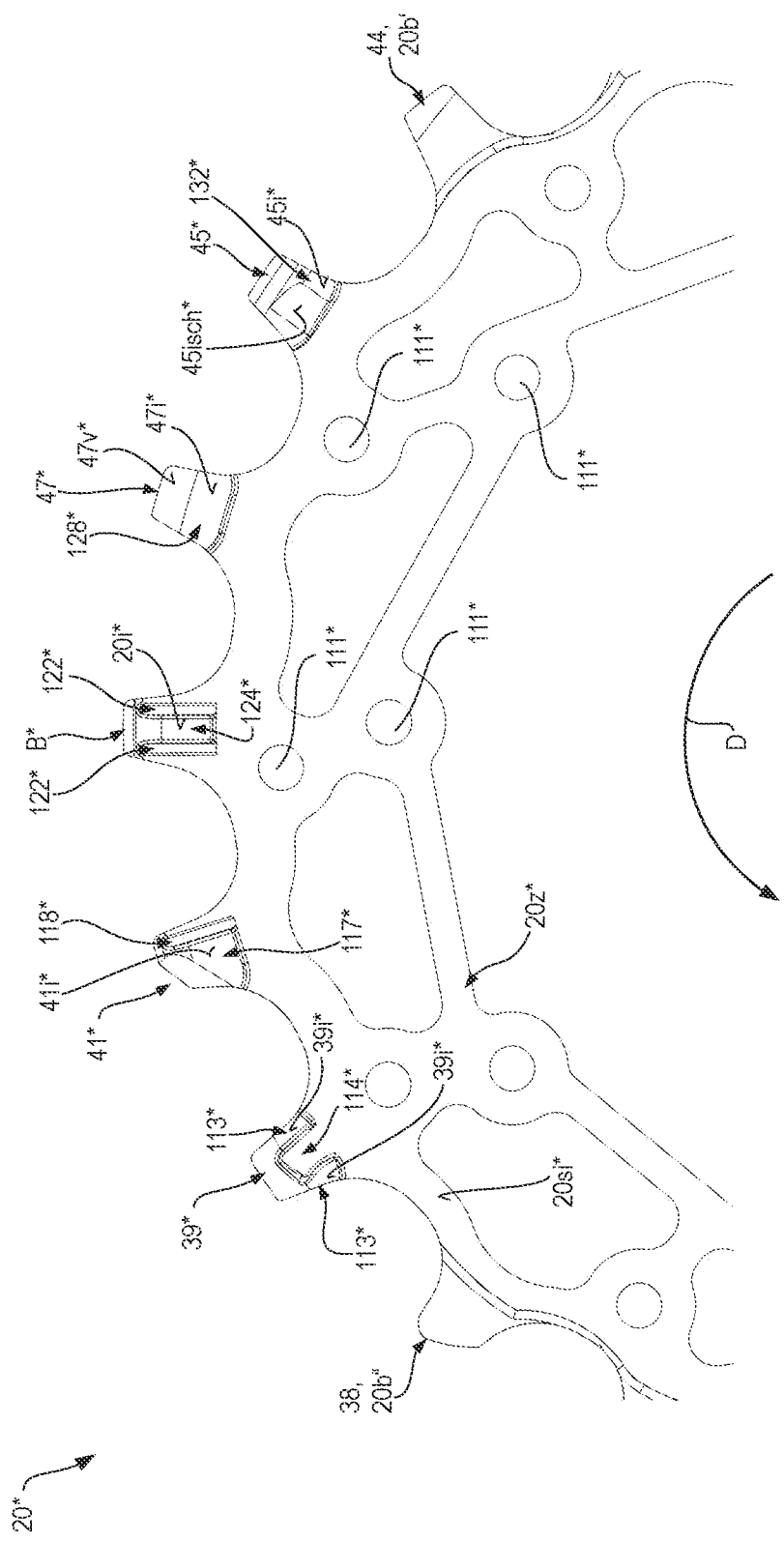
FIG. 22E shows a plan view of the inner side of the circumferential segment of FIG. 22D.

FIG. 22E shows a plan view of the inner side of the circumferential segment of FIG. 22D.

Figure 23B:
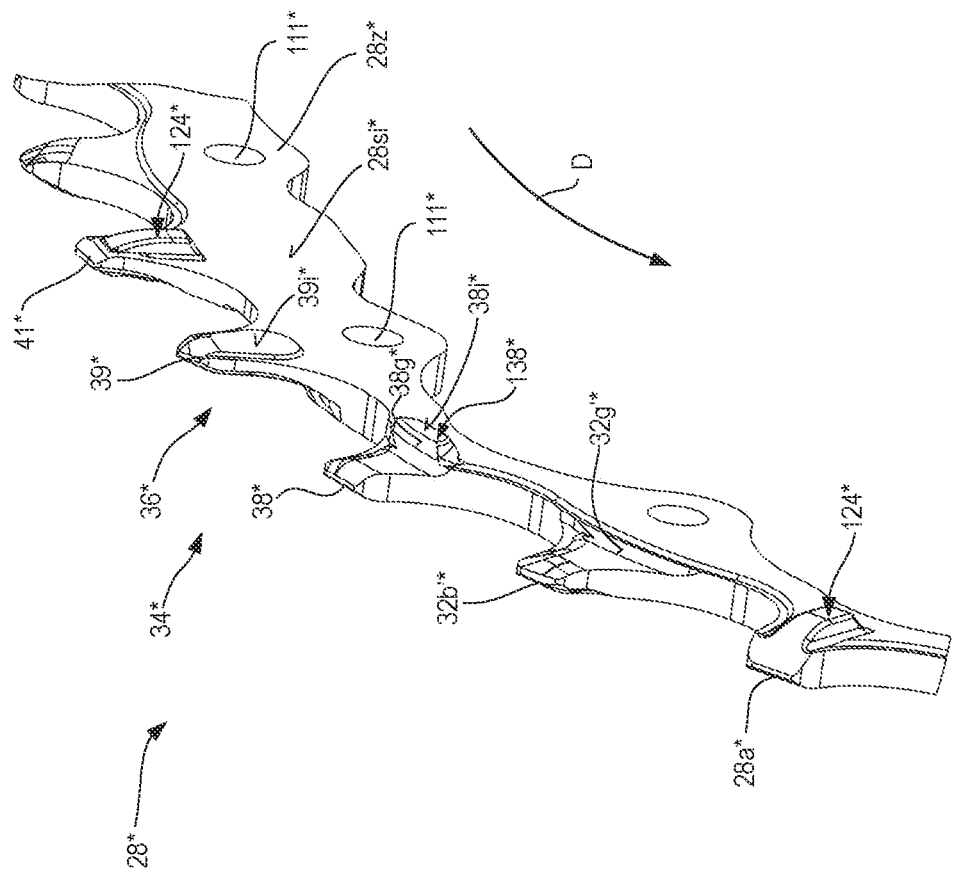
FIG. 23B shows a perspective view of the inner side of the upshift region 34* of FIG. 23A, wherein the upshift region 34* is situated in the circumferential region XXIII of FIG. 25.

FIG. 23A illustrates a detail, which has an upshift region 34*, of the sprocket 28* produced alternatively by non-cutting shaping processes. The viewer of FIG. 23A sees the outer side or the outer side surface 28sa* of the sprocket 28*. The upshift region 34* of FIGS. 23A and 23B is situated in the region denoted by XXIII in FIG. 25.

As above, it also applies to FIGS. 23A to 24B that identical and functionally identical components and component sections are denoted with the same reference designations as above, but with a suffix "*" in order to designate the components and component sections as having been produced by non-cutting shaping processes. For the description of the identical and functionally identical components and component sections, reference is therefore made to the description above, which also applies to the components and component sections of the sprocket 28* produced by non-cutting processes. Below, FIGS. 23A to 24B will be described only to the extent that special features arise from the non-cutting shaping of the sprocket 28*.

In FIGS. 23A and 23B, an above-described ramp 38g* of the release tooth 38* and a ramp 32g'* of the release-side mobilizing tooth 32b'* are illustrated on the inner side 28si* of the sprocket 28*. Here, the ramp 38g* protrudes further in the axial direction than the ramp 32g'* of the release-side mobilizing tooth 32b'. This is because, on the even-numbered sprocket 28*, the release tooth 38* is a tooth of relatively large axial dimension, which is designed for engagement with an outer link plate chain link, and the immediately adjacent release-side mobilizing tooth 32*b' is a tooth of relatively small axial dimension, which is designed for engagement with an inner link plate chain link.

Figure 20A:
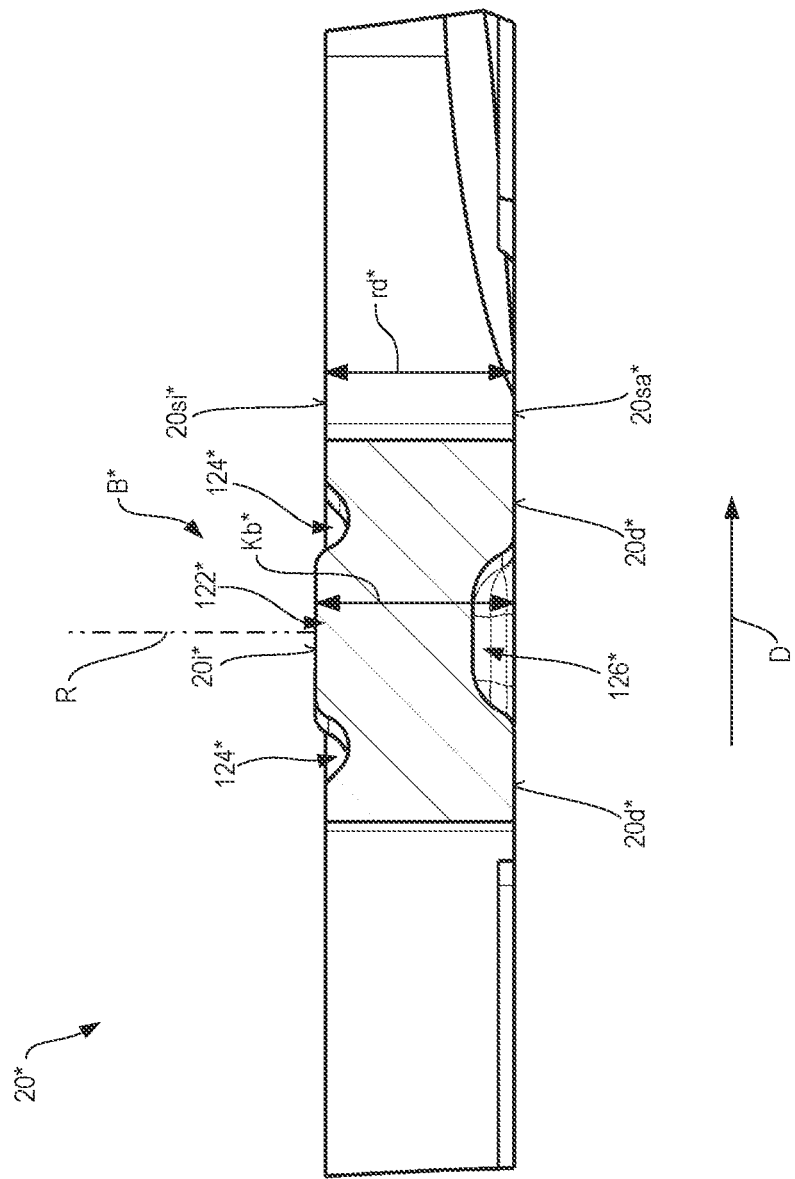
FIG. 20A shows a circumferential section through the tooth tip of an alternative embodiment, produced by non-cutting deformation, of the reference tooth B* of FIGS. 20B and 20C of the alternative embodiment, produced by non-cutting deformation of a sprocket blank composed of sheet metal, of the odd-numbered sprocket 20* with 21 teeth in a cylindrical section area XX A of FIGS. 20B and 20C with the sprocket axis as cylinder axis.
Figure 20B:
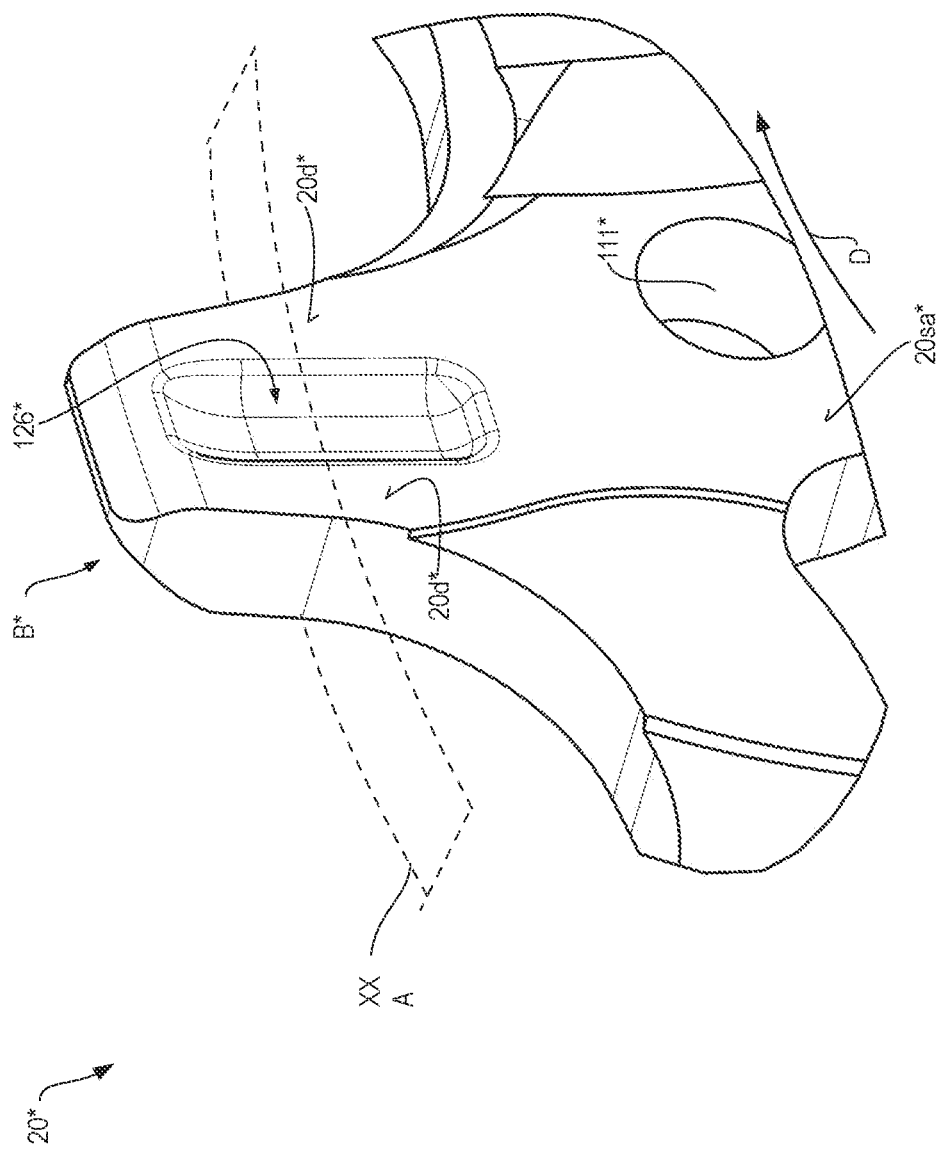
FIG. 20B shows a perspective view of the outer side of the alternative reference tooth B*, produced by non-cutting deformation, on the sprocket 20* of FIG. 20A.
Figure 20C:
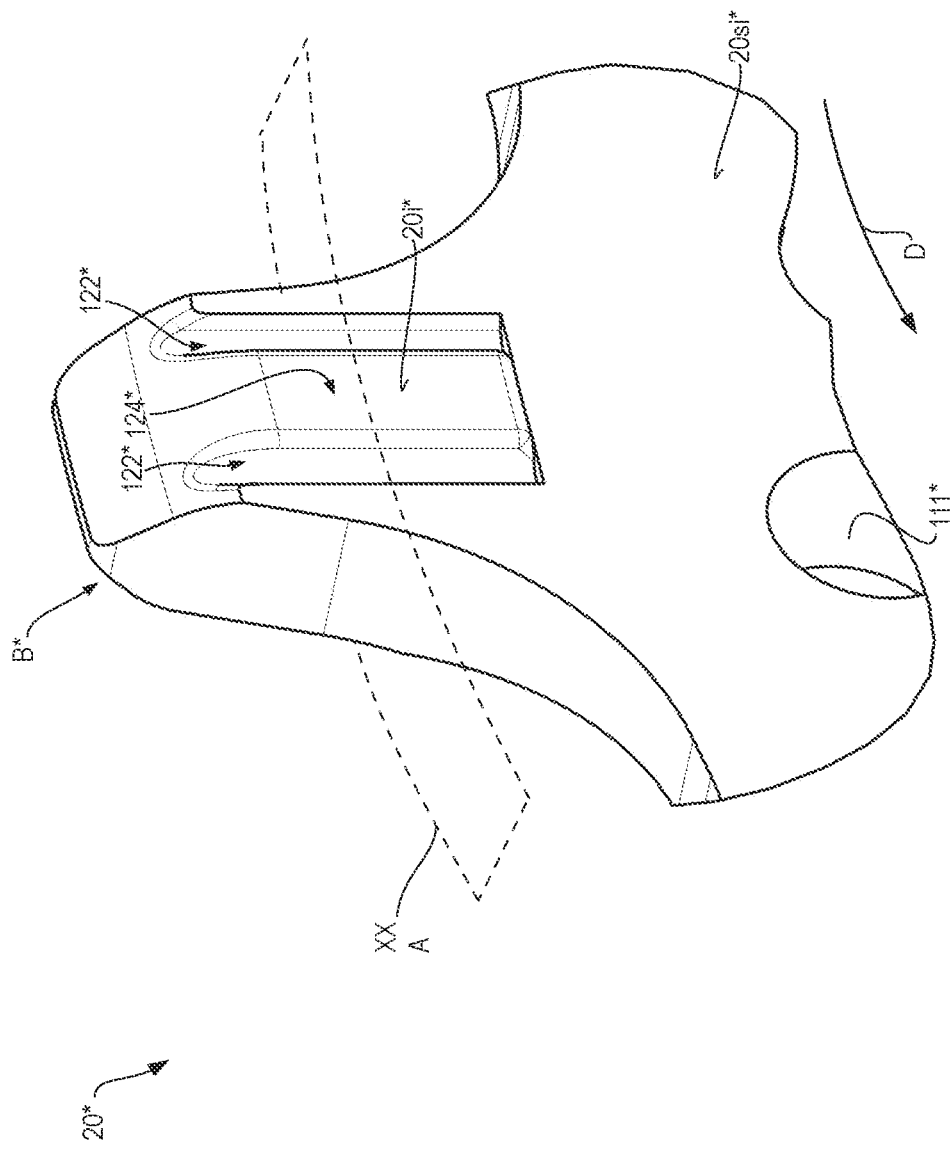
FIG. 20C shows a perspective view of the inner side of the alternative reference tooth B*, produced by non-cutting deformation, on the sprocket 20* of FIGS. 20A and 20B.
Figure 21A:
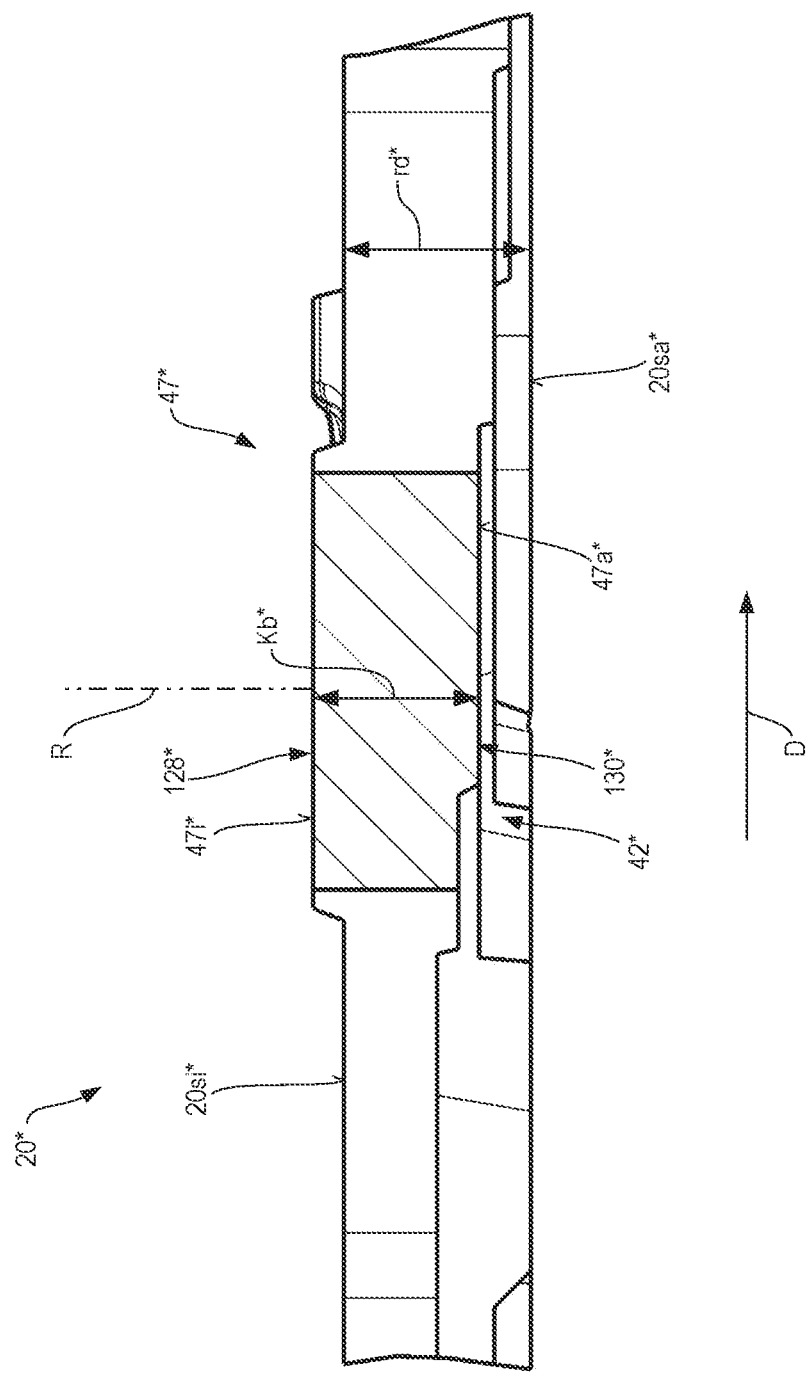
FIG. 21A shows a circumferential section through the tooth tip of an alternative embodiment, produced by non-cutting deformation, of the tooth 47*, which is situated between the receiving-side stabilizing tooth 45* and the reference tooth B*, of FIGS. 20B and 20C of the alternative embodiment, produced by non-cutting deformation of a sprocket blank composed of sheet metal, of the odd-numbered sprocket 20* with 21 teeth in a cylindrical section area XXI A of FIGS. 21B and 21C with the sprocket axis as cylinder axis.
Figure 21B:
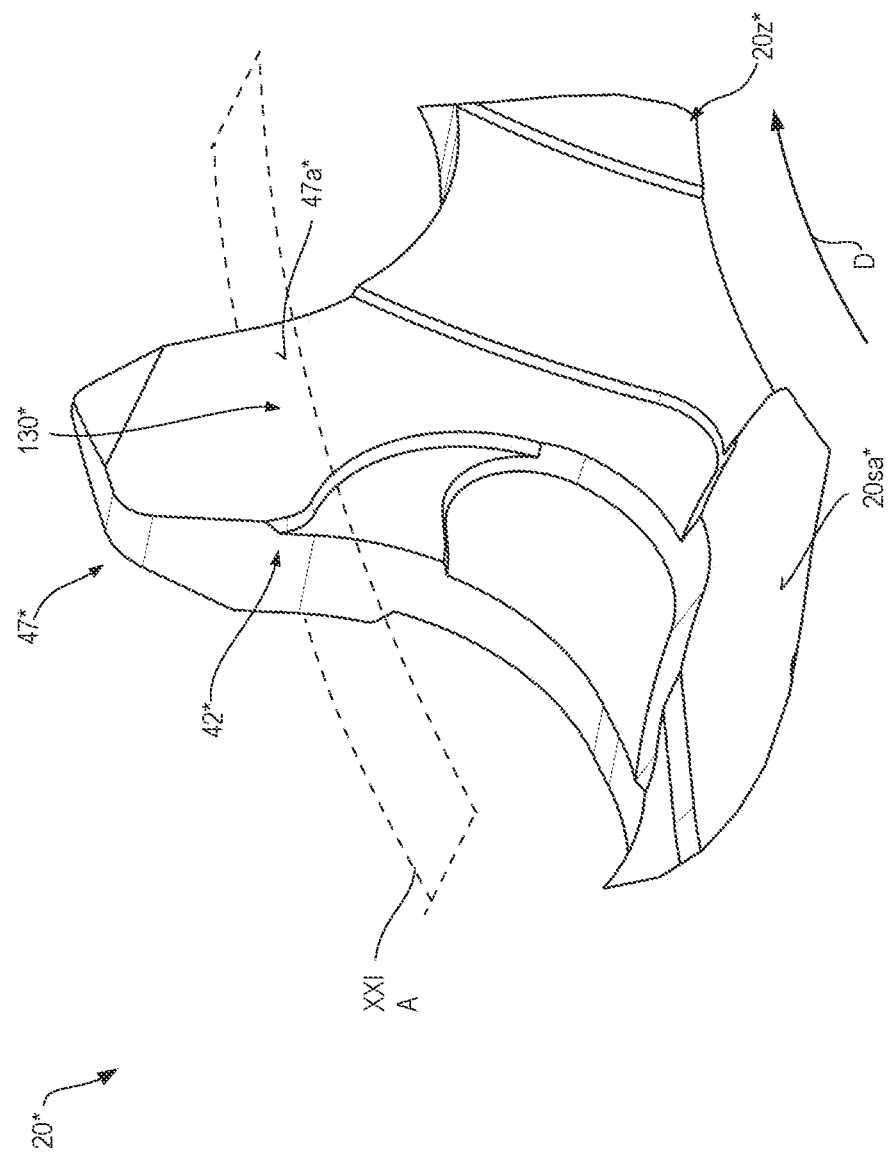
FIG. 21B shows a perspective view of the outer side of the alternative tooth 47*, produced by non-cutting deformation, on the sprocket 20* of FIG. 21A.
Figure 21C:
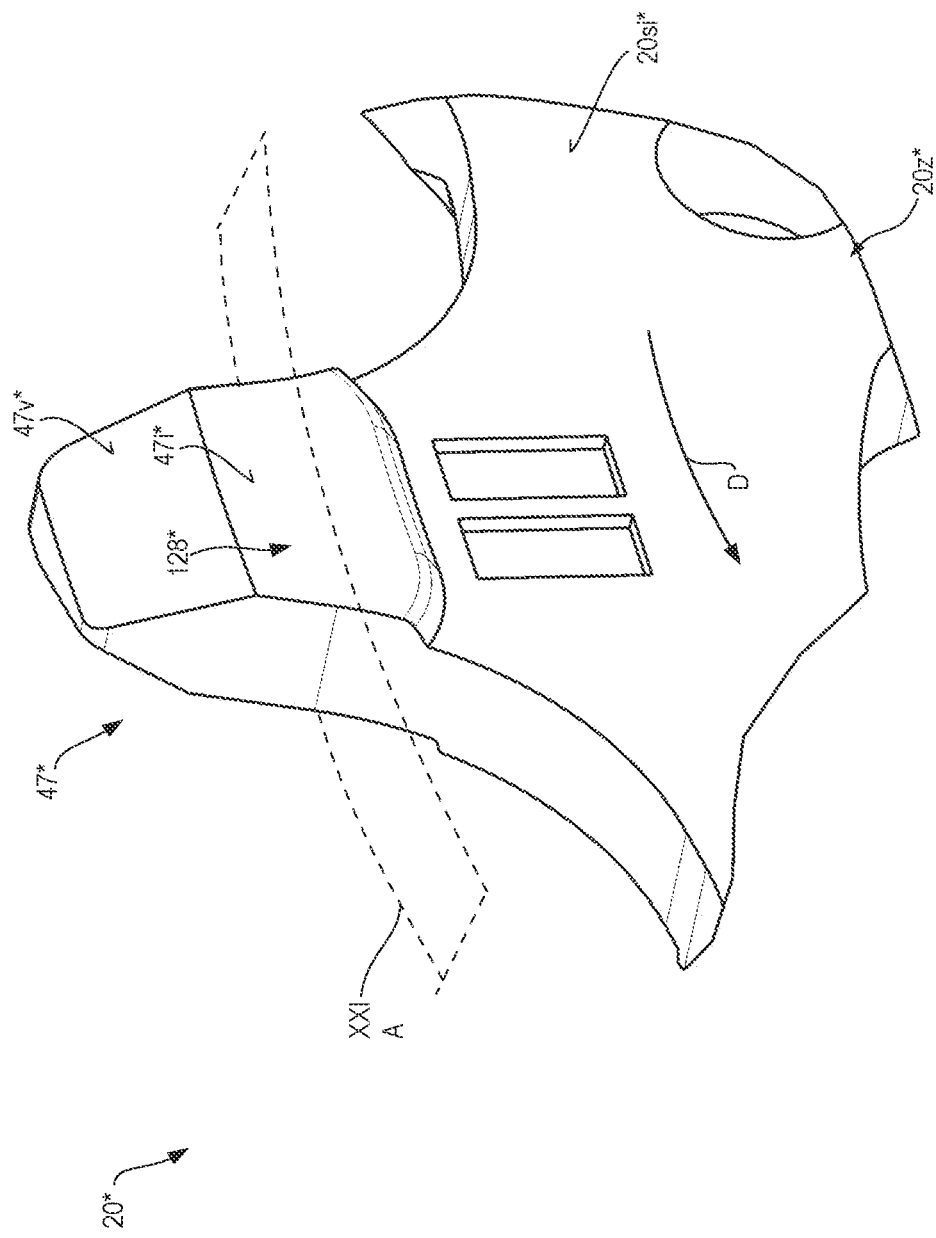
FIG. 21C shows a perspective view of the inner side of the alternative tooth 47*, produced by non-cutting deformation, on the sprocket 20* of FIGS. 21A and 21B.

As already presented above on the basis of the example of FIGS. 20A to 20C for the odd-numbered sprocket 22* shaped by non-cutting processes, it is also the case on the sprocket 28* that a chain-guiding dimension is set by local deformation of the tooth in question in the axial direction. An outer link plate sprocket tooth 28*a* has, for example on its outer side, an axial recess 126* already discussed above, corresponding to which, on the inner side, is an axial projection 124*.

Both the recess 126* and the approximately complementary projection 124* on the opposite side have a larger dimension in the radial direction than in the circumferential direction, for the reasons already mentioned above.

The ramp 38*g* on the inner side, averted from the adjacent next smaller sprocket, of the sprocket 28* is formed by non-cutting processes by means of the axial projection 138*, the production of which has led to a recess 136* on the outer side, facing towards the adjacent next smaller sprocket, of the sprocket 28*.

The projection 138* that forms the ramp 38*g* forms, on its face side facing in the axial direction, the inner tooth contact surface 38*i* of the release tooth 38*.

Both the recess 136* assigned to the ramp 38*g* and the projection 138* that forms the recess have, by contrast to teeth shaped by non-cutting processes which do not form a ramp on the inner side, a larger dimension in the circumferential direction than in the radial direction.

Figure 24B:
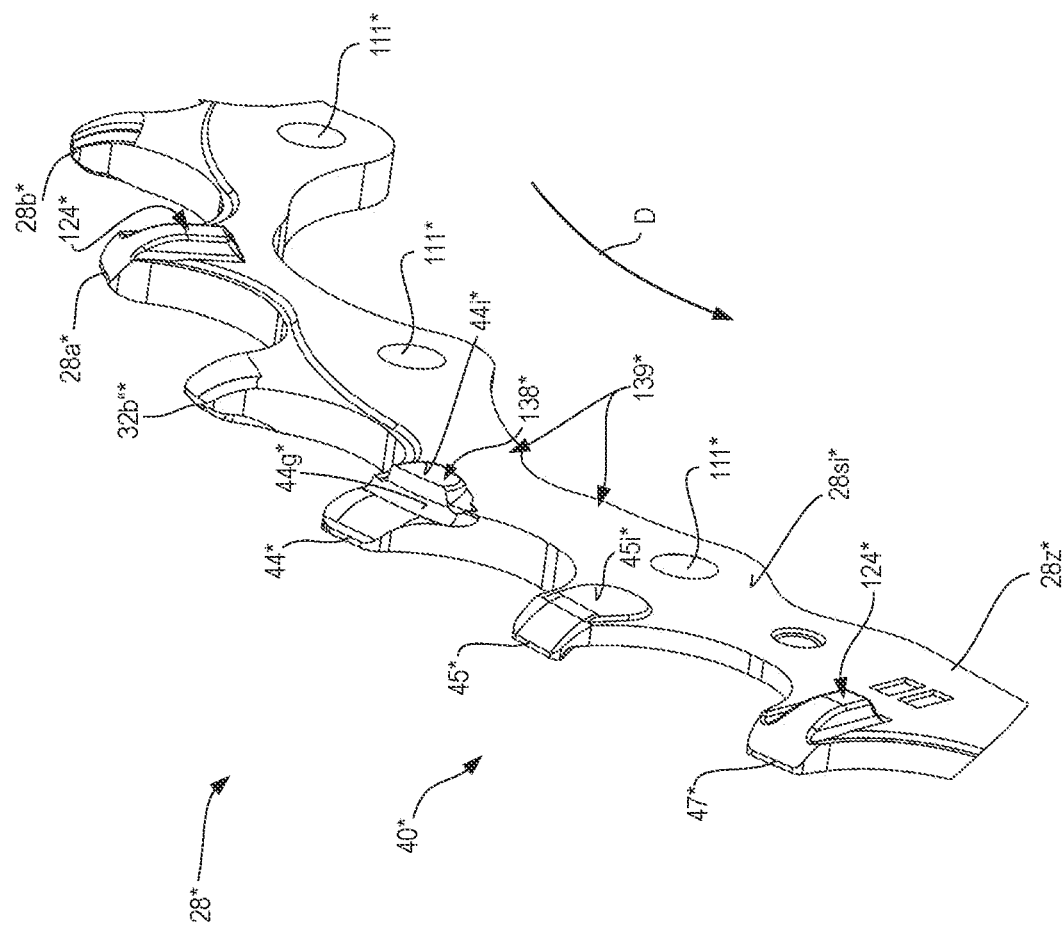
FIG. 24B shows a perspective view of the inner side of the downshift region 40* of FIG. 24A, wherein the downshift region 40* is situated in the circumferential region XXIV of FIG. 25.

FIGS. 24A and 24B show, analogously to FIGS. 23A and 23B, a downshift region 40* of the sprocket 28*. FIG. 24A shows a view of the outer face surface 28*sa* of the sprocket 28*, and FIG. 24B shows a view of the inner face surface 28*si* thereof. The downshift region 40* of FIGS. 24A and 24B is situated in the region denoted by XXIV in FIG. 25.

On the catch tooth 44* of the downshift region 40* in the segment XXIV, a ramp 44*g* is formed on the inner side of the sprocket 28* or of the catch tooth 44*. The ramp has also been formed by non-cutting shaping processes by virtue of material having been displaced in the thickness direction of a substantially planar sprocket blank from what will later be the outer side to what will later be the inner side of the sprocket 28* formed in the process.

Those statements given above for the ramp 38*g* of the release tooth 38* apply, mutatis mutandis, to the ramp 44*g* of the catch tooth 44*; specifically, the recess 136*, which is assigned to the ramp 44*g*, on the outer side of the sprocket 28* or of the catch tooth 44* and the projection 138*, which forms the recess, on the opposite inner side have a larger dimension in the circumferential direction than in the radial direction.

Figure 25:
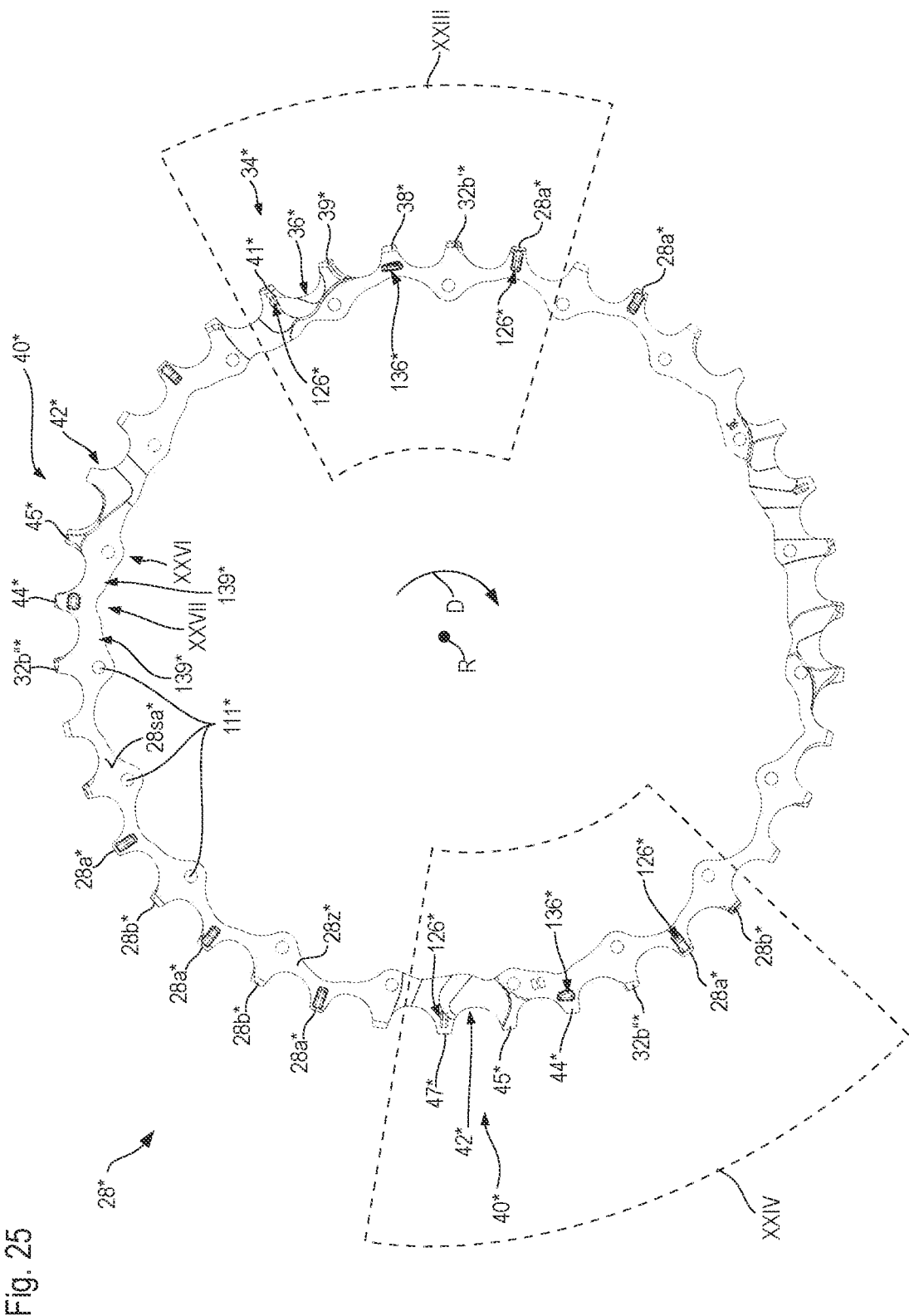
FIG. 25 shows a plan view of the outer side of the sprocket 28* produced by non-cutting deformation, and with 38 teeth, of FIGS. 23A to 24B.

FIG. 25 illustrates the sprocket 28* with 38 teeth, produced by non-cutting deformation processes, in plan view. The viewer of FIG. 25 sees the outer side of the sprocket 28*.

The sprocket 28* not only has the downshift region 40* in the segment XXIV of FIG. 25, but also, in FIG. 25, has a further downshift region 40* in the region between 12 o'clock and 1 o'clock, which further downshift region is of a structural design that differs from the downshift region 40* situated in the segment XXIV.

FIG. 25 shows connecting formations 111* which are formed on the sprocket 28* and which are in the form of connecting openings which, in the operational state of the sprocket 28*, are extended through by a connecting pin or connecting rivet (not illustrated) for the purposes of connecting the sprocket 28* to an adjacent sprocket with a different number of teeth. In the embodiment described above, the axial connection is realized by means of the described connecting webs 110. For the sake of better clarity, only three connecting formations 111* are denoted by reference designations in FIG. 25, in the circumferential region from approximately 10 o'clock to 12 o'clock. The other connecting formations are however of identical form and readily apparent.

As can be seen in FIG. 25, in the region of the further catch tooth 44* at approximately the 12 o'clock position that will be discussed further below, the sprocket is formed to both sides in the circumferential direction with a local radial material accumulation and thus with a local radial stiffening 139*. As can be seen, the sprocket main body 28*z* has a greater radial thickness to both sides of the further catch tooth 44* in the circumferential direction than, for example, to both sides of a conventional outer link plate sprocket tooth 28*a* without a gearshift function, as are shown in the circumferential region from approximately 10 o'clock to 12 o'clock.

Further local radial thickenings are formed in the circumferential region of the upshift recess formations 36* and of the downshift recess formations 42* in order, by radial material accumulation, to compensate for the axial thinning, caused by the recesses 36* and 42* respectively, of the sprocket main body 28*z* and to avoid a loss of stiffness of the sprocket 28* in the circumferential region.

Figure 26A:
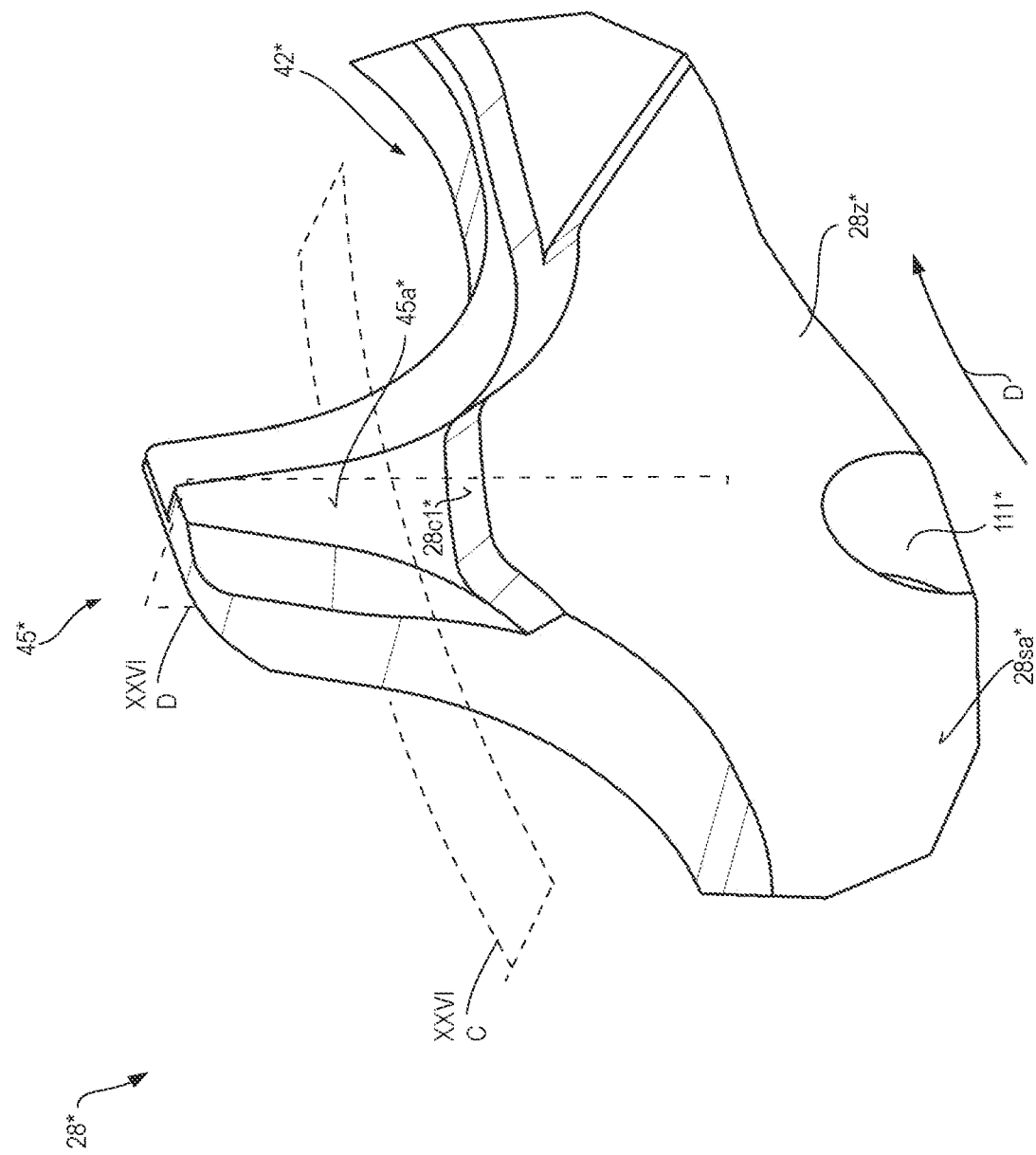
FIG. 26A shows a perspective view of the outer side of a further receiving-side stabilizing tooth 45* situated at the location XXVI in FIG. 25 and produced by non-cutting deformation, on an alternative embodiment, produced by non-cutting deformation of a sprocket blank composed of sheet metal, of the even-numbered sprocket 28* with 38 teeth.
Figure 26B:
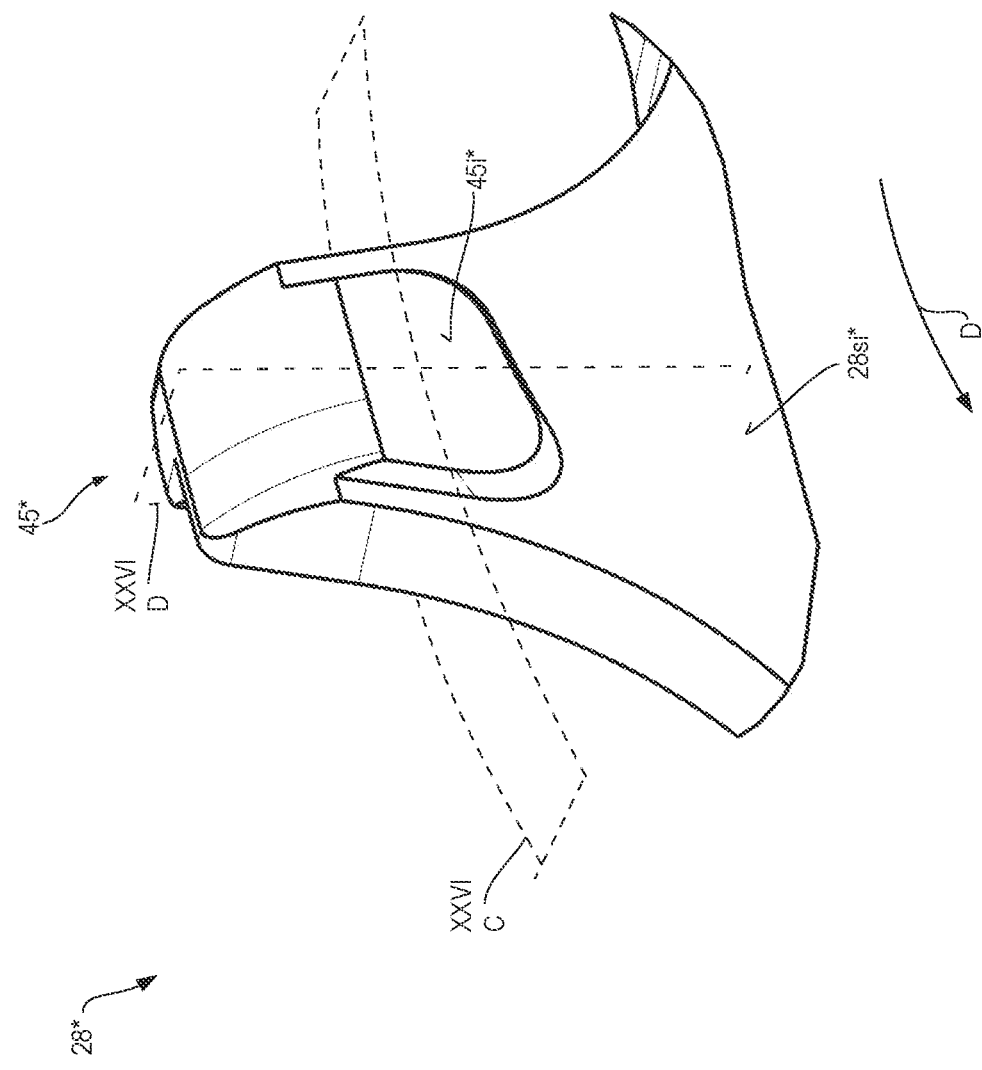
FIG. 26B shows a perspective view of the inner side of the further receiving-side stabilizing tooth 45*, produced by non-cutting deformation, of FIG. 26A.
Figure 26C:
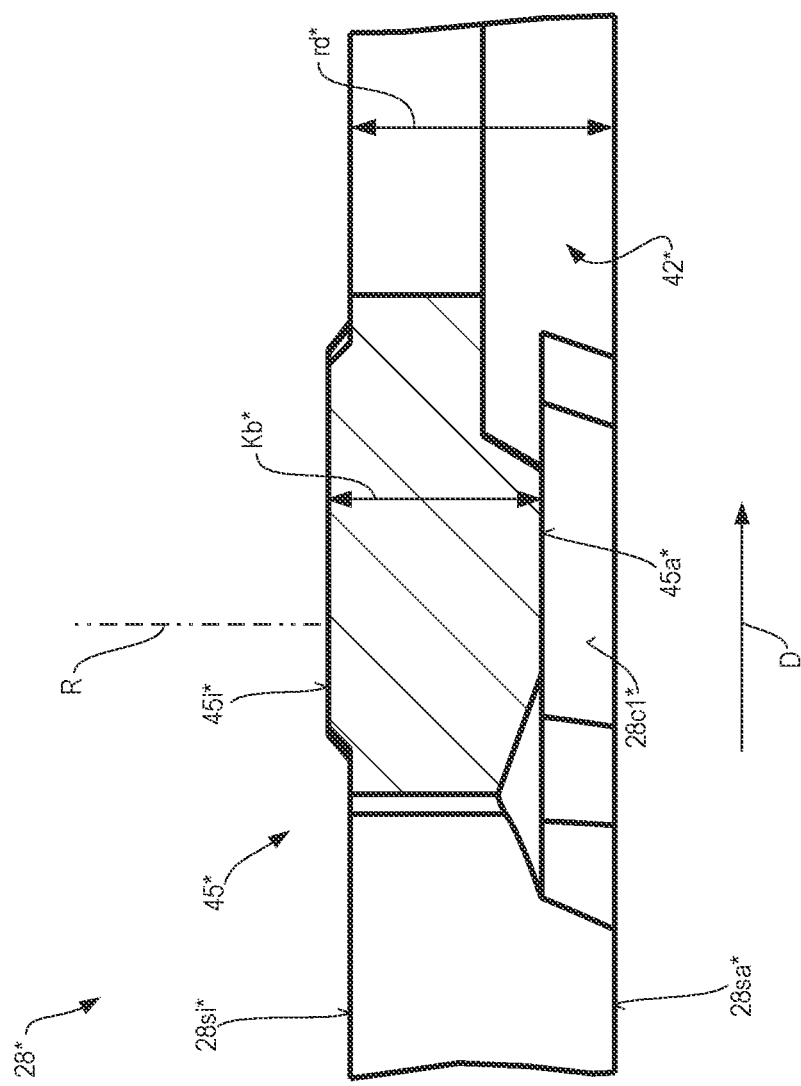
FIG. 26C shows a circumferential section through the tooth tip of the alternative receiving-side stabilizing tooth 45*, produced by non-cutting deformation, of FIGS. 26A and 26B in a cylindrical section area XXVI C of FIGS. 26A and 26B with the sprocket axis as cylinder axis.
Figure 26D:
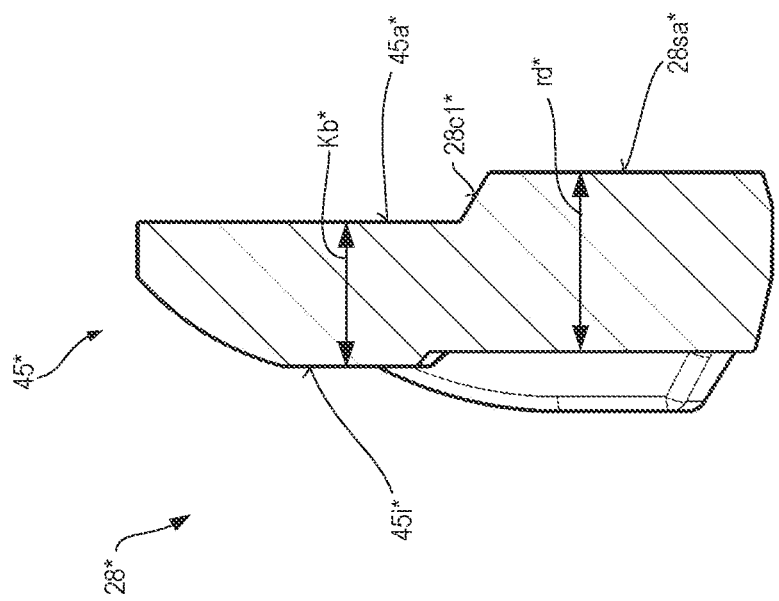
FIG. 26D shows a cross section through the receiving-side stabilizing tooth 45* of FIGS. 26A to 26C in a section plane XXVI D, which encompasses the sprocket axis R, of FIGS. 26A and 26B.

FIGS. 26A to 26D show the receiving-side stabilizing tooth 45* situated at the location denoted by XXVI in FIG. 25; specifically, FIG. 26A shows the outer side thereof in a perspective view, FIG. 26B shows the inner side thereof in a perspective view, FIG. 26C shows a circumferential section along the cylindrical section area XXVI C in FIGS. 26A and 26B, wherein the sprocket axis R is the cylinder axis of the section area XXVI C, and FIG. 26D shows a cross section along the section plane XXVI D, which encompasses the sprocket axis R, in FIGS. 26A and 26B.

Components and component sections that are identical and functionally identical to those on the above-described receiving-side stabilizing teeth 45 and 45* are denoted in FIGS. 26A to 26D with the same reference designations, wherein the suffix "*" denotes the production of the receiving-side stabilizing tooth 45* by non-cutting deformation processes.

As in the case of the receiving-side stabilizing teeth 45 and 45* described above, the further receiving-side stabilizing tooth 45* shown in FIGS. 26A to 26D also has, on its outer side, a ramp 28*c*1* which radially inwardly delimits a deflecting surface 45*a* as the outer tooth contact surface of the further receiving-side stabilizing tooth 45*.

The ramp 28*c*1* forms an axial shoulder relative to the deflecting surface 45*a*. The ramp 28*c*1 has a radially outwardly facing, convexly curved bearing surface on which a radially inner edge of a chain link, situated relatively close to the vertical longitudinal central plane of the bicycle that bears the sprocket 28*, of an inner link plate chain link can lie during a downshift operation from the adjacent next smaller sprocket with 36 teeth onto the sprocket 28*. The chain can thus ride up on the ramp 28*c*1*. The further receiving-side stabilizing tooth 45* is also compatible with a so-called "half-link" chain.

The inner tooth contact surface 45*i* projects axially beyond the inner face surface 28*si* of the sprocket 28* and thus, when in engagement with an inner link plate chain link, stabilizes the bicycle chain by virtue of the fact that the further receiving-side stabilizing tooth 45* displaces the chain axially inward in the downshift region 40* by means of its axially inwardly projecting inner tooth contact surface 45i*.

Figure 27B:
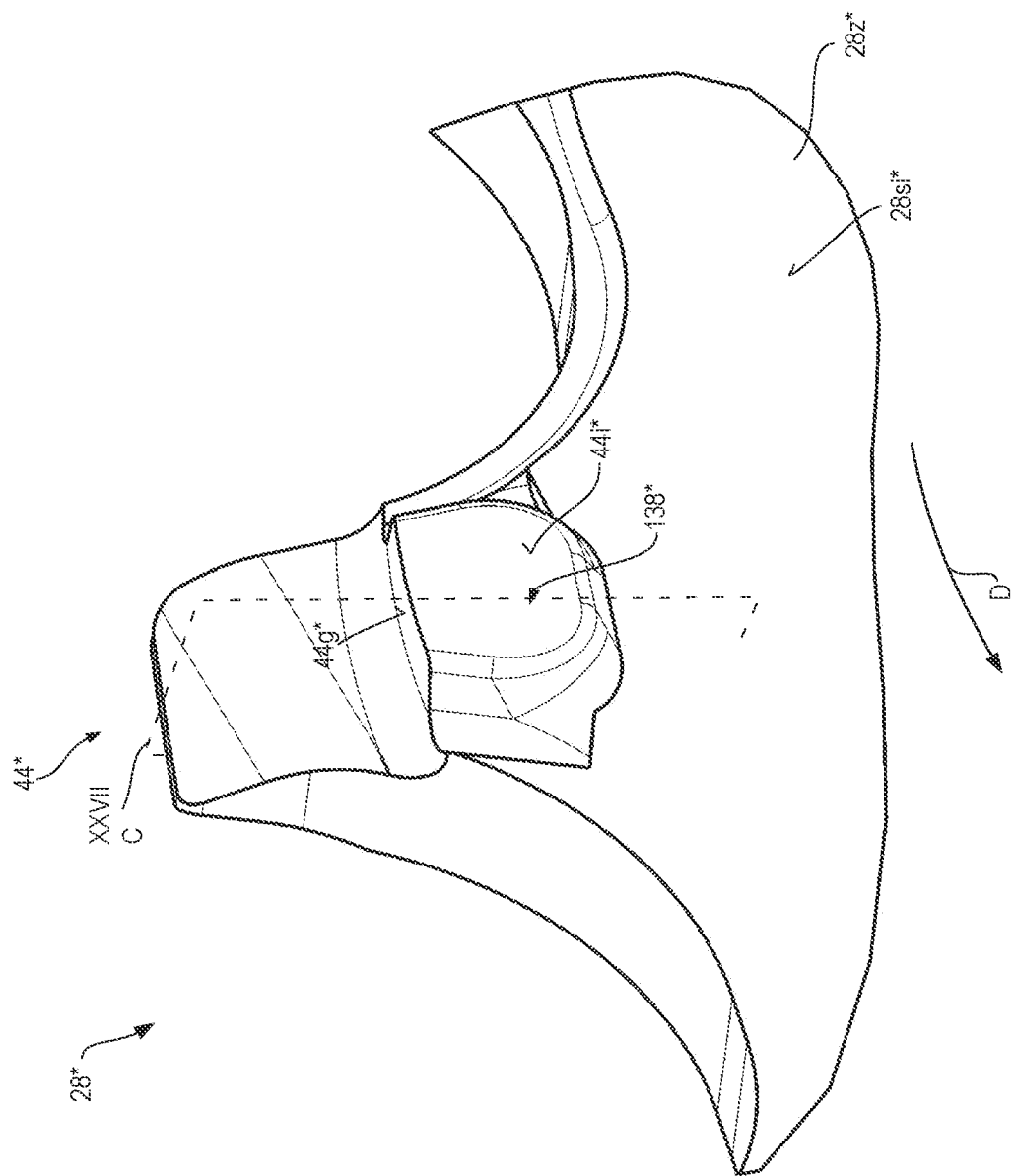
FIG. 27B shows a perspective view of the inner side of the further catch tooth 44*, produced by non-cutting deformation, of FIG. 27A.

FIGS. 27A to 27C are detail illustrations of a further catch tooth 44* that is situated on the sprocket 28* at the location XXVII in FIG. 25. FIG. 27A shows a perspective view of the outer side of the further catch tooth 44*, FIG. 27B shows a perspective view of the inner side thereof, and FIG. 27C shows a circumferential section along a cylindrical section area XXVII C in FIGS. 27A and 27B. The sprocket axis R of the sprocket 28* is the cylinder axis of the section area XXVII C.

The further catch tooth 44* differs from the catch tooth 44* already described above substantially only by bevels in the region of the tooth tip. As in the case of the catch tooth 44* described above, the inner tooth contact surface 44i* is formed as the face surface of a projection 138*. The projection 138* is formed by non-cutting processes by means of an axial material displacement. Therefore, a recess 136* is formed on the outer side of the sprocket 28* at the location of the projection 138* on the inner side.

The ramp 44g* already described in detail above is also formed on the further catch tooth 44*, on the axially outwardly facing surface of which ramp an outer link plate, situated relatively close to the vertical longitudinal central plane of the bicycle that bears the sprocket 28*, of the bicycle chain can be supported by way of its radially inner edge during a downshift operation.

Figure 28B:
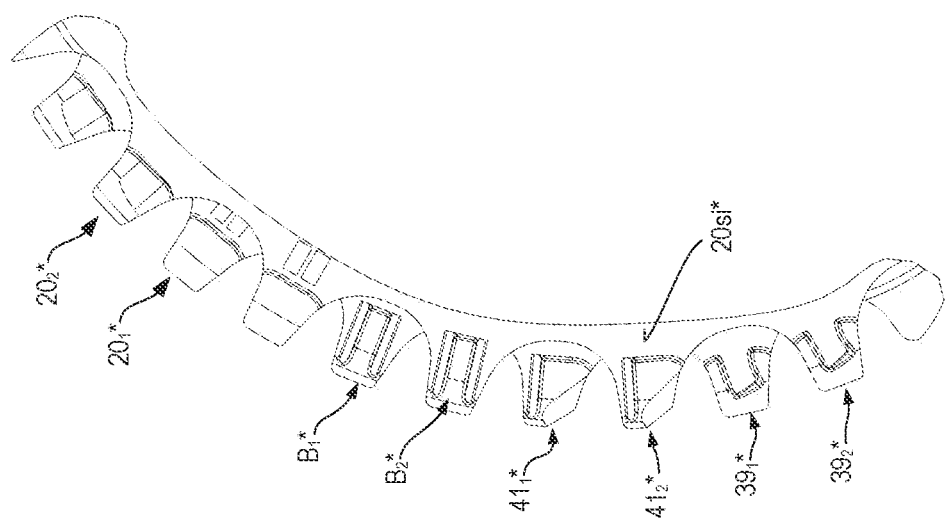
FIG. 28B shows a plan view of the inner side of a circumferential segment of a row of teeth of the sprockets 20$_1$* and 20$_2$* of FIG. 28B.
Figure 28A:
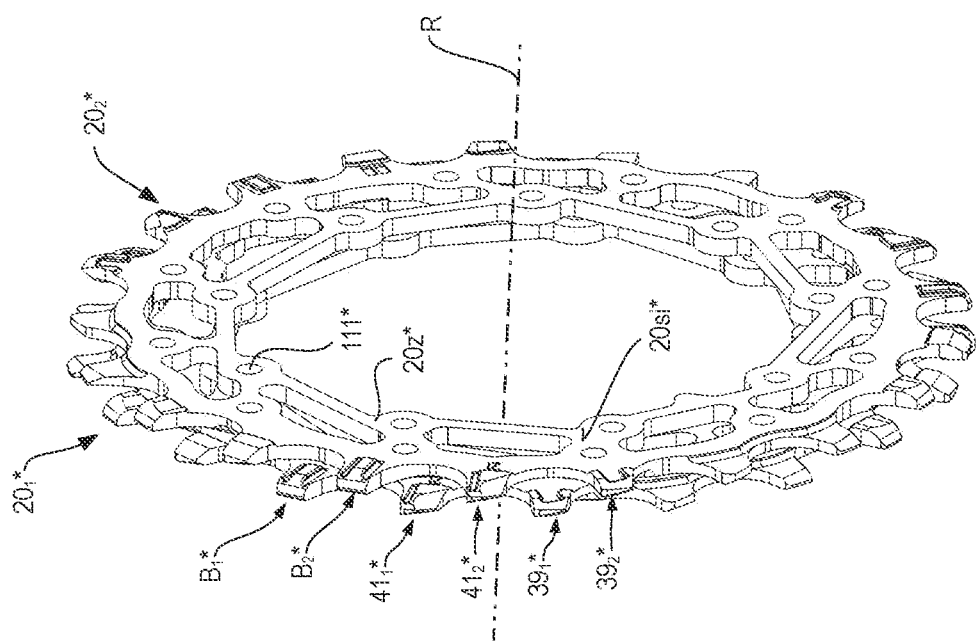
FIG. 28A shows a perspective view of the inner sides of two similar sprockets 20*, which are situated coaxially one over the other, as sprockets 20$_1$* and 20$_2$* in an arrangement rotationally offset with respect to one another by one tooth pitch about the common sprocket axis R in preparation for a heat treatment operation.

FIG. 28A shows, in a perspective illustration, two sprockets 20* which have been placed coaxially one above the other with respect to their sprocket axis R and which are provided for a heat treatment operation. It is particularly advantageous that, on the sprocket 20*, and also on the other sprockets of the sprocket cassette that are deformed by non-cutting processes, all projections which protrude axially relative to the respective face side 20si* and 20sa*, such as the projections 138* mentioned above, are formed radially outside the root circle of the respective sprocket. For this reason, two or more sprockets deformed by non-cutting processes and with equal numbers of teeth can, despite the formation of axial projections, be arranged coaxially in densely packed fashion, with their face sides 20si* and 20sa* lying really against one another, in a manner rotationally offset with respect to one another by half of one tooth pitch or chain pitch. The projections of one sprocket then lie in the tooth spaces of the adjacent sprocket. FIG. 28B shows the situation of axially identically oriented sprockets placed coaxially one above the other, based on the example of tooth rows of the sprockets 20*, in a plan view of the inner side surfaces 20si* thereof. The thus densely packed sprockets may be clamped axially so as to prevent distortion during the heat treatment operation.

Figure 29:
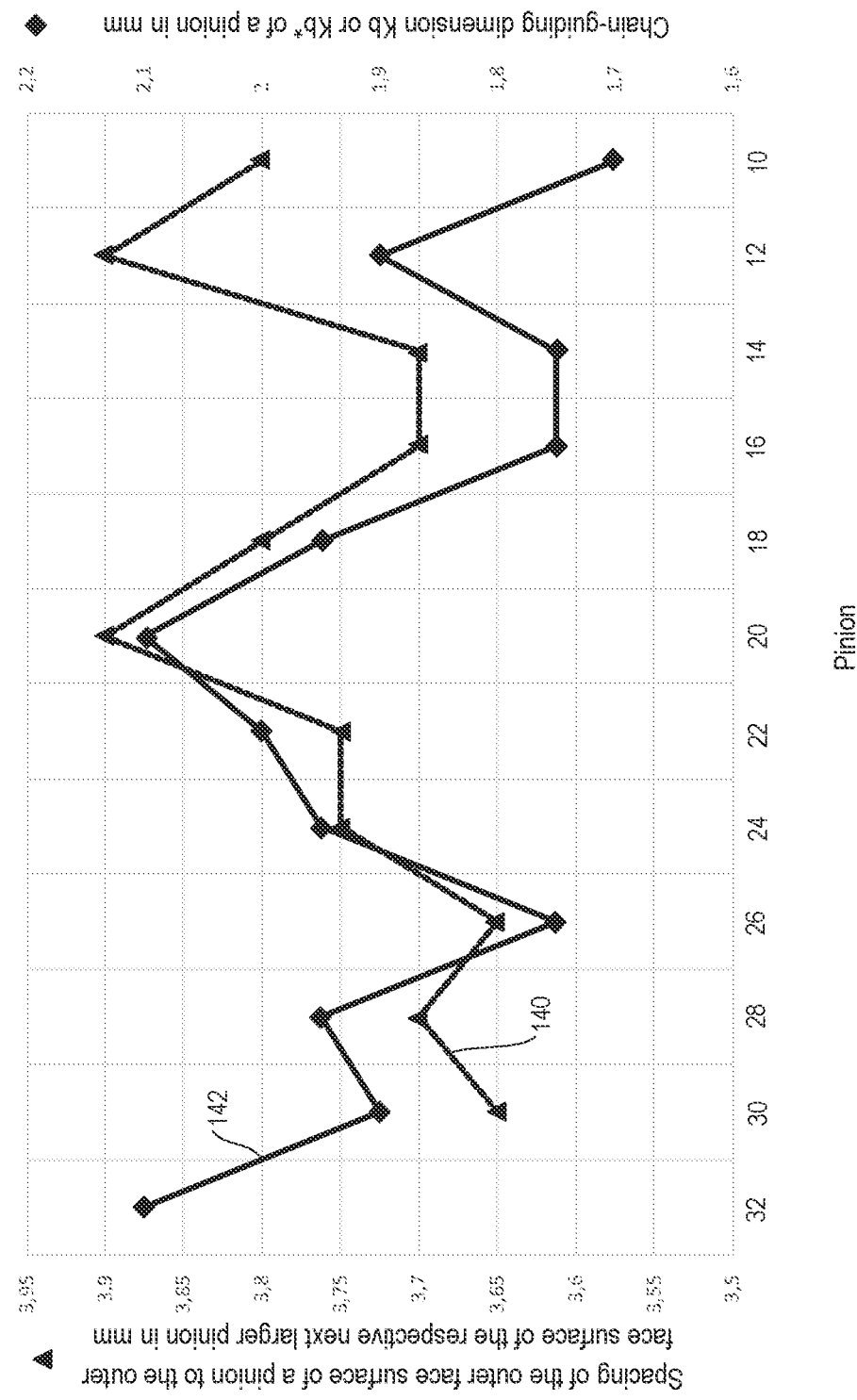
FIG. 29 shows, for the sprocket cassette of FIGS. 1 to 7B and 18A to 22C, a diagram with sprocket spacings, measured over the in each case outer face surfaces of the sprockets, and with chain-guiding dimensions of the reference teeth of the respective sprockets.

FIG. 29 illustrates a first diagram which shows the axial sprocket spacings of directly adjacent sprockets of the sprocket cassette 1 and which shows a second diagram superposed on the first diagram, which second diagram indicates, for each sprocket of the sprocket cassette 1, the chain-guiding dimension Kb of a reference tooth of the respective sprocket.

In the illustration of FIG. 29, the sprockets 32 to 10 of the sprocket cassette 1 are represented by their reference designations on the ordinate in order of decreasing size from left to right.

Plotted on the left-hand abscissa in FIG. 29 is the scale in millimetres for the axial sprocket spacing, measured between two outer axial face surfaces of axially directly adjacent sprockets, specifically from the sprocket of the notation to the next larger adjacent sprocket. Accordingly, no sprocket spacing value is plotted for the largest sprocket 32 of the sprocket cassette 1, because the sprocket 32 has no larger axially adjacent sprocket. The sprocket spacing value assigned to the sprocket 30 is the abovementioned axial spacing between the outer axial face surface of the sprocket 30 and the next larger sprocket, that is to say the sprocket 32. It is likewise the case for every further sprocket that the spacing of the sprocket to the next larger sprocket is indicated. The curve of the sprocket spacings is denoted in FIG. 29 by 140. The spacing values are plotted using triangles and are connected by dashed lines.

Plotted on the right-hand abscissa in FIG. 29 is the scale in millimetres for the chain-guiding dimension Kb of a reference tooth of each sprocket represented on the ordinate. The curve of the values of the chain-guiding dimensions is denoted in FIG. 29 by 142. The values of the chain-guiding dimensions for the individual sprockets are plotted using rhombuses and are connected by solid lines.

It can be seen that the sprocket spacing values qualitatively correlate with the chain-guiding dimensions, and the changes in sprocket spacing values qualitatively correlate with the changes in chain-guiding dimensions from one sprocket to the adjacent sprocket.

The spacing from sprocket 12 to sprocket 14 is greater than the spacing of the sprocket 10 to sprocket 12 and of the sprocket 14 to sprocket 16, because a high degree of skew of the chain prevails at the sprocket 12, which pulls the chain inwards. There is thus the risk of the chain making contact with the sprocket 16 if a sprocket spacing is too small. In order to rule out such contact when the sprocket 14 is active, the sprocket spacing to the sprocket 16 is selected to be greater than the sprocket spacings of the adjacent sprockets.

At the sprocket 10 as the smallest sprocket, the chain skew is duly greater than that for a sprocket 12 that is active for engagement with the chain. However, at the smallest sprockets 10 which are thus situated axially furthest to the outside, the lack of a sprocket adjacently to the outside means that the teeth can be configured such that they force the chain axially outwards, which prevents the chain, when it is guided on the sprocket 10, from making undesired contact with the sprocket 12.

At the sprocket 16, the chain skew is already considerably reduced in magnitude, such that, when the chain meshes with the sprocket 16, there is no risk of undesired contact with the axially adjacent next larger sprocket 18.

The sprockets 24 to 18, inclusive of each of these, have the stabilizing teeth shown in FIGS. 9 to 12, with inner tooth contact surfaces offset axially inwards. In this way, the chain is displaced axially inwards at least in circumferential segments, for which reason it is also the case that larger sprocket segments in relation to the respectively next larger neighbouring sprocket thereof are selected for the sprockets 14 to 18 than for sprockets 26 to 32 and sprockets 16 and 14.

On the larger sprockets 32 up to and including 26, the chain skew acts axially outwards, such that, here, the chain skew tends to pull the chain axially away from the adjacent larger sprocket. Since it is thus the case that, for a sprocket 30, 28 or 26 that is active for engagement with the chain, there is no risk of contact of the chain with the respectively adjacent next larger sprocket, the sprocket spacing can be selected to be relatively small there.

Figure 30A:
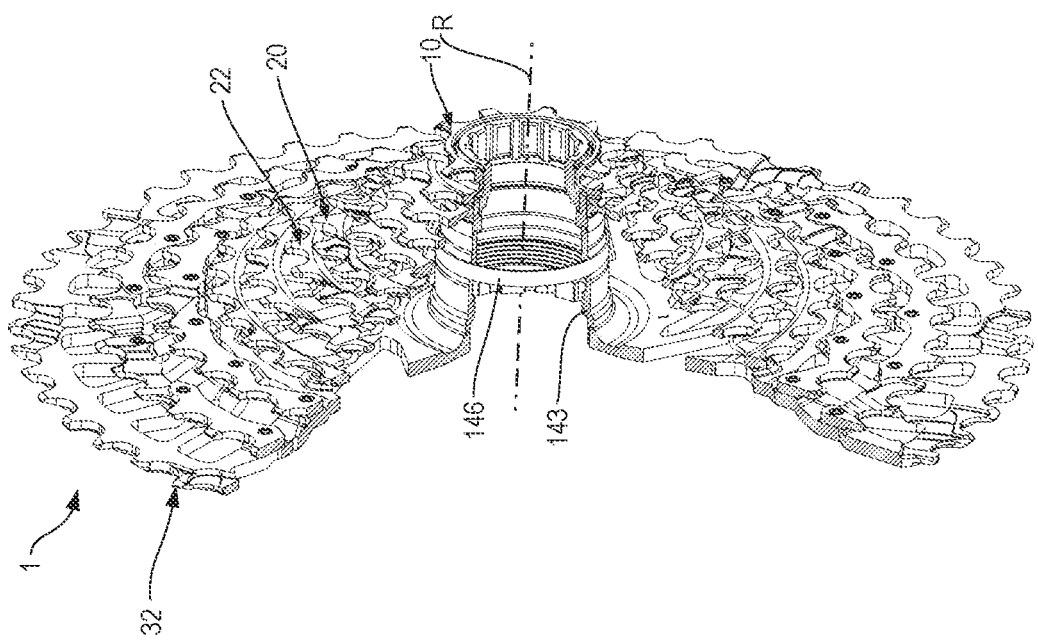
FIG. 30A shows a perspective view of the sprocket cassette of FIGS. 1 to 1B, installed on a lock tube, with a first embodiment of a designation of a reference sprocket for use in adjustment operations.

FIG. 30A shows the sprocket cassette 1 discussed in the present application mounted on a so-called "lock tube" 144 which, throughout the service life of the sprocket, is used for various installation and positioning purposes for components of the sprocket cassette.

In order to perform particular technical setting operations, for example for the purposes of setting the so-called "chain gap" between sprocket cassette and chain-guiding roller or gearshift roller of a rear derailleur 94 that interacts with the sprocket cassette, and for the purposes of setting the chain tension, the rear derailleur 94 must be moved into a predetermined reference position in which the chain-guiding roller 96, which is generally situated relatively close to the sprocket cassette, is arranged so as to be coplanar with the reference sprocket, such that the bicycle chain 50 circulating on the bicycle 71 is in engagement with the reference sprocket.

In order to avoid erroneous actuation and erroneous setting operations, it is expedient for the reference sprocket to be clearly designated and made clearly visible from the outside. This is advantageous in particular if, as in the present case, the sprocket cassette has 12 sprockets or more, such that even a skillful expert can easily miscount when counting sprockets.

In a first embodiment, shown in FIG. 30A, of a designation of the reference sprocket of the sprocket cassette 1, a band 144 is placed between the reference sprocket, which in the present case is the sprocket 20, and the next larger sprocket 22, which band preferably lies on axially extending connecting formations. The connecting formations may be the abovementioned connecting webs 110 or, if the connection between the sprockets 20 and 22 is formed by connecting pins or connecting rivets, may be precisely these connecting pins or connecting rivets.

The band 144 is preferably formed from an elastic material, for example rubber or natural rubber, such that the band 144 lies permanently under elastic stress against the axially extending connecting formations. The band 144 is preferably of an easily visible colour, for example yellow, orange or red. In the surroundings of the metallic sprocket cassette 1, other colours are however also easily visible, in particular if these are configured as signal colours with a certain luminosity.

Figure 30B:
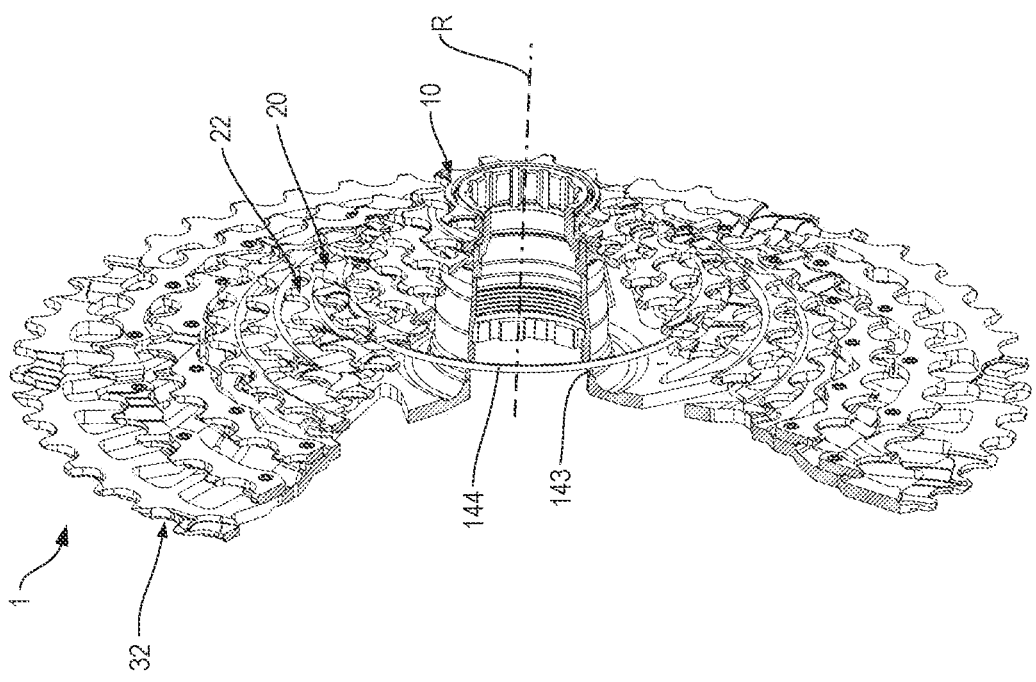
FIG. 30B shows a perspective view of the sprocket cassette of FIGS. 1 to 1B, installed on a lock tube, with a second embodiment of a designation of a reference sprocket for use in adjustment operations.

FIG. 30B illustrates a second option of a designation of the reference sprocket 20. This second option also uses a band 146 which is easily visible, in particular owing to the colouring thereof. By contrast to the embodiment of FIG. 30A, the band 146 is however supported by the outer surface of the lock tube 143 to which the sprocket cassette 1 is connected for installation and positioning purposes. The band 146, as an elastic band with a diameter in the relaxed state which is smaller than that of the lock tube 143, may be held on the outer surface of the lock tube 143 in frictionally engaging fashion, assisted by the elastic restoring forces resulting from the inherent stretching. In order to avoid axial displacement of the band 146 with greater certainty, the band may be received in an encircling groove of the lock tube 143 and/or may be secured on the outer surface of the lock tube 143 using adhesive.

An advantage of this second embodiment lies in the fact that the band 146 is no longer visible, or is scarcely visible any longer, to the operator when viewing the sprocket cassette 1 radially and when the bicycle chain is in engagement with the reference sprocket 20, because the band, concealed by the bicycle chain, can disappear behind the chain.

Instead of the use of a band 146, the outer surface of the lock tube 143 may have a coloured ring and/or a ring which differs from the rest of the lock tube 143 with regard to its surface structure, be it by a corresponding coating of paint, by corresponding anodizing, by corresponding engraving, in particular laser engraving, knurling or any other suitable surface treatment of the lock tube 143.

Pursuing this approach, the reference sprocket itself may be configured, by surface treatment, to be visually and/or tactilely distinguishable from the other sprockets of the sprocket cassette 1, which are not reference sprockets.

Figure 30C:
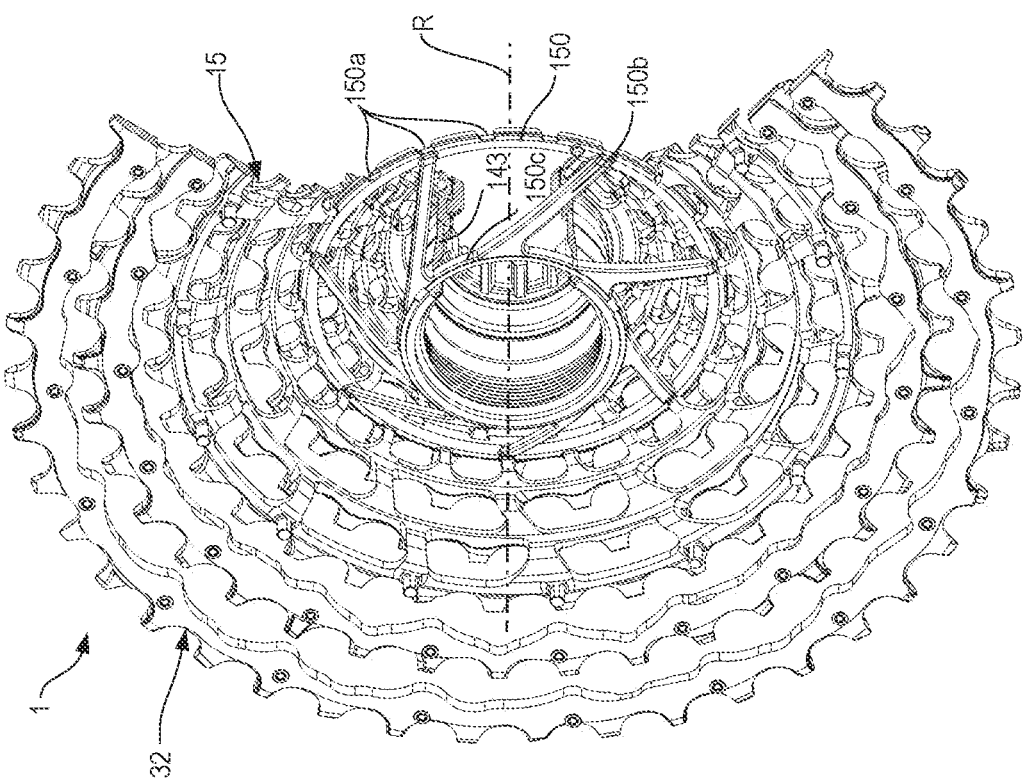
FIG. 30C shows a perspective view of the sprocket cassette of FIGS. 1 to 1B, installed on a lock tube, with a third embodiment of a designation of a reference sprocket for use in adjustment operations.

FIG. 30C shows a third option of a designation of the reference sprocket 20 on the sprocket cassette 1. Here, an annular disk 148, which in turn preferably differs considerably in terms of colour from the rest of the sprocket cassette 1, is arranged in the gap space between the reference sprocket 20 and the next larger sprocket 22. The annular disk 148 may be formed from paper or plastic.

The annular disk 148 is preferably radially slotted in order to make it easier for it to be arranged on, and in particular removed from, the sprocket cassette 1.

If, during the setting activity, the bicycle chain is caused to approach the reference sprocket by downshifting from the direction of smaller sprockets, then the annular disk 148 can, if it is of correspondingly stable form, form an advantageous physical barrier that prevents or at least impedes a downshift of the bicycle chain across the reference sprocket 20. The reference sprocket 20 itself is concealed in FIG. 30C by the annular disk 148.

Figure 30D:
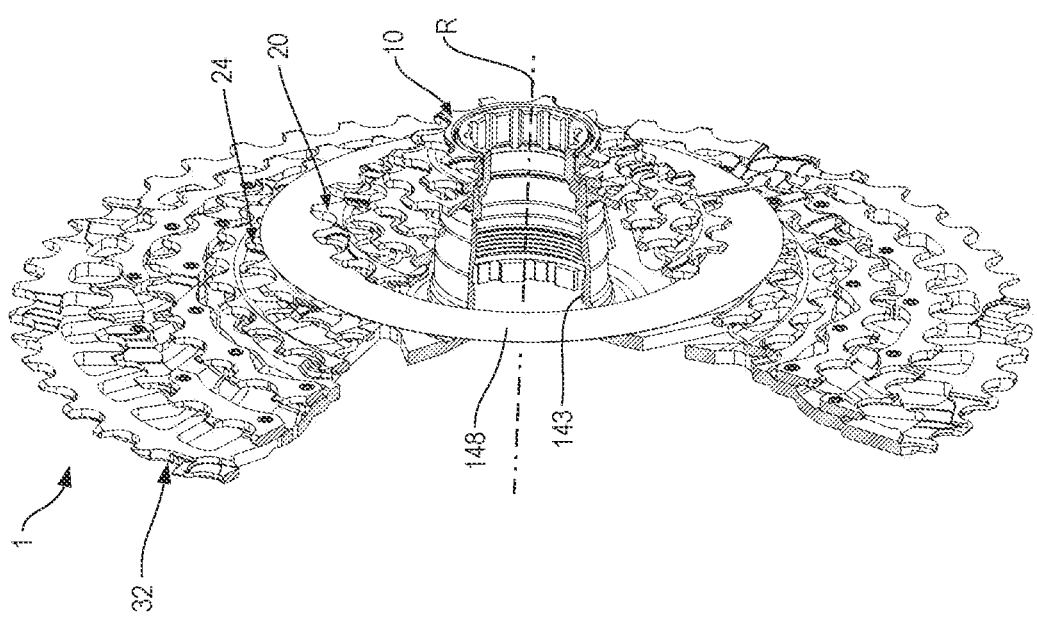
FIG. 30D shows a perspective view of the sprocket cassette of FIGS. 1 to 1B, installed on a lock tube, with a fourth embodiment of a designation of a reference sprocket for use in adjustment operations.

FIG. 30D illustrates a fourth option of a designation of the reference sprocket 20. By contrast to FIGS. 30A to 30C and 30E, the viewer of FIG. 30D sees a perspective view of the inner side of the sprocket cassette 1.

In this fourth embodiment, a ring 150 that is visible on the sprocket cassette from radially outside is arranged in the sprocket dome 15, wherein the ring 150 may have recesses 150a into which the connecting webs 110 between the reference sprocket 20 and the next larger sprocket 22 engage in form-fitting fashion. The ring 150 is thus held rotationally conjointly on the sprocket cassette 1 relative to the sprocket axis R. As in the embodiments described above, the ring 150 is also visually highlighted, preferably by colouring, in relation to the sprocket cassette 1.

The ring 150 may furthermore be supported via supporting struts 150b and an inner supporting ring 150c on the outer surface of the lock tube 143.

Figure 30E:
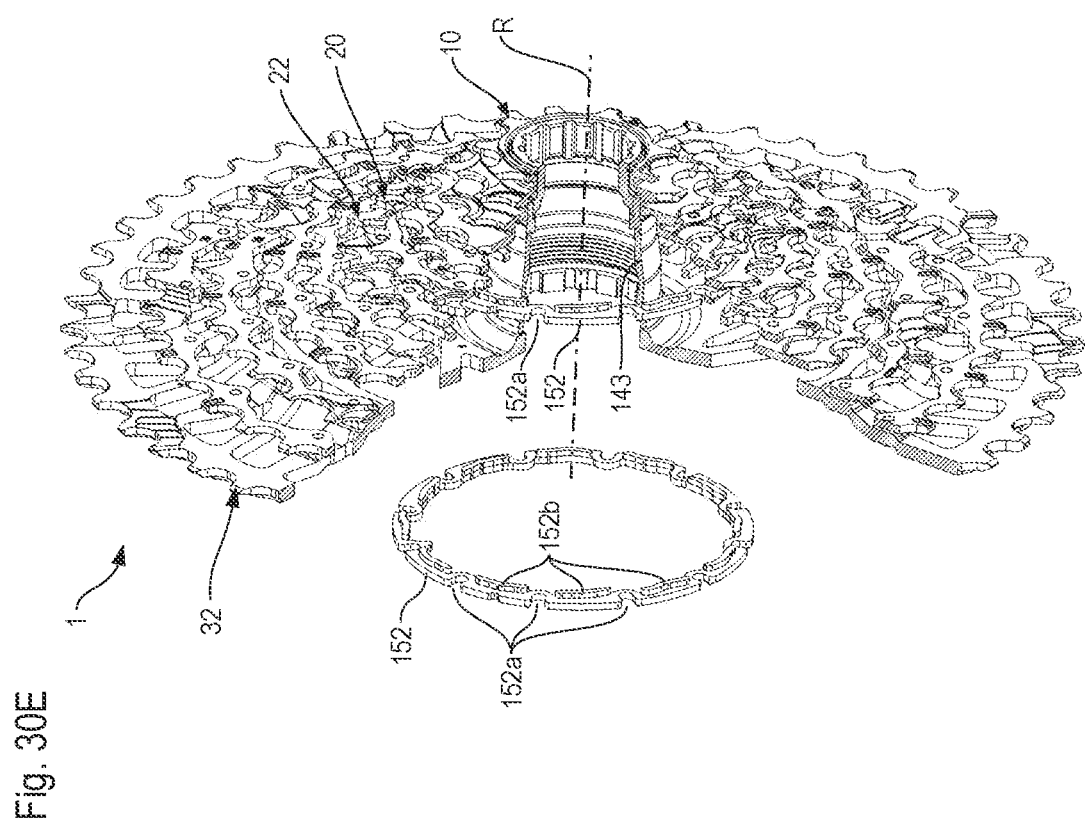
FIG. 30E shows a perspective view of the sprocket cassette of FIGS. 1 to 1B, installed on a lock tube, with a fourth embodiment of a designation of a reference sprocket for use in adjustment operations.

The fifth embodiment for the designation of the reference sprocket 20, as shown in FIG. 30E, substantially corresponds in terms of the basic principle to the fourth embodiment of FIG. 30D, but with the difference that the ring 152 of the fifth embodiment is designed not for a sprocket dome 15 of integral form but for sprockets, in particular sprockets produced by non-cutting deformation processes, which are formed separately from one another and which are connected to one another by separately formed connecting formations such as connecting pins, connecting rivets and the like.

The ring 152 may in turn have radially outwardly facing recesses 152a for receiving axially extending connecting formations, such as connecting pins, connecting rivets and the like, in form-fitting fashion. Furthermore, the ring may have axial projections 152b that can lie against the radially inner edges of the individual sprockets, in this case of the reference sprocket 20 and of the next larger sprocket 22, in order to optimally position the ring 152 in the sprocket cassette. The ring 152 can thus be received both rotationally conjointly about the sprocket axis R, and in a manner secured against radial displacement, on the sprocket cassette 1.

The ring 152 is also preferably immediately and readily identifiable on the sprocket cassette 1 by way of contrasting colouring.

For the sake of better clarity, in FIG. 30E, the ring 152 is not only arranged in the sprocket cassette 1 but is additionally shown once again separately on the left, adjacent to the sprocket cassette 1.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle sprocket cassette for a bicycle drive system with a rear derailleur and a bicycle roller chain, the bicycle sprocket cassette comprising:
   a plurality of coaxial sprockets each having a different number of teeth, the plurality of coaxial sprockets each having a sprocket main body with sprocket teeth arranged thereon, wherein at least one sprocket of the plurality of coaxial sprockets has, in its outboard-side end face along a section of its circumference in the region of the sprocket main body and of the sprocket teeth, at least one upshift region with an axial upshift recess formation and/or at least one downshift region with an axial downshift recess formation to allow smooth shifting operation,
   wherein axial sprocket spacings are defined between each pair of adjacent sprockets of the plurality of coaxial sprockets between an outboard-side tooth contact surface of a chain inner link plate sprocket tooth situated outside the recess formations of a sprocket of the plurality of coaxial sprockets and an outboard-side tooth contact surface of a chain inner link plate sprocket tooth situated outside the recess formations of an axially adjacent sprocket to the sprocket,
   wherein an axial value plot of the axial sprocket spacings of the plurality of coaxial sprockets, starting inboard with an axial sprocket spacing between a largest sprocket of the plurality of coaxial sprockets and a second largest sprocket of the plurality of coaxial sprockets and ending outboard with an axial sprocket spacing between a second smallest sprocket of the plurality of coaxial sprockets and a smallest sprocket of the plurality of coaxial sprockets is defined, and
   wherein the axial value plot of the axial sprocket spacings increases overall from its inboard-side start and reaches a local maximum value in an axially middle third of an overall width of the bicycle sprocket cassette, and that the axial value plot decreases overall from the local maximum value to a local minimum value in an axially outboard-side third of the overall width of the bicycle sprocket cassette.

2. The bicycle sprocket cassette of claim 1, wherein the axial value plot of the sprocket spacings reaches the local maximum value in the axial region of a transition sprocket assembly.

3. The bicycle sprocket cassette of claim 2, wherein the transition sprocket assembly comprises an odd-toothed transition sprocket.

4. The bicycle sprocket cassette of claim 3, wherein the odd-toothed transition sprocket is a sixth sprocket as counted from outboard most sprocket.

5. The bicycle sprocket cassette of claim 1 wherein the axial value plot of the sprocket spacings reaches the local maximum value in the axial region of a sixth sprocket as counted from outboard most sprocket.

6. The bicycle sprocket cassette of claim 1, wherein the local maximum value of the axial value plot is situated between the sixth and seventh sprocket as counted from outboard most sprocket, wherein a sum of the sprocket spacings from the smallest sprocket to the seventh sprocket is between 54.5% to 55.9% of the sum of the sprocket spacings of all sprockets of the bicycle sprocket cassette.

7. The bicycle sprocket cassette of claim 6, wherein the sum of the sprocket spacings from the smallest sprocket to the seventh sprocket is 55.2% of the sum of the sprocket spacings of all sprockets of the bicycle sprocket cassette.

8. The bicycle sprocket cassette of claim 1 wherein the axial value plot of the sprocket spacings reaches the local minimum value in the axial region of a third and/or a fourth sprocket as counted from outboard most sprocket.

9. The bicycle sprocket cassette of claim 1 wherein at least one sprocket of the plurality of coaxial sprockets has at least one stabilizing tooth.

10. The bicycle sprocket cassette of claim 9, wherein an inboard-side tooth contact surface of the stabilizing tooth together with an outboard-side tooth contact surface of an chain inner link plate sprocket tooth having the largest axial chain inner link plate-guiding dimension of the at least one sprocket forms a chain-guiding dimension spanning multiple sprocket teeth which is wider than an axial chain inner link plate-guiding dimension of the inner link plate sprocket tooth having the largest axial chain inner link plate-guiding dimension such that the at least one sprocket is configured to deflect the bicycle roller chain inboard on the at least one sprocket via the inboard-side tooth contact surface of the stabilizing tooth.

11. The bicycle sprocket cassette of claim 10, wherein the chain-guiding dimension spanning multiple sprocket teeth ranges between 0.90 times and 1.05 times of the chain inner link plate clearance width of the bicycle roller chain.

12. The bicycle sprocket cassette of claim 11, wherein the chain-guiding dimension spanning multiple sprocket teeth ranges between 1.004 times and 1.033 times of a chain inner link plate clearance width of the bicycle roller chain.

13. The bicycle sprocket cassette of claim 9, wherein an outboard-side tooth contact surface of the stabilizing tooth together with an inboard-side tooth contact surface of an chain inner link plate sprocket tooth having the largest axial chain inner link plate-guiding dimension of the at least one sprocket forms a chain-guiding dimension spanning multiple sprocket teeth which is wider than an axial chain inner link plate-guiding dimension of the inner link plate sprocket tooth having the largest axial chain inner link plate-guiding dimension such that the at least one sprocket is configured to deflect the bicycle roller chain outboard on the at least one sprocket via the outboard-side tooth contact surface of the stabilizing tooth.

14. The bicycle sprocket cassette of claim 13, wherein the chain-guiding dimension spanning multiple sprocket teeth ranges between 0.90 times and 1.05 times of a chain inner link plate clearance width of the bicycle roller chain.

15. The bicycle sprocket cassette of claim 14, wherein the chain-guiding dimension spanning multiple sprocket teeth ranges between 1.004 times and 1.033 times of the chain inner link plate clearance width of the bicycle roller chain.

16. A bicycle sprocket cassette for a bicycle drive system with a rear derailleur and a bicycle roller chain having a chain inner link plate clearance width, the bicycle sprocket cassette comprising:
a plurality of coaxial sprockets each having a different number of teeth, the plurality of coaxial sprockets each having a sprocket main body with sprocket teeth arranged thereon, wherein at least one sprocket of the plurality of coaxial sprockets has, in its outboard-side end face along a section of its circumference in the region of the sprocket main body and of the sprocket teeth, at least one upshift region with an axial upshift recess formation and/or at least one downshift region with an axial downshift recess formation to allow smooth shifting operation,
wherein at least one sprocket of the bicycle sprocket cassette has at least one stabilizing tooth, wherein an inboard-side tooth contact surface of the stabilizing tooth together with an outboard-side tooth contact surface of an chain inner link plate sprocket tooth having the largest axial chain inner link plate-guiding dimension of the least one sprocket forms a chain-guiding dimension spanning multiple sprocket teeth which is wider than the axial chain inner link plate-guiding dimension of the inner link plate sprocket tooth having the largest axial chain inner link plate-guiding dimension such that the at least one sprocket is configured to deflect the bicycle roller chain inboard on the at least one sprocket via the inboard-side tooth contact surface of the stabilizing tooth.

17. The bicycle sprocket cassette of claim 14, wherein the chain-guiding dimension spanning multiple sprocket teeth ranges between 0.90 times and 1.05 times of a chain inner link plate clearance width of the bicycle roller chain.

18. The bicycle sprocket cassette of claim 17, wherein the chain-guiding dimension spanning multiple sprocket teeth ranges between 1.004 times and 1.033 times of the chain inner link plate clearance width of the bicycle roller chain.

19. A bicycle sprocket cassette for a bicycle drive system with a rear derailleur and a bicycle roller chain having a chain inner link plate clearance width, the bicycle sprocket cassette comprising:
a plurality of coaxial sprockets each having a different number of teeth, the plurality of sprockets each having a sprocket main body with sprocket teeth arranged thereon, wherein at least one sprocket of the plurality of coaxial sprockets has, in its outboard-side end face along a section of its circumference in the region of the sprocket main body and of the sprocket teeth, at least one upshift region with an axial upshift recess formation and/or at least one downshift region with an axial downshift recess formation to allow smooth shifting operation,
wherein at least one sprocket of the plurality of coaxial sprockets has at least one stabilizing tooth, wherein an outboard-side tooth contact surface of the stabilizing tooth together with an inboard-side tooth contact surface of an chain inner link plate sprocket tooth having the largest axial chain inner link plate-guiding dimension of the at least one sprocket forms a chain-guiding dimension spanning multiple sprocket teeth which is wider than an axial chain inner link plate-guiding dimension of the inner link plate sprocket tooth having the largest axial chain inner link plate-guiding dimension such that the at least one sprocket is configured to deflect the bicycle roller chain outboard on the at least one sprocket via the outboard-side tooth contact surface of the stabilizing tooth.

20. The bicycle sprocket cassette of claim 19, wherein the chain-guiding dimension spanning multiple sprocket teeth ranges between 0.90 times and 1.05 times of a chain inner link plate clearance width of the bicycle roller chain.

21. The bicycle sprocket cassette of claim 20, wherein the chain-guiding dimension spanning multiple sprocket teeth ranges between 1.004 times and 1.033 times of the chain inner link plate clearance width of the bicycle roller chain.

* * * * *